United States Patent
Rancati et al.

(10) Patent No.: US 12,534,474 B2
(45) Date of Patent: Jan. 27, 2026

(54) DIHYDROFUROPYRIDINE DERIVATIVES AS RHO-KINASE INHIBITORS

(71) Applicant: CHIESI FARMACEUTICI S.P.A., Parma (IT)

(72) Inventors: Fabio Rancati, Parma (IT); Alessandro Accetta, Parma (IT); Anna Maria Capelli, Parma (IT); Daniele Pala, Parma (IT); Christine Edwards, Parma (IT); Adele Elisa Pasqua, Parma (IT); Prashant Bhimrao Kapadnis, Parma (IT); Arnaud Jean Francois Auguste Cheguillaume, Parma (IT)

(73) Assignee: CHIESI FARMACEUTICI S.p.A., Parma (IT)

( * ) Notice: Subject to any disclaimer, the term of this patent is extended or adjusted under 35 U.S.C. 154(b) by 412 days.

(21) Appl. No.: 18/267,222

(22) PCT Filed: Dec. 13, 2021

(86) PCT No.: PCT/EP2021/085378
§ 371 (c)(1),
(2) Date: Jun. 14, 2023

(87) PCT Pub. No.: WO2022/128851
PCT Pub. Date: Jun. 23, 2022

(65) Prior Publication Data
US 2024/0092792 A1    Mar. 21, 2024

(30) Foreign Application Priority Data

Dec. 15, 2020 (EP) ..................... 20214148

(51) Int. Cl.
C07D 491/048 (2006.01)
A61K 45/06 (2006.01)
C07D 519/00 (2006.01)

(52) U.S. Cl.
CPC .......... *C07D 491/048* (2013.01); *A61K 45/06* (2013.01); *C07D 519/00* (2013.01)

(58) Field of Classification Search
CPC ... C07D 491/048; C07D 519/00; A61K 45/06
See application file for complete search history.

(56) References Cited

FOREIGN PATENT DOCUMENTS

| WO | WO-2004039796 A1 | 5/2004 |
| WO | WO-2019238628 A1 | 12/2019 |

OTHER PUBLICATIONS

Extended European Search Report issued Mar. 15, 2021 in Patent Application No. 20214148.7, 9 pages.
International Search Report and Written Opinion issued Feb. 14, 2022 in PCT/EP2021/085378, 11 pages.
Olivier Defert et al., "Rho kinase inhibitors: a patent review (2014-2016)", Expert Opinion on Therapeutic Patents, vol. 27, No. 4, XP055400492, Jan. 16, 2017, pp. 507-515.
Yangbo Feng et al., "Rho Kinase (ROCK) Inhibitors and Their Therapeutic Potential", Journal of Medicinal Chemistry, vol. 59, No. 6, XP055535566, Oct. 30, 2015, pp. 2269-2300.

*Primary Examiner* — Rebecca L Anderson
(74) *Attorney, Agent, or Firm* — Element IP, PLC

(57) ABSTRACT

The invention relates to compounds of formula (I) inhibiting Rho Kinase that are dihydrofuropyridine derivatives, methods of preparing such compounds, pharmaceutical compositions containing them and therapeutic use thereof. Particularly the compounds of the invention may be useful in the treatment of many disorders associated with ROCK enzymes mechanisms, such as pulmonary diseases including asthma, chronic obstructive pulmonary disease (COPD), idiopathic pulmonary fibrosis (IPF) and pulmonary arterial hypertension (PAH).

15 Claims, No Drawings

DIHYDROFUROPYRIDINE DERIVATIVES AS RHO-KINASE INHIBITORS

FIELD OF THE INVENTION

The present invention relates to novel compounds inhibiting Rho Kinase (hereinafter ROCK Inhibitors); methods of preparing such compounds, pharmaceutical compositions containing them and therapeutic use thereof.

BACKGROUND OF THE INVENTION

The compounds of the invention are inhibitors of the activity or function of the ROCK-I and/or ROCK-II isoforms of the Rho-associated coiled-coil forming protein kinase (ROCK).

Rho-associated coiled-coil forming protein kinase (ROCK) belongs to the AGC (PKA/PKG/PKC) family of serine-threonine kinases. Two human isoforms of ROCK have been described, ROCK-I (also referred to as p160 ROCK or ROKβ or ROCK1) and ROCK-II (ROKα or ROCK2) are approximately 160 kDa proteins containing an N-terminal Ser/Thr kinase domain, followed by a coiled-coil structure, a pleckstrin homology domain, and a cysteine-rich region at the C-terminus (Riento, K.; Ridley, A. J. Rocks: multifunctional kinases in cell behaviour. Nat. Rev. Mol. Cell Biol. 2003, 4, 446-456).

Both ROCK-II and ROCK-I are expressed in many human and rodent tissues including the heart, pancreas, lung, liver, skeletal muscle, kidney and brain (above Riento and Ridley, 2003). In patients with pulmonary hypertension, ROCK activity is significantly higher in both lung tissues and circulating neutrophils as compared with controls (Duong-Quy S, Bei Y, Liu Z, Dinh-Xuan A T. Role of Rho-kinase and its inhibitors in pulmonary hypertension. Pharmacol Ther. 2013; 137(3):352-64). A significant correlation was established between neutrophil ROCK activity and the severity and duration of pulmonary hypertension (Duong-Quy et al., 2013).

There is now substantial evidence that ROCK is involved in many of the pathways that contribute to the pathologies associated with several acute and chronic pulmonary diseases, including asthma, COPD, bronchiectasis and ARDS/ALI. Given the biological effect of ROCK, selective inhibitors have the potential to treat a number of pathological mechanisms in respiratory diseases, such as smooth muscle hyper-reactivity, bronchoconstriction, airway inflammation and airway remodeling, neuromodulation and exacerbations due to respiratory tract viral infection (Fernandes L B, Henry P J, Goldie R G. Rho kinase as a therapeutic target in the treatment of asthma and chronic obstructive pulmonary disease. Ther Adv Respir Dis. 2007 October; 1(1):25-33). Indeed the Rho kinase inhibitor Y-27632 causes bronchodilatation and reduces pulmonary eosinophilia trafficking and airways hyperresponsiveness (Gosens, R.; Schaafsma, D.; Nelemans, S. A.; Halayko, A. J. Rhokinase as a drug target for the treatment of airway hyperresponsiveness in asthma. Mini-Rev. Med. Chem. 2006, 6, 339-348). Pulmonary ROCK activation has been demonstrated in humans with idiopathic pulmonary fibrosis (IPF) and in animal models of this disease. ROCK inhibitors can prevent fibrosis in these models, and more importantly, induce the regression of already established fibrosis, thus indicating ROCK inhibitors as potential powerful pharmacological agents to halt progression of pulmonary fibrosis (Jiang, C.; Huang, H.; Liu, J.; Wang, Y.; Lu, Z.; Xu, Z. Fasudil, a rho-kinase inhibitor, attenuates bleomycin-induced pulmonary fibrosis in mice. Int. J. Mol. Sci. 2012, 13, 8293-8307).

Various compounds have been described in the literature as Rho Kinase Inhibitors. See e.g. WO2004/039796 disclosing phenylaminopyrimidine compounds derivatives; WO2006/009889 disclosing indazole compound derivatives; WO2010/032875 disclosing nicotinamide compounds derivatives; WO2009/079008 disclosing pyrazole derivatives; WO2014/118133 disclosing pyridine derivatives and, of the same Applicant of the present invention, WO2018/115383 disclosing bicyclic dihydropyrimidine and WO 2018/138293, WO 2019/048479, WO 2019/121223, WO 2019/121233, WO 2019/121406, WO 2019/238628, WO 2020/016129 disclosing tyrosine-amide compounds derivatives and analogues.

The compounds disclosed in the art exhibit substantial structural differences from the compounds of the present invention.

There remains a potential for developing novel and pharmacologically improved ROCK inhibitors in many therapeutic areas.

In view of the number of pathological responses which are mediated by ROCK enzymes, there is a continuing need for inhibitors of such enzymes which can be useful in the treatment of many disorders. The present invention relates to novel compounds differing from the structures disclosed in the art at least for a common new core scaffold. In fact the invention relates to compounds that are characterized by the 2,3-dihydrofuro[3,2-c]pyridine moiety, particularly 2,3-dihydrofuro[3,2-c]pyridin-4-amine particularly preferably N-(3-(((2,3-dihydrofuro[3,2-c]pyridin-4-yl)amino)methyl)phenyl)formamide or 3-(((2,3-dihydrofuro[3,2-c]pyridin-4-yl)amino)methyl)benzamide derivatives, which are inhibitors of ROCK-I and ROCK-II isoforms of the Rho-associated coiled-coil forming protein kinase (ROCK) that have therapeutically desirable characteristics, particularly promising for some pulmonary diseases including asthma, chronic obstructive pulmonary disease (COPD), idiopathic pulmonary fibrosis (IPF) and pulmonary hypertension (PH) and specifically pulmonary arterial hypertension (PAH). The compounds of the invention may be prepared for administration by any route consistent with their pharmacokinetic properties. The compounds of the invention are active as inhibitors of ROCK-I and ROCK-II isoforms, they are potent and have advantageously other improved properties such as selectivity and other in-vitro properties indicative for a preferred route of administration.

SUMMARY OF THE INVENTION

The present invention is directed to a class of compounds, acting as inhibitors of the Rho Kinase (ROCK), of formula (I)

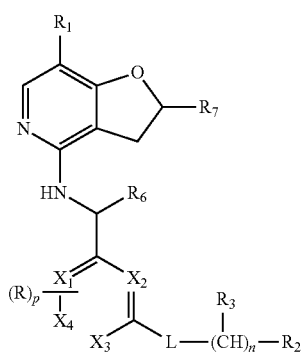

wherein the variables $X_1$, $X_2$, $X_3$ and $X_4$, p, R, $R_1$, L, n, $R_2$ and $R_3$, $R_4$ and $R_5$, $R_6$ and $R_7$ are as defined in the detailed description of the invention; or pharmaceutically acceptable salts and solvates thereof.

In one aspect, the present invention refers to a compound of formula (I) for use as a medicament. In one aspect the present invention provides the use of a compound of the invention for the manufacture of a medicament.

In a further aspect, the present invention provides the use of a compound of the invention for the preparation of a medicament for the treatment of any disease associated with ROCK enzyme mechanisms, that is to say characterized by ROCK enzyme aberrant activity and/or wherein an inhibition of activity is desirable and in particular through the selective inhibition of the ROCK enzyme isoforms over other Kinases.

In another aspect, the present invention provides a method for prevention and/or treatment of any disease associated with ROCK enzyme mechanisms as above defined, said method comprises administering to a patient in need of such treatment a therapeutically effective amount of a compound of the invention.

In a particular aspect the compounds of the invention are used alone or combined with other active ingredients and may be administered for the prevention and/or treatment of a pulmonary disease including asthma, chronic obstructive pulmonary disease (COPD), idiopathic pulmonary fibrosis (IPF), pulmonary hypertension (PH) and specifically pulmonary arterial hypertension (PAH).

DETAILED DESCRIPTION OF THE INVENTION

Definitions

The term "Pharmaceutically acceptable salts" refers to derivatives of compounds of formula (I) wherein the parent compound is suitably modified by converting any of the free acid or basic group, if present, into the corresponding addition salt with any base or acid conventionally intended as being pharmaceutically acceptable.

Suitable examples of said salts may thus include mineral or organic acid addition salts of basic residues such as amino groups, as well as mineral or organic basic addition salts of acid residues such as carboxylic groups.

Cations of inorganic bases which can be suitably used to prepare salts of the invention comprise ions of alkali or alkaline earth metals such as potassium, sodium, calcium or magnesium. Those obtained by reacting the main compound, functioning as a base, with an inorganic or organic acid to form a salt comprise, for example, salts of hydrochloric, hydrobromic, sulfuric, phosphoric, methane sulfonic, camphor sulfonic, acetic, oxalic, maleic, fumaric, succinic and citric acids.

Many organic compounds can form complexes with solvents in which they are reacted or from which they are precipitated or crystallized. These complexes are known as "solvates" which are a further object of the invention. Polymorphs and crystalline forms of compounds of formula (I), or of pharmaceutically acceptable salts, or solvates thereof are a further object of the invention.

The term "Halogen" or "halogen atoms" includes fluorine, chlorine, bromine, and iodine atom; meaning Fluoro, Chloro, Bromo, Iodo as substituent.

The term "$(C_1-C_6)$Alkyl" refers to straight-chained or branched alkyl groups wherein the number of carbon atoms is in the range 1 to 6. Particular alkyl groups are for example methyl, ethyl, n-propyl, isopropyl, t-butyl, and the like.

The expressions "$(C_1-C_6)$Haloalkyl" refer to the above defined "$(C_1-C_6)$alkyl" groups wherein one or more hydrogen atoms are replaced by one or more halogen atoms, which can be the same or different from each other. Examples include halogenated, poly-halogenated and fully halogenated alkyl groups wherein all of the hydrogen atoms are replaced by halogen atoms, e.g. trifluoromethyl or difluoro methyl groups.

By way of analogy, the terms "$(C_1-C_6)$Hydroxyalkyl" and "$(C_1-C_6)$aminoalkyl" refer to the above defined "$(C_1-C_6)$alkyl" groups wherein one or more hydrogen atoms are replaced by one or more hydroxy (OH) or amino group respectively, examples being hydroxymethyl and aminomethyl and the like.

The definition of aminoalkyl encompasses alkyl groups (i.e. "$(C_1-C_6)$alkyl" groups) substituted by one or more amino group ($-NR_8R_9$). An example of aminoalkyl is a mono-aminoalkyl group such as $R_8R_9N-(C_1-C_6)$alkyl. The substituent $R_8$ and $R_9$ they are defined as $R_4$ and $R_5$ in the detailed description of the invention herebelow.

The term "$(C_3-C_{10})$cycloalkyl" likewise "$(C_3-C_8)$cycloalkyl" or "$(C_3-C_6)$cycloalkyl" refers to saturated cyclic hydrocarbon groups containing the indicated number of ring carbon atoms. Examples include cyclopropyl, cyclobutyl, cyclopentyl, cyclohexyl and cycloheptyl, and polycyclic ring systems such as adamantan-yl.

The expression "Aryl" refers to mono, bi- or tri-cyclic carbon ring systems which have 6 to 20, preferably from 6 to 15 ring atoms, wherein at least one ring is aromatic.

The expression "heteroaryl" refers to mono-, bi- or tri-cyclic ring systems with 5 to 20, preferably from 5 to 15 ring atoms, in which at least one ring is aromatic and in which at least one ring atom is a heteroatom (e.g. N, S or O).

Examples of aryl or heteroaryl monocyclic ring systems include, for instance, phenyl, thienyl, pyrrolyl, pyrazolyl, imidazolyl, isoxazolyl, oxazolyl, isothiazolyl, thiazolyl, pyridinyl, pyrimidinyl, pyrazinyl, pyridazinyl, triazinyl, furanyl radicals and the like.

Examples of aryl or heteroaryl bicyclic ring systems include naphthalenyl, biphenylenyl, purinyl, pteridinyl, pyrazolopyrimidinyl, benzotriazolyl, benzoimidazole-yl, quinolinyl, isoquinolinyl, indolyl, isoindolyl, indazolyl, benzothiopheneyl, benzodioxinyl, dihydrobenzodioxinyl, indenyl, dihydro-indenyl, dihydrobenzo[1,4]dioxinyl, benzothiazole-2-yl, dihydrobenzodioxepinyl, benzooxazinyl, 1,2,3,4-tetrahydroisoquinoline-yl, 4,5,6,7-tetrahydrothiazolo[4,5-c]pyridine, 4,5,6,7-tetrahydrobenzo[d]thiazol-2-yl, 5,6,7,8-tetrahydro-1,7-naphthyridine, radicals and the like.

Examples of aryl or heteroaryl tricyclic ring systems include fluorenyl radicals as well as benzocondensed derivatives of the aforementioned heteroaryl bicyclic ring systems.

The derived expression "$(C_3-C_{10})$heterocycloalkyl" likewise "$(C_3-C_8)$heterocycloalkyl" or "$(C_3-C_6)$heterocycloalkyl" refers to saturated or partially unsaturated mono, bi- or tri-cycloalkyl groups of the indicated number of carbons, in which at least one ring carbon atom is replaced by at least one heteroatom (e.g. N, NH, S or O) and/or may bear an -oxo (═O) substituent group. Said heterocycloalkyl (i.e. heterocyclic radical or group) is further optionally substituted on the available points in the ring, namely on a carbon atom, or on an heteroatom available for substitution. Examples of heterocycloalkyl are represented by: oxetanyl, tetrahydrofuranyl, pyrrolidinyl, imidazolidinyl, thiazolidinyl, piperazinyl, piperidinyl, morpholinyl, thiomorpholinyl, dihydro- or tetrahydro-pyridinyl, tetrahydropyranyl, pyranyl, 2H- or 4H-pyranyl, dihydro- or tetrahydrofuranyl, dihydroisoxazolyl, pyrrolidin-2-one-yl, dihydropyrrolyl, 5-oxopyrrolidin-3-yl, (1R,5S,6r)-3-oxabicyclo[3.1.0]hexan-6-yl, octahydrocyclopenta[c]pyrrol-5-yl, 4,5,6,7-tetrahydropyrazolo[1,5-a]pyrazin-2-yl, 4,5,6,7-tetrahydrothiazolo[5,4-c]pyridin-2-yl 4,5,6,7-tetrahydrothiazolo[4,5-c]pyridine-2-yl radicals and the like.

The term "Aryl($C_1-C_6$)alkyl" refers to an aryl ring linked to a straight-chained or branched alkyl groups wherein the number of constituent carbon atoms is in the range from 1 to 6, e.g. phenylmethyl (i.e. benzyl), phenylethyl or phenylpropyl.

Likewise the term "Heteroaryl($C_1-C_6$)alkyl" refers to an heteroaryl ring linked to a straight-chained or branched alkyl groups wherein the number of constituent carbon atoms is in the range from 1 to 6, e.g. furanylmethyl.

The term "alkanoyl", refers to HC(O)— or to alkylcarbonyl groups (e.g. ($C_1-C_6$)alkylC(O)—) wherein the group "alkyl" has the meaning above defined. Examples include formyl, acetyl, propanoyl, butanoyl.

The term "($C_1-C_{10}$) alkoxy" or "($C_1-C_{10}$) alkoxyl", likewise "($C_1-C_6$) alkoxy" or "($C_1-C_6$) alkoxyl" etc., refers to a straight or branched hydrocarbon of the indicated number of carbons, linked to the rest of the molecule through an oxygen bridge. "($C_1-C_6$)Alkylthio" refers to the above hydrocarbon linked through a sulfur bridge.

The derived expression "($C_1-C_6$)haloalkoxy" or "($C_1-C_6$) haloalkoxyl" refers to the above defined haloalkyl, linked through an oxygen bridge. An example of ($C_1-C_6$)haloalkoxy is trifluoromethoxy.

Likewise derived expression "($C_3-C_6$)heterocycloalkyl-($C_1-C_6$)alkyl" and "($C_3-C_6$)cycloalkyl-($C_1-C_6$) alkyl" refer to the above defined heterocycloalkyl and cycloalkyl groups linked to the rest of the molecule via an alkyl group of the indicated number of carbons, corresponding e.g. to linear formula ($C_3-C_6$)heterocycloalkyl-$(CH_2)_m$— or ($C_3-C_6$)cycloalkyl-$(CH_2)_m$- for example piperidin-4-yl-methyl, cyclohexylethyl.

The derived expression "($C_1-C_6$)alkoxy-($C_1-C_6$)alkyl" refers to the above defined alkoxy group linked to the rest of the molecule via an alkyl group of the indicated number of carbons, for example methoxymethyl.

Likewise "($C_1-C_6$)haloalkoxy ($C_1-C_6$)alkyl" refers to the above defined ($C_1-C_6$)haloalkoxy" group linked to the rest of the molecule via an alkyl group of the indicated number of carbons, for example difluoromethoxypropyl.

An oxo moiety is represented by (O) as an alternative to the other common representation, e.g. (═O). Thus, in terms of general formula, the carbonyl group is herein preferably represented as —C(O)— as an alternative to the other common representations such as —CO—, —(CO)— or —C(═O)—. In general the bracketed group is a lateral group, not included into the chain, and brackets are used, when deemed useful, to help disambiguating linear chemical formulas; e.g. the sulfonyl group —$SO_2$— might be also represented as —$S(O)_2$— to disambiguate e.g. with respect to the sulfinic group —S(O)O—.

Likewise the group —$(CHR_3)_n$—$R_2$ herein is a linear representation of the terminal part of the characterizing group

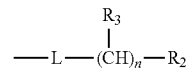

found in formula (I) and (Ia).

When a numerical index the statement (value) "p is zero" or "p is 0" means that the substituent or group bearing the index p (e.g. (R)p) is absent, that is to say no substituent, other than H when needed, is present. Likewise when the index is attached to a bridging divalent group (e.g. $(CH_2)n$) the statement "n in each occurrence is zero . . . " or "n is 0" means that the bridging group is absent, that is to say it is a bond.

Whenever basic amino or quaternary ammonium groups are present in the compounds of formula (I), physiological acceptable anions, selected among chloride, bromide, iodide, trifluoroacetate, formate, sulfate, phosphate, methanesulfonate, nitrate, maleate, acetate, citrate, fumarate, tartrate, oxalate, succinate, benzoate, p-toluenesulfonate, pamoate and naphthalene disulfonate may be present. Likewise, in the presence of acidic groups such as COOH groups, corresponding physiological cation salts may be present as well, for instance including alkaline or alkaline earth metal ions.

Compounds of formula (I) when contain one or more stereogenic center, may exist as stereoisomers.

Where the compounds of the invention have at least one stereogenic center, they may accordingly exist as enantiomers. Where the compounds of the invention possess two or more stereogenic centers, they may additionally exist as diastereoisomers. It is to be understood that all such single enantiomers, diastereoisomers and mixtures thereof in any proportion are encompassed within the scope of the present invention. The absolute configuration (R) or (S) for carbon bearing a stereogenic center is assigned on the basis of Cahn-Ingold-Prelog nomenclature rules based on groups' priorities.

"Single stereoisomer", "single diastereoisomer" or "single enantiomer", when reported near the chemical name of a compound indicate that the isomer was isolated as single diastereoisomer or enantiomer (e.g via chiral chromatography) but the absolute configuration at the relevant stereogenic center was not determined/assigned.

Atropisomers result from hindered rotation about single bonds where the steric strain barrier to rotation is high enough to allow for the isolation of the conformers (Bringmann G et al, Angew. Chemie Int. Ed. 44 (34), 5384-5427, 2005. doi:10.1002/anie.200462661).

Oki defined atropisomers as conformers that interconvert with a half-life of more than 1000 seconds at a given temperature (Oki M, Topics in Stereochemistry 14, 1-82, 1983).

Atropisomers differ from other chiral compounds in that in many cases they can be equilibrated thermally whereas in the other forms of chirality isomerization is usually only possible chemically.

Separation of atropisomers is possible by chiral resolution methods such as selective crystallization. In an atropo-enantioselective or atroposelective synthesis one atropisomer is formed at the expense of the other. Atroposelective synthesis may be carried out by use of chiral auxiliaries like a Corey Bakshi Shibata (CBS) catalyst, an asymmetric catalyst derived from proline, or by approaches based on thermodynamic equilibration when an isomerization reaction favors one atropisomer over the other.

Racemic forms of compounds of formula (I) as well as the individual atropisomers (substantially free of its corresponding enantiomer) and stereoisomer-enriched atropisomers mixtures are included in the scope of the present invention.

The invention further concerns the corresponding deuterated derivatives of compounds of formula (I). In the context of the present invention, deuterated derivative means that the at least one position occupied by a hydrogen atom is occupied by deuterium in an amount above its natural abundance. Preferably, the percent of deuterium at that position is at least 90%, more preferably at least 95%, even more preferably 99%.

All preferred groups or embodiments described above and herebelow for compounds of formula (I) may be combined among each other and apply as well mutatis mutandis.

As above mentioned, the present invention refers to compounds of general formula (I) as reported below, acting as ROCK inhibitors, to processes for the preparation thereof, pharmaceutical compositions comprising them either alone or in combination with one or more active ingredient, in admixture with one or more pharmaceutically acceptable carrier.

In a first aspect the present invention is directed to a class of compounds, of formula (I)

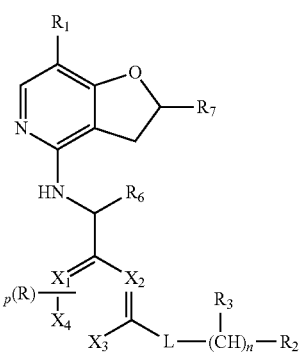

I wherein $X_1$, $X_2$, $X_3$ and $X_4$ are all CH or one of $X_1$, $X_2$, $X_3$ and $X_4$ is N and the others are CH;

p is zero or an integer from 1 to 4;

each R, when present, is selected from $(C_1\text{-}C_6)$alkyl and halogen in each occurrence independently selected from F, Cl, Br and I; wherein preferably R is F, Cl or methyl;

$R_1$ is pyridinyl, preferably pyridin-4-yl, optionally substituted by one or more groups selected from halogen, —$(CH_2)_m NH_2$, $(C_1\text{-}C_6)$alkyl, $(C_1\text{-}C_6)$ alkoxy;

L is —C(O)NH— or —NHC(O)—;

n is in each occurrence independently 0 (i.e. $R_3$ is absent) or an integer selected from 1, 2 or 3;

$R_2$ and $R_3$ are in each occurrence independently selected from the group consisting of —H,
halogen,
—OH,
—$(CH_2)_m NR_4 R_5$,
$(C_1\text{-}C_6)$alkyl,
$(C_1\text{-}C_6)$hydroxyalkyl,
$(C_1\text{-}C_6)$ alkoxy,
$(C_1\text{-}C_6)$ alkoxy $(C_1\text{-}C_6)$alkyl,
$(C_1\text{-}C_6)$haloalkyl,
$(C_1\text{-}C_6)$haloalkoxy,
$(C_1\text{-}C_6)$haloalkoxy $(C_1\text{-}C_6)$alkyl,
$(C_3\text{-}C_{10})$cycloalkyl,
aryl, heteroaryl and $(C_3\text{-}C_6)$heterocycloalkyl,
each of which cycloalkyl, aryl, heteroaryl and heterocycloalkyl
is in its turn optionally and independently substituted with one or more groups selected from
halogen,
—OH,
$(C_1\text{-}C_6)$alkyl,
$(C_1\text{-}C_6)$hydroxyalkyl,
$(C_1\text{-}C_6)$ alkoxy,
$(C_1\text{-}C_6)$ alkoxy $(C_1\text{-}C_6)$alkyl,
$(C_1\text{-}C_6)$haloalkyl,
$(C_1\text{-}C_6)$haloalkoxy,
—$(CH_2)_m NR_4 R_5$,
—O—$(CH_2)_m NR_4 R_5$,
alkanoyl,
aryl, heteroaryl, cycloalkyl,
aryl-$(C_1\text{-}C_6)$alkyl,
$(C_3\text{-}C_6)$heterocycloalkyl,
$(C_3\text{-}C_8)$heterocycloalkyl-$(C_1\text{-}C_6)$alkyl,
each of said aryl, heteroaryl, cycloalkyl, heterocycloalkyl is still further optionally substituted by one or more group selected independently from halogen, —OH, $(C_1\text{-}C_8)$alkyl, $(C_1\text{-}C_6)$haloalkyl, $(C_1\text{-}C_6)$hydroxyalkyl;

m is in each occurrence independently 0 or an integer selected from 1, 2 or 3;

$R_4$ and $R_5$, the same or different, are selected from the group consisting of —H,
$(C_1\text{-}C_6)$alkyl,
$(C_1\text{-}C_6)$haloalkyl,
$(C_1\text{-}C_6)$hydroxyalkyl,
$(C_3\text{-}C_6)$heterocycloalkyl;

$R_6$ and $R_7$ are independently selected from the group consisting of —H, $(C_1\text{-}C_6)$alkyl;

single enantiomers, diastereoisomers and mixtures thereof in any proportion and/or pharmaceutically acceptable salts and solvates thereof.

In a preferred embodiment the invention is directed to a compound of formula (I) wherein $X_3$ and $X_4$ are all CH groups and $X_1$ or $X_2$ are in the alternative independently a CH group or a nitrogen atom;

all the other variables being as defined above.

Said preferred group of compounds is represented by the formula (Ia)

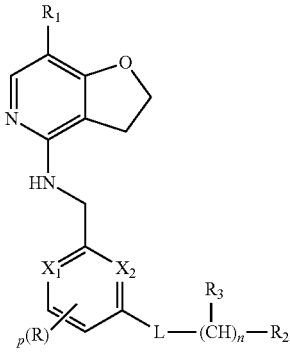

Particularly preferred are compound of formula (I) as above defined,
wherein $X_1$, $X_2$, $X_3$, $X_4$ are all CH group
each R, when present, is halogen in each occurrence independently selected from F, Cl, Br and I, wherein preferably R is F;
$R_1$ is pyridinyl, preferably pyridin-4yl, optionally substituted by one or more group selected from Fluoro and amino;
L is —C(O)NH—;
n is 0 or 1;
$R_2$ and $R_3$ are in each occurrence independently selected from the group consisting of —H, $(C_1$-$C_6)$alkyl, $(C_1$-$C_6)$haloalkyl, $(C_3$-$C_{10})$cycloalkyl;
each of which cycloalkyl is in its turn optionally and independently substituted with at least one group selected from —OH and $(C_1$-$C_6)$hydroxyalkyl,
all the other variables being as defined above;
single enantiomers, diastereoisomers and mixtures thereof in any proportion and/or pharmaceutically acceptable salts and solvates thereof.

Particularly preferred in this last embodiment is a compound wherein the group —$(CHR_3)_n$—$R_2$ is selected from methyl, ethyl, propyl, fluoropropyl, cyclopropyl, cyclopropylmethyl, (1-hydroxycyclopropyl)methyl, 3-(hydroxymethyl)cyclobutyl;
all the other variables being as defined above,
or pharmaceutically acceptable salts and solvates thereof.

The group —$(CHR_3)_n$—$R_2$ herein is a linear representation of the terminal part of the characterizing group

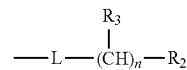

in formula (I) and (Ia).
Thus, a group of particularly preferred compounds are:

| Example | Chemical Name |
|---|---|
| 4 | N-(3-fluoropropyl)-3-(((7-(pyridin-4-yl)-2,3-dihydrofuro[3,2-c]pyridin-4-yl)amino)methyl)benzamide |
| 9 | N-((1-hydroxycyclopropyl)methyl)-3-(((7-(pyridin-4-y1)-2,3-dihydrofuro[3,2-c]pyridin-4-yl)amino)methyl)benzamide |
| 12 | N-(cyclopropylmethyl)-3-(((7-(pyridin-4-y1)-2,3-dihydrofuro[3,2-c]pyridin-4-y1)amino)methyl)benzamide |
| 13 | N-(3-(hydroxymethyl)cyclobutyl)-3-(((7-(pyridin-4-yl)-2,3-dihydrofuro[3,2-c]pyridin-4-yl)amino)methyl)benzamide |
| 16 | N-cyclopropyl-3-(((7-(pyridin-4-y1)-2,3-dihydrofuro[3,2-c]pyridin-4-yl)amino)methyl)benzamide |
| 20 | N-methyl-3-(((7-(pyridin-4-y1)-2,3-dihydrofuro[3,2-c]pyridin-4-yl)amino)methyl)benzamide |
| 45 | 3-(((7-(3-fluoropyridin-4-yl)-2,3-dihydrofuro[3,2-c]pyridin-4-yl)amino)methyl)-N-methylbenzamide |
| 46 | 3-(((7-(2-amino-3-fluoropyridin-4-yl)-2,3-dihydrofuro[3,2-c]pyridin-4-yl)amino)methyl)-N-methylbenzamide |

In another preferred embodiment the invention is directed to a compound of formula (I) wherein $X_1$, $X_2$, $X_3$ and $X_4$ are all CH;
p is zero;
$R_1$ is pyridinyl, preferably pyridin-4yl, optionally substituted by one or more group selected from halogen, —$(CH_2)_mNR_4R_5$, $(C_1-C_6)$alkyl;
L is —C(O)NH— or —NHC(O)—;
n is in each occurrence independently 0 or an integer selected from 1, 2 or 3;
$R_3$ when present is H or $(C_1-C_6)$hydroxyalkyl, and
$R_2$ is selected from the group consisting of
aryl, heteroaryl and $(C_3-C_6)$heterocycloalkyl,
each of which aryl, heteroaryl and heterocycloalkyl
is in its turn optionally and independently substituted with one or more groups selected from
$(C_1-C_6)$alkyl,
$(C_1-C_6)$hydroxyalkyl,
$(C_1-C_6)$ alkoxy,
—$(CH_2)_mNR_4R_5$,
alkanoyl,
$(C_3-C_6)$heterocycloalkyl,
$(C_3-C_8)$heterocycloalkyl-$(C_1-C_6)$alkyl;
m is in each occurrence independently 0 or an integer selected from 1, 2 or 3;
$R_4$ and $R_5$, the same or different, are selected from the group consisting of —H and $(C_1-C_6)$alkyl,
all the other variables being as defined above;
single enantiomers, diastereoisomers and mixtures thereof in any proportion and/or pharmaceutically acceptable salts and solvates thereof.
Particularly preferred in this last embodiment is a compound wherein
n is 0;
$R_2$ is selected from 5-methyl-4,5,6,7-tetrahydrothiazolo[4,5-c]pyridine-2-yl, 5-(oxetan-3-yl)-4,5,6,7-tetrahydrothiazolo[4,5-c]pyridine-2-yl, 2-(oxetan-3-yl)octahydrocyclopenta[c]pyrrol-5-yl;
all the other variables and substitution being as defined above,
single enantiomers, diastereoisomers and mixtures thereof in any proportion and/or pharmaceutically acceptable salts and solvates thereof.
A further preferred group of compounds according to the invention are those of formula (I) wherein
$X_1$, $X_2$, $X_3$ and $X_4$ are all CH or one of $X_1$, $X_2$, $X_3$ and $X_4$ is N and the others are CH;
p is zero;
$R_1$ is pyridinyl, preferably pyridin-4yl, optionally substituted by one or more group selected from F, —$NH_2$, methyl;
L is —C(O)NH— or —NHC(O)—;
n is in each occurrence independently 0 or an integer selected from 1, 2 or 3;
$R_2$ and $R_3$ are in each occurrence independently selected from the group consisting of
—H,
—$(CH_2)_mNR_4R_5$, which is (dimethylamino)ethyl (where m=2, $R_4=R_5$=methyl),
$(C_1-C_6)$alkyl which is methyl, $(C_1-C_6)$haloalkyl which is 3-fluoropropyl,
$(C_3-C_{10})$cycloalkyl which is cyclopropyl, cyclobutyl,
Aryl which is phenyl,
Heteroaryl which is pyrazol-yl, imidazol-4-yl, oxazol-4-yl, isoxazolyl, thiazol-yl, pyridinyl, pyrimidinyl, 4,5,6,7-tetrahydropyrazolo[1,5-a]pyrazin-2-yl, 4,5,6,7-tetrahydrothiazolo[5,4-c]pyridin-2-yl, 1,2,3,4-tetrahydroisoquinoline-6yl, 1H-indole-5yl, 1H-indazole-5yl, and
$(C_3-C_6)$heterocycloalkyl which is piperidinyl, piperazin-1-yl, pyridazin-3-yl, morpholinyl, 5-oxopyrrolidin-3-yl, tetrahydro-2H-pyran-4-yl,
each of which cycloalkyl, aryl, heteroaryl and heterocycloalkyl
is in its turn optionally and independently substituted with one or more groups selected from
—OH,
$(C_1-C_6)$alkyl, which is methyl
$(C_1-C_6)$hydroxyalkyl which is hydroxymethyl,
$(C_1-C_6)$ alkoxy which is methoxy,
—$(CH_2)_nNR_4R_5$ which is (dimethylamino)methyl, (dimethylamino)ethyl, wherein $R_4$ and $R_5$ are methyl and n is 1 or 2,
alkanoyl which is acetyl,
$(C_3-C_6)$heterocycloalkyl which is oxetan-3-yl,
$(C_3-C_8)$heterocycloalkyl-$(C_1-C_6)$alkyl which is morpholinomethyl, pyrrolidin-1-ylmethyl,
$R_6$ is —H, and $R_7$ is —H, or methyl;
single enantiomers, diastereoisomers and mixtures thereof in any proportion and/or pharmaceutically acceptable salts and solvates thereof.

The invention also provides a pharmaceutical composition comprising a compound of formula (I), or a pharmaceutically acceptable salt thereof in admixture with one or more pharmaceutically acceptable carrier or excipient, either alone or in combination with one or more further active ingredient as detailed below.

According to specific embodiments, the invention provides the compounds listed in the table below single enantiomers, diastereoisomers and mixtures thereof in any proportion and/or pharmaceutically acceptable salts and solvates thereof.

| Example | Chemical Name |
| --- | --- |
| 1 | 3-(((7-(pyridin-4-yl)-2,3-dihydrofuro[3,2-c]pyridin-4-yl)amino)methyl)-N-(5-(pyrrolidin-1-ylmethyl)thiazol-2-yl)benzamide |
| 2 | N-((5-methylisoxazol-3-yl)methyl)-3-(((7-(pyridin-4-yl)-2,3-dihydrofuro[3,2-c]pyridin-4-yl)amino)methyl)benzamide |
| 3 | N-((1-methyl-1H-imidazol-4-yl)methyl)-3-(((7-(pyridin-4-yl)-2,3-dihydrofuro[3,2-c]pyridin-4-yl)amino)methyl)benzamide |
| 4 | N-(3-fluoropropyl)-3-(((7-(pyridin-4-yl)-2,3-dihydrofuro[3,2-c]pyridin-4-yl)amino)methyl)benzamide |
| 5 | 3-(((7-(pyridin-4-y1)-2,3-dihydrofuro[3,2-c]pyridin-4-yl)amino)methyl)-N-(pyrimidin-5-ylmethyl)benzamide |
| 6 | N-(isoxazol-3-ylmethyl)-3-(((7-(pyridin-4-y1)-2,3-dihydrofuro[3,2-c]pyridin-4-yl)amino)methyl)benzamide |
| 7 | 3-(((7-(pyridin-4-y1)-2,3-dihydrofuro[3,2-c]pyridin-4-yl)amino)methyl)-N-(tetrahydro-2H-pyran-4-yl)benzamide |

-continued

| Example | Chemical Name |
|---|---|
| 8 | N-(oxazol-4-ylmethyl)-3-(((7-(pyridin-4-yl)-2,3-dihydrofuro[3,2-c]pyridin-4-yl)amino)methyl)benzamide |
| 9 | N-((1-hydroxycyclopropyl)methyl)-3-(((7-(pyridin-4-yl)-2,3-dihydrofuro[3,2-c]pyridin-4-yl)amino)methyl)benzamide |
| 10 | N-((4-methylmorpholin-2-yl)methyl)-3-(((7-(pyridin-4-yl)-2,3-dihydrofuro[3,2-c]pyridin-4-yl)amino)methyl)benzamide |
| 11 | N-(pyridin-4-yl)-3-(((7-(pyridin-4-yl)-2,3-dihydrofuro[3,2-c]pyridin-4-yl)amino)methyl)benzamide |
| 12 | N-cyclopropylmethyl)-3-(((7-(pyridin-4-yl)-2,3-dihydrofuro[3,2-c]pyridin-4-yl)amino)methyl)benzamide |
| 13 | N-(3-(hydroxymethyl)cyclobutyl)-3-(((7-(pyridin-4-yl)-2,3-dihydrofuro[3,2-c]pyridin-4-yl)amino)methyl)benzamide |
| 14 | N-(5-methoxypyridin-2-yl)-3-(((7-(pyridin-4-yl)-2,3-dihydrofuro[3,2-c]pyridin-4-yl)amino)methyl)benzamide |
| 15 | N-((1-(tert-butyl)-5-oxopyrrolidin-3-yl)methyl)-3-(((7-(pyridin-4-yl)-2,3-dihydrofuro[3,2-c]pyridin-4-yl)amino)methyl)benzamide |
| 16 | N-cyclopropyl-3-(((7-(pyridin-4-yl)-2,3-dihydrofuro[3,2-c]pyridin-4-yl)amino)methyl)benzamide |
| 17 | N-(pyridazin-3-yl)-3-(((7-(pyridin-4-yl)-2,3-dihydrofuro[3,2-c]pyridin-4-yl)amino)methyl)benzamide |
| 18 | 3-(((7-(pyridin-4-yl)-2,3-dihydrofuro[3,2-c]pyridin-4-yl)amino)methyl)-N-(pyrimidin-4-yl)benzamide |
| 19 | N-((1-methyl-1H-pyrazol-3-yl)methyl)-3-(((7-(pyridin-4-yl)-2,3-dihydrofuro[3,2-c]pyridin-4-yl)amino)methyl)benzamide |
| 20 | N-methyl-3-(((7-(pyridin-4-yl)-2,3-dihydrofuro[3,2-c]pyridin-4-yl)amino)methyl)benzamide |
| 21 | N-(5-methyl-4,5,6,7-tetrahydropyrazolo[1,5-a]pyrazin-2-yl)-3-(((7-(pyridin-4-yl)-2,3-dihydrofuro[3,2-c]pyridin-4-yl)amino)methyl)benzamide |
| 22 | N-(2-(1-methylpiperidin-4-yl)ethyl)-3-(((7-(pyridin-4-yl)-2,3-dihydrofuro[3,2-c]pyridin-4-yl)amino)methyl)benzamide |
| 23 | N-(5-methyl-4,5,6,7-tetrahydrothiazolo[5,4-c]pyridin-2-yl)-3-(((7-(pyridin-4-yl)-2,3-dihydrofuro[3,2-c]pyridin-4-yl)amino)methyl)benzamide |
| 24 | (S)-N-(2-hydroxy-1-phenylethyl)-3-(((7-(pyridin-4-yl)-2,3-dihydrofuro[3,2-c]pyridin-4-yl)amino)methyl)benzamide |
| 25 | 3-(((7-(pyridin-4-yl)-2,3-dihydrofuro[3,2-c]pyridin-4-yl)amino)methyl)-N-(2-(pyridin-4-yl)ethyl)benzamide |
| 26 | N-(3-((dimethylamino)methyl)phenyl)-3-(((7-(pyridin-4-yl)-2,3-dihydrofuro[3,2-c]pyridin-4-yl)amino)methyl)benzamide |
| 27 | N-(3-((dimethylamino)methyl)benzyl)-3-(((7-(pyridin-4-yl)-2,3-dihydrofuro[3,2-c]pyridin-4-yl)amino)methyl)benzamide |
| 28 | N-(2-morpholinoethyl)-3-(((7-(pyridin-4-yl)-2,3-dihydrofuro[3,2-c]pyridin-4-yl)amino)methyl)benzamide |
| 29 | N-(2-(pyridin-3-yl)ethyl)-3-(((7-(pyridin-4-yl)-2,3-dihydrofuro[3,2-c]pyridin-4-yl)amino)methyl)benzamide |
| 30 | N-(2-(piperidin-1-yl)ethyl)-3-(((7-(pyridin-4-yl)-2,3-dihydrofuro[3,2-c]pyridin-4-yl)amino)methyl)benzamide |
| 31 | N-(6-methoxypyrimidin-4-yl)-3-(((7-(pyridin-4-yl)-2,3-dihydrofuro[3,2-c]pyridin-4-yl)amino)methyl)benzamide |
| 32 | 3-(4-methylpiperidin-1-yl)-N-(3-(((7-(pyridin-4-yl)-2,3-dihydrofuro[3,2-c]pyridin-4-yl)amino)methyl)phenyl)propanamide |
| 33 | 3-(morpholinomethyl)-N-(3-(((7-(pyridin-4-yl)-2,3-dihydrofuro[3,2-c]pyridin-4-yl)amino)methyl)phenyl)benzamide |
| 34 | 5-methyl-N-(3-(((7-(pyridin-4-yl)-2,3-dihydrofuro[3,2-c]pyridin-4-yl)amino)methyl)phenyl)-4,5,6,7-tetrahydrothiazolo[5,4-c]pyridine-2-carboxamide |
| 35 | 4-(4-methylpiperazin-1-yl)-N-(3-(((7-(pyridin-4-yl)-2,3-dihydrofuro[3,2-c]pyridin-4-yl)amino)methyl)phenyl)butanamide |
| 36 | 4-(morpholinomethyl)-N-(3-(((7-(pyridin-4-yl)-2,3-dihydrofuro[3,2-c]pyridin-4-yl)amino)methyl)phenyl)benzamide |
| 37 | 1-methyl-N-(3-(((7-(pyridin-4-yl)-2,3-dihydrofuro[3,2-c]pyridin-4-yl)amino)methyl)phenyl)-1H-indazole-5-carboxamide |
| 38 | 5-(oxetan-3-yl)-N-(3-(((7-(pyridin-4-yl)-2,3-dihydrofuro[3,2-c]pyridin-4-yl)amino)methyl)phenyl)-4,5,6,7-tetrahydrothiazolo[5,4-c]pyridine-2-carboxamide |
| 39 | 1-(2-(dimethylamino)ethyl)-N-(3-(((7-(pyridin-4-yl)-2,3-dihydrofuro[3,2-c]pyridin-4-yl)amino)methyl)phenyl)-1H-indole-5-carboxamide |
| 40 | N-(3-(((7-(pyridin-4-yl)-2,3-dihydrofuro[3,2-c]pyridin-4-yl)amino)methyl)phenyl)-1,2,3,4-tetrahydroisoquinoline-6-carboxamide |
| 41 | 1-(2-(dimethylamino)ethyl)-N-(3-(((7-(pyridin-4-yl)-2,3-dihydrofuro[3,2-c]pyridin-4-yl)amino)methyl)phenyl)-1H-pyrazole-4-carboxamide |
| 42 | N-(2-(1-(oxetan-3-yl)piperidin-4-yl)ethyl)-3-(((7-(pyridin-4-yl)-2,3-dihydrofuro[3,2-c]pyridin-4-yl)amino)methyl)benzamide |

-continued

| Example | Chemical Name |
|---|---|
| 43a | N-(2-(oxetan-3-yl)octahydrocyclopenta[c]pyrrol-5-yl)-3-(((7-(pyridin-4-yl)-2,3-dihydrofuro[3,2-c]pyridin-4-yl)amino)methyl)benzamide (Isomer 1) |
| 43b | N-(2-(oxetan-3-yl)octahydrocyclopenta[c]pyrrol-5-yl)-3-(((7-(pyridin-4-yl)-2,3-dihydrofuro[3,2-c]pyridin-4-yl)amino)methyl)benzamide (Isomer 2) |
| 44 | N-(2-(1-acetylpiperidin-4-yl)ethyl)-3-(((7-(pyridin-4-y1)-2,3-dihydrofuro[3,2-c]pyridin-4-yl)amino)methyl)benzamide |
| 45 | 3-(((7-(3-fluoropyridin-4-y1)-2,3-dihydrofuro[3,2-c]pyridin-4-yl)amino)methyl)-N-methylbenzamide |
| 46 | 3-(((7-(2-amino-3-fluoropyridin-4-yl)-2,3-dihydrofuro[3,2-c]pyridin-4-yl)amino)methyl)-N-methylbenzamide |
| 47 | N-(5-methyl-4,5,6,7-tetrahydrothiazolo[5,4-c]pyridin-2-yl)-3-(((7-(2-methylpyridin-4-yl)-2,3-dihydrofuro[3,2-c]pyridin-4-yl)amino)methyl)benzamide |
| 48 | N-(5-methyl-4,5,6,7-tetrahydrothiazolo[5,4-c]pyridin-2-yl)-3-(((7-(3-methylpyridin-4-yl)-2,3-dihydrofuro[3,2-c]pyridin-4-yl)amino)methyl)benzamide |
| 49 | 3-(((7-(2-aminopyridin-4-y1)-2,3-dihydrofuro[3,2-c]pyridin-4-yl)amino)methyl)-N-(5-methyl-4,5,6,7-tetrahydrothiazolo[5,4-c]pyridin-2-yl)benzamide |
| 50 | 3-(((7-(2-fluoropyridin-4-y1)-2,3-dihydrofuro[3,2-c]pyridin-4-y1)amino)methyl)-N-(5-methyl-4,5,6,7-tetrahydrothiazolo[5,4-c]pyridin-2-yl)benzamide |
| 51 | N-(5-methyl-4,5,6,7-tetrahydrothiazolo[5,4-c]pyridin-2-yl)-2-(((7-(pyridin-4-y1)-2,3-dihydrofuro[3,2-c]pyridin-4-yl)amino)methyl)isonicotinamide |
| 52 | N-(5-methyl-4,5,6,7-tetrahydrothiazolo[5,4-c]pyridin-2-yl)-6-(((7-(pyridin-4-yl)-2,3-dihydrofuro[3,2-c]pyridin-4-yl)amino)methyl)picolinamide |
| 53 | 2-((dimethylamino)methyl)-N-(3-(((7-(pyridin-4-yl)-2,3-dihydrofuro[3,2-c]pyridin-4-yl)amino)methyl)phenyl)thiazole-4-carboxamide |
| 54 | 5-methyl-N-(3-(((7-(pyridin-4-yl)-2,3-dihydrofuro[3,2-c]pyridin-4-yl)amino)methyl)phenyl)-4,5,6,7-tetrahydrothiazolo[4,5-c]pyridine-2-carboxamide |
| 55 | N-(3-(((2-methyl-7-(pyridin-4-yl)-2,3-dihydrofuro[3,2-c]pyridin-4-y1)amino)methyl)phenyl)acetamide |
| 56 | N-(5-(2-(dimethylamino)ethoxy)pyridin-2-y1)-3-(((7-(pyridin-4-y1)-2,3-dihydrofuro[3,2-c]pyridin-4-yl)amino)methyl)benzamide |

The compounds of the invention, including all the compounds hereabove listed, can be prepared from readily available starting materials using the following general methods and procedures or by using slightly modified processes readily available to those of ordinary skill in the art. Although a particular embodiment of the present invention may be shown or described herein, those skilled in the art will recognize that all embodiments or aspects of the present invention can be prepared using the methods described herein or by using other known methods, reagents and starting materials. When typical or preferred process conditions (i.e. reaction temperatures, times, mole ratios of reactants, solvents, pressures, etc.) are given, other process conditions can also be used unless otherwise stated. While the optimum reaction conditions may vary depending on the particular reactants or solvent used, such conditions can be readily determined by those skilled in the art by routine optimization procedures.

Thus, processes of preparation described below and reported in the following schemes should not be viewed as limiting the scope of the synthetic methods available for the preparation of the compounds of the invention.

In some cases a step is needed in order to mask or protect sensitive or reactive moieties, generally known protective groups (PG) could be employed, in accordance with general principles of chemistry (Protective group in organic syntheses, 3rd ed. T. W. Greene, P. G. M. Wuts). A suitable protective group for intermediates requiring protection of carboxylic acid (herein reported as $PG_1$) can be $C_1$-$C_4$ esters ($PG_1$: methyl, isopropyl, tert-butyl or ethyl), preferably methyl. A suitable protective group for intermediates requiring the amino group protection (herein reported as $PG_2$) can be carbamates such as tert-butylcarbamate ($PG_2$: tert-butoxycarbonyl or Boc), benzylcarbamate ($PG_2$: Benzyloxycarbonyl or Cbz), ethylcarbamate ($PG_2$: ethoxycarbonyl) or methylcarbamate ($PG_2$: methoxycarbonyl), preferably $PG_2$ is Boc.

The compounds of formula (I), here reported again for clarity, including all the compounds here above listed, can be generally prepared according to the procedures shown in the schemes below. Where a specific detail or step differs from the general schemes it has been detailed in the specific examples, and/or in additional schemes.

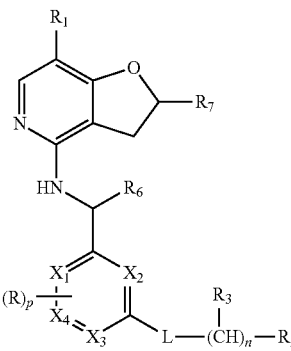

I

Compounds of formula (I) may contain one or more stereogenic centers. Enantiomerically pure compounds can be prepared according to the reactions described below, by means of enantiomerically pure starting materials and intermediates. These intermediates may be commercially available or readily produced from commercial sources by those of ordinary skill in the art.

In another approach, enantiomerically pure compounds can be prepared from the corresponding racemates by means of chiral chromatographic purification.

Stereochemically pure compounds may be obtained by chiral separation from a stereometric mixture, or (in case of more than one chiral centre) stepwise by chromatographic separation of diastereoisomers followed by further chiral separation into single stereoisomers.

Compounds of formula (I) can be prepared according to Scheme 1 that provides at least one non-limiting synthetic route for examples 1 to 44.

SCHEME 1
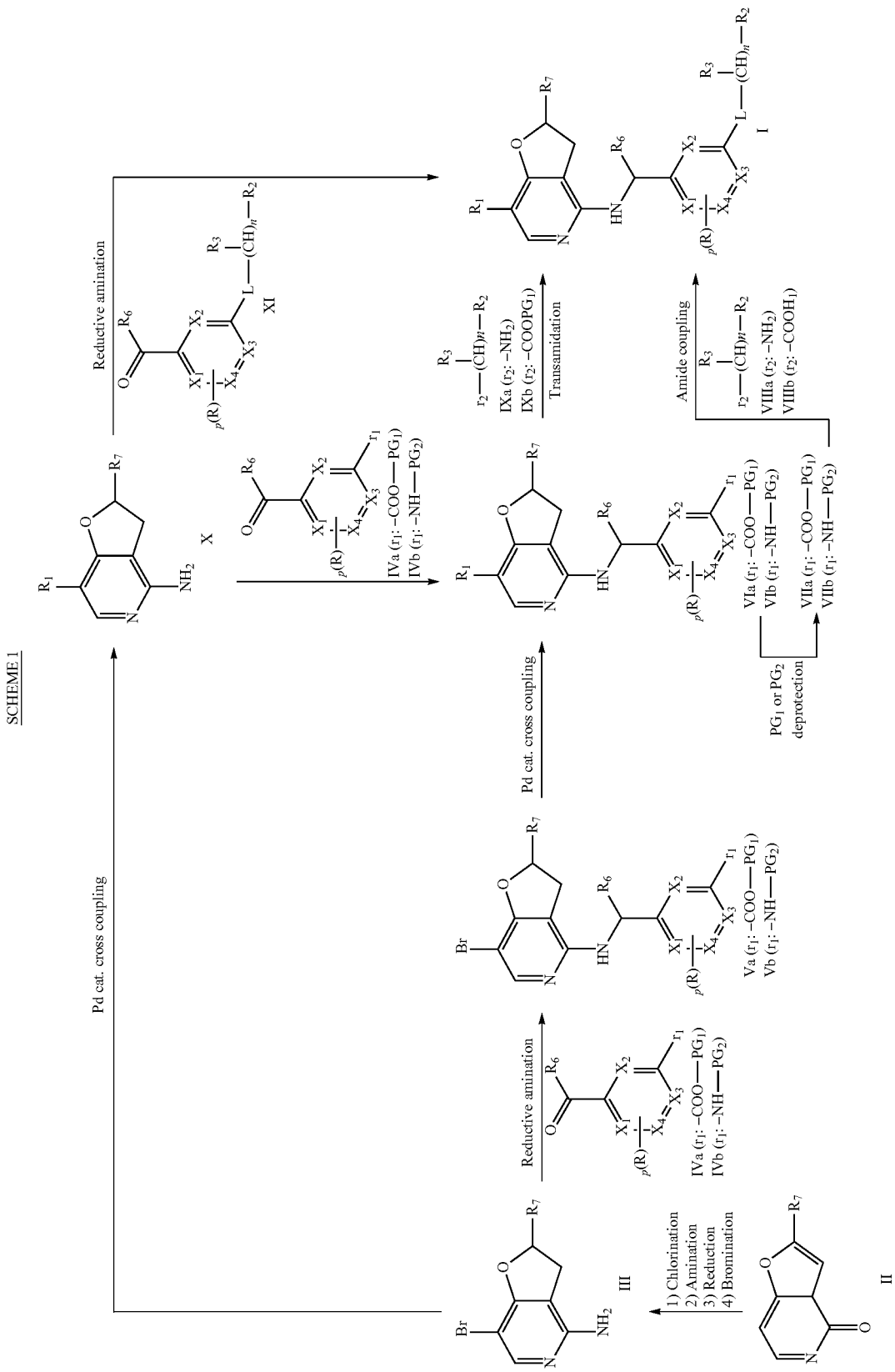

Intermediate II can be converted into intermediate III by means of four consecutive steps including 1) chlorination, 2) amination, 3) reduction and 4) bromination. For example, the chlorination step may be carried out by refluxing intermediate II with an appropriate chlorinating agent (neat or in solution) such as $POCl_3$ or $SOCl_2$.

The amination step can be carried out by introducing a masked ammonia such as benzophenone imine through a Buchwald-type palladium catalyzed reaction using, for example, tris(dibenzylideneacetone)dipalladium(0)/BINAP catalytic system followed by hydrolysis of the linked benzophenone imine using hydroxylamine to give the corresponding furo[3,2-c]pyridin-4-amine. Alternatively, the amination step can be carried out by introducing 4-methoxybenzylamine by $S_NAr$ (nucleophilic aromatic substitution) followed by acidic deprotection. Reduction of furo[3,2-c]pyridin-4-amine to give 2,3-dihydrofuro[3,2-c]pyridin-4-amine (step 3) can be carried out for example by hydrogenating a solution of the furo[3,2-c]pyridin-4-amine in MeOH/acetic acid in the presence of a Pd/C catalyst under high $H_2$ pressure (e.g. 10 bar) and at a temperature of 50° C. or higher. Finally intermediate III can be obtained by means of bromination of 2,3-dihydrofuro[3,2-c]pyridin-4-amine (step 4) by reaction with a brominating agent such as N-bromosuccinimide in a polar aprotic solvent such as acetonitrile for a few hours at low temperature (e.g. −10-0° C.).

Intermediate III and carbonyl intermediate IVa (or IVb) can be combined to give intermediate Va (or Vb) through a reductive amination reaction that can be performed in an appropriate solvent such as DCM or THF, in the presence of a Lewis acid such as chloro(triisopropoxy)titanium(IV) or titanium tetraisopropoxide(IV) followed by addition of a reducing agent such as sodium triacetoxyborohydride or sodium cyanoborohydride in the presence of an organic acid such as acetic acid or trifluoroacetic acid.

Intermediate Va (or Vb) can be converted into intermediate VIa (or VIb) by a direct introduction of group $R_1$ through a metal catalyzed cross coupling reaction such as Suzuki coupling, Stille coupling or similar (Strategic application of named reactions in organic synthesis, L. Kurti, B. Czako, Ed. 2005). For example, a Suzuki coupling can be performed by reacting intermediate Va (or Vb) with the corresponding boronic acid or boron pinacolate ester of group $R_1$, in the presence of a Pd catalyst such as tris (dibenzylideneacetone)dipalladium(0), $PdCl_2(dppf)_2$·DCM adduct or tetrakistriphenylphosphinepalladium(0), in an organic solvent such as dioxane, THF or DMF with or without water, with an inorganic base such as an alkaline carbonate (for example $Cs_2CO_3$) or an inorganic phosphate (for example $K_3PO_4$), under heating (90-150° C.). Boronic acid and boronic pinacolate esters are generally commercially available or may be readily prepared by those skilled in the art starting from commercially available reagents. Experimental procedures for the preparation of those boronic acid and boronic pinacolate esters not commercially available are reported in the experimental section.

In an alternative approach, intermediate VIa (or VIb) can be prepared from intermediate X and IVa (or IVb) by reductive amination using a similar method to that described for the transformation of intermediate III into Va (or Vb).

Intermediate X can be obtained from intermediate III using a similar process to that described above for transformation of intermediate Va (or Vb) into intermediate VIa (or VIb).

Removal of $PG_1$ (when $PG_1$ is methyl or isopropyl) from intermediate VIa to give the intermediate VIIa may be carried out by hydrolysis, using an inorganic base such as LiOH or NaOH in a mixture of an organic solvent such as THF and/or methanol with water, generally at RT and for a time ranging from 1 h to overnight.

Removal of $PG_2$ (when $PG_2$ is a Boc group) from intermediate VIb to give the intermediate VIIb may be carried out by acidic deprotection. For example, an acidic Boc cleavage may be carried out by treatment with concentrated hydrochloric acid or trifluoroacetic acid.

Reaction between acid intermediate VIIa and amino intermediate VIIIa (or acid VIIIb and amine VIIb) to give a compound of formula I may be carried out under suitable amide coupling reaction conditions. For example, acid intermediate VIIa may be reacted in the presence of an activating agent such as TBTU, HATU or COMU, with an organic base such as DIPEA or TEA, in a suitable organic solvent such as DCM or DMF, and at a temperature generally around RT for a time ranging from a few hours to overnight. An alternative amide coupling condition may be carried out by reacting intermediate VIIa and VIIIa in the presence of 1-(methylsulfonyl)-1H-benzotriazole as a coupling agent, with an organic base such as TEA, at temperature up to 150° C. for few hours (for example 4 h).

Wherein a compound of formula I contains in $R_2$ or $R_3$ a primary or secondary amine, this amino moiety needs to be masked during the amide coupling step by using suitably protected (generally Boc) intermediates VIIIa or VIIIb. The Boc protecting group can be removed by using similar methods to those described above for intermediates VIb.

In some cases, wherein a compound of formula I contains in $R_2/R_3$ a tertiary amine or a tertiary amide, such compounds can be obtained by further elaboration of a compound of formula I (wherein $R_2/R_3$ contain a secondary amine) by a reductive amination reaction or an amidation of the corresponding secondary amine using generally accepted methods.

In another approach, a compound of formula I can be synthesized from methyl ester intermediate VIa and amino intermediate IXa (or methyl ester IXb and amine VIIb) by means of a transamidation reaction. For example, a transamidation reaction can be carried out by reacting a methyl ester intermediate and an amino intermediate in a suitable organic solvent such as THF or DCM, in the presence of a suitable Lewis acid such as bis(trimethylaluminum)-1,4-diazabicyclo[2.2.2]octane adduct or $InCl_3$ at temperatures up to 120° C.

In a different approach, a compound of formula I can be prepared from intermediate X and intermediate XI by means of reductive amination using similar conditions to that described for the transformation of intermediate III into intermediate Va (or Vb).

In another approach, a compound of formula I can be prepared according to scheme 2 providing at least one non-limiting synthetic route for examples 45-56.

SCHEME 2

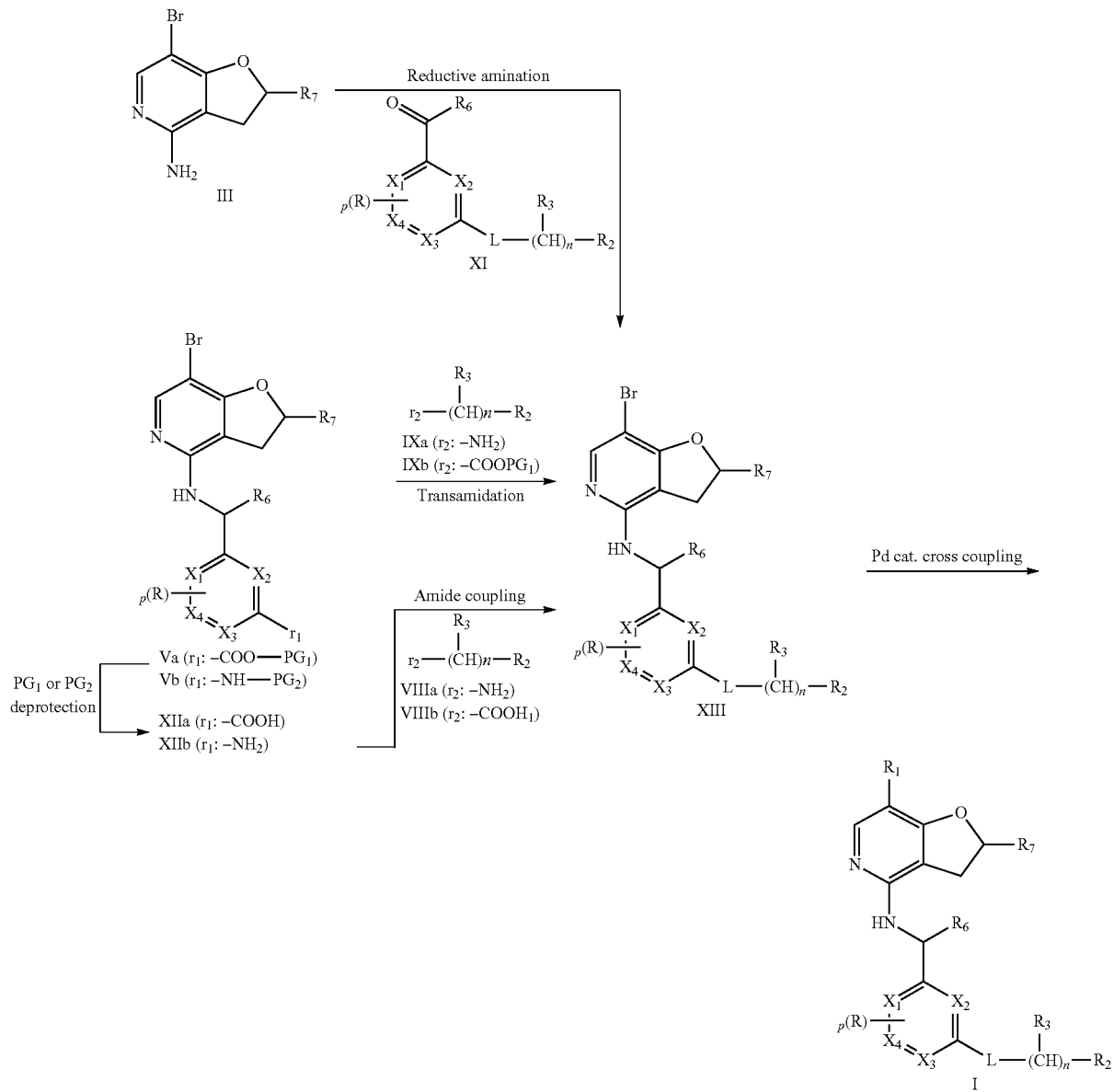

Compounds of formula I can be obtained from intermediate XIII by a direct introduction of group $R_1$ through a metal catalyzed cross coupling reaction such as Suzuki coupling, Stille coupling or similar (Strategic application of named reactions in organic synthesis, L. Kurti, B. Czako, Ed. 2005) in the same way (scheme 1) as that described for transformation of intermediate Va into VIa (or Vb into VIb). Intermediate XIII can be obtained by amide coupling of acid intermediate XIIa and amino intermediate VIIIa (or acid VIIIb and amine XIIb) using similar conditions to that described above (scheme 1) for the reaction of VIIa and intermediate VIIIa (or VIIIb and VIIb). Intermediate XIIa and XIIb can be obtained from Va and Vb respectively by deprotection of $PG_1$ and $PG_2$ according to conditions already reported in scheme 1 for intermediate VIa and VIb.

Intermediate XIII can be alternatively obtained from ester intermediate Va and amine intermediate XIa (or ester XIb and amine XIIb) by a transamidation reaction in a similar manner (scheme 1) to that described for the reaction of intermediate VIa and amino intermediate IXa (or IXb and VIIb).

Another alternative approach to the preparation of intermediate XIII consists of a reductive amination reaction between intermediate III and intermediate XI using similar conditions already reported for transformation of intermediate III into Va (or Vb) reported in scheme 1.

As herein described in details, the compounds of the invention are inhibitors of kinase activity, in particular Rho-kinase activity.

In one aspect the invention provides a compound of formula (I) for use as a medicament, preferably for the prevention and/or treatment of pulmonary disease.

In a further aspect the invention provides the use of a compound (I), or a pharmaceutically acceptable salt thereof, in the manufacture of a medicament for the treatment of disorders associated with ROCK enzymes mechanisms, particularly for the treatment of disorders such as pulmonary diseases.

In particular the invention provides compounds of formula (I) for use in the prevention and/or treatment of pulmonary disease selected from the group consisting of asthma, chronic obstructive pulmonary disease (COPD), idiopathic pulmonary fibrosis (IPF), pulmonary hypertension (PH) and specifically Pulmonary Arterial Hypertension (PAH).

Moreover the invention provides a method for the prevention and/or treatment of disorders associated with ROCK enzymes mechanisms, said method comprising administering to a patient in need of such treatment a therapeutically effective amount of a compound of the invention.

In particular the invention provides methods for the prevention and/or treatment wherein the disorder is a respiratory disease selected from asthma, chronic obstructive pulmonary disease COPD, idiopathic pulmonary fibrosis (IPF), Pulmonary hypertension (PH) and specifically Pulmonary Arterial Hypertension (PAH).

Preferred is the use of the compounds of the invention for the prevention of the aforesaid disorders.

Equally preferred is the use of the compounds of the invention for the treatment of the aforesaid disorders.

Generally speaking, compounds which are ROCK inhibitors may be useful in the treatment of many disorders associated with ROCK enzymes mechanisms.

In one embodiment, the disorders that can be treated by the compounds of the present invention include glaucoma, inflammatory bowel disease (IBD) and pulmonary diseases selected from asthma, chronic obstructive pulmonary disease (COPD), interstitial lung disease such as idiopathic pulmonary fibrosis (IPF) and pulmonary arterial hypertension (PAH).

In another embodiment, the disorder that can be treated by the compound of the present invention is selected from the group consisting of asthma, chronic obstructive pulmonary disease (COPD) and interstitial lung disease such as idiopathic pulmonary fibrosis (IPF) and pulmonary arterial hypertension (PAH).

In a further embodiment, the disorder is selected from idiopathic pulmonary fibrosis (IPF) and pulmonary arterial hypertension (PAH).

The methods of treatment of the invention comprise administering a safe and effective amount of a compound of formula (I) or a pharmaceutically acceptable salt thereof to a patient in need thereof. As used herein, "safe and effective amount" in reference to a compound of formula (I) or a pharmaceutically acceptable salt thereof or other pharmaceutically-active agent means an amount of the compound sufficient to treat the patient's condition but low enough to avoid serious side effects and it can nevertheless be routinely determined by the skilled artisan. The compounds of formula (I) or pharmaceutically acceptable salts thereof may be administered once or according to a dosing regimen wherein a number of doses are administered at varying intervals of time for a given period of time. Typical daily dosages may vary depending upon the particular route of administration chosen.

The invention also provides pharmaceutical compositions of compounds of formula (I) in admixture with one or more pharmaceutically acceptable carrier or excipient, for example those described in Remington's Pharmaceutical Sciences Handbook, XVII Ed., Mack Pub., N.Y., U.S.A.

The present invention is also directed to use of the compounds of the invention and their pharmaceutical compositions for various route of administration.

Administration of the compounds of the invention and their pharmaceutical compositions may in fact be accomplished according to patient needs, for example, orally, nasally, parenterally (subcutaneously, intravenously, intramuscularly, intrasternally and by infusion), by inhalation, rectally, vaginally, topically, locally, transdermally, and by ocular administration.

Various solid oral dosage forms can be used for administering compounds of the invention including such solid forms as tablets, gelcaps, capsules, caplets, granules, lozenges and bulk powders. The compounds of the present invention can be administered alone or combined with various pharmaceutically acceptable carriers, diluents (such as sucrose, mannitol, lactose, starches) and known excipients, including suspending agents, solubilizers, buffering agents, binders, disintegrants, preservatives, colorants, flavorants, lubricants and the like. Time release capsules, tablets and gels are also advantageous.

Various liquid oral dosage forms can also be used for administering compounds of the invention, including aqueous and non-aqueous solutions, emulsions, suspensions, syrups, and elixirs. Such dosage forms can also contain suitable known inert diluents such as water and suitable known excipients such as preservatives, wetting agents, sweeteners, flavorants, as well as agents for emulsifying and/or suspending the compounds of the invention.

The compounds of the present invention may also be injected (i.e. formulated as injectable composition) for example, intravenously, in the form of an isotonic sterile solution. Other preparations are also possible.

Suppositories for rectal administration of the compounds of the invention can be prepared by mixing the compound with a suitable excipient such as cocoa butter, salicylates and polyethylene glycols.

Formulations for vaginal administration can be in the form of cream, gel, paste, foam, or spray formula containing, in addition to the active ingredient, such as suitable carriers, are also known.

For topical administration the pharmaceutical composition can be in the form of creams, ointments, liniments, lotions, emulsions, suspensions, gels, solutions, pastes, powders, sprays, and drops suitable for administration to the skin, eye, ear or nose. Topical administration may also involve transdermal administration via means such as transdermal patches.

For the treatment of the diseases of the respiratory tract, the compounds according to the invention may also be administered by inhalation.

Some preferred compounds of the invention exhibit profile suitable for inhalatory route administration.

Optimisation of drugs for inhaled delivery needs certain characteristics that allow administered compound to the lung to maintain a sufficient local concentration (lung retention) to exert a pharmacological effect of the desired duration, and non-relevant levels in unwanted compartments (i.e. plasma). To attenuate lung absorption, one or more features of the compounds need to be optimized such as, and not limited to, minimizing membrane permeability, reducing dissolution rate or introducing a degree of basicity into the compound to enhance binding to the phospholipid-rich lung tissue or through lysosomial trapping. In some embodiments, compounds of invention show one or more of the features above that are desirable for an inhaled compound.

Other preferred compounds of the invention exhibit profile suitable for oral route administration. Optimization of drugs for oral delivery need certain characteristics that allow orally administered compound to be absorbed by GI (gastrointestinal) tract and to be poorly cleared in order to give a good bioavailability (F %), thus to maintain a sufficient concentration in plasma and target tissues for a time adequate to sustain pharmacological effect. To enhance oral bioavailability, one or more features of the compounds need to be optimized such as, and not limited to, maximizing membrane permeability and reducing metabolic hot spots (optimizing in-vitro clearance). In some embodiments, compounds of invention show one or more of the features above for an oral compound.

Inhalable preparations include inhalable powders, propellant-containing metering aerosols or propellant-free inhalable formulations.

For administration as a dry powder, single- or multi-dose inhalers known from the prior art may be utilized. In that case the powder may be filled in gelatine, plastic or other capsules, cartridges or blister packs or in a reservoir.

A diluent or carrier, usually non-toxic and chemically inert to the compounds of the invention, e.g. lactose or any other additive suitable for improving the respirable fraction may be added to the powdered compounds of the invention.

Inhalation aerosols containing propellant gas such as hydrofluoroalkanes may contain the compounds of the invention either in solution or in dispersed form. The propellant-driven formulations may also contain other ingredients such as co-solvents, stabilizers and optionally other excipients.

The propellant-free inhalable formulations comprising the compounds of the invention may be in the form of solutions or suspensions in an aqueous, alcoholic or hydroalcoholic medium and they may be delivered by jet or ultrasonic nebulizers known from the prior art or by soft-mist nebulizers such as Respimat®.

Further preferably the invention provides compounds of formula (I) and/or pharmaceutical compositions thereof, for use via inhalatory route of administration particularly in the prevention and/or treatment of asthma, chronic obstructive pulmonary disease COPD, idiopathic pulmonary fibrosis (IPF), pulmonary hypertension (PH) and specifically Pulmonary Arterial Hypertension (PAH), preferably in the prevention and/or treatment of asthma, chronic obstructive pulmonary disease COPD, idiopathic pulmonary fibrosis (IPF).

Further preferably the invention provides compounds of formula (I) and/or pharmaceutical compositions thereof, for use via oral route of administration particularly in the prevention and/or treatment of asthma, chronic obstructive pulmonary disease COPD, idiopathic pulmonary fibrosis (IPF), pulmonary hypertension (PH) and specifically Pulmonary Arterial Hypertension (PAH), preferably in the prevention and/or treatment of pulmonary hypertension (PH) and specifically Pulmonary Arterial Hypertension (PAH).

The compounds of the invention, regardless of the route of administration and disease to be treated, can be administered as the sole active agent or in combination (i.e. as co-therapeutic agents administered in fixed dose combination or in combined therapy of separately formulated active ingredients) with other pharmaceutical active ingredients selected from organic nitrates and NO donors; inhaled NO; stimulator of soluble guanylate cyclase (sGC); prostaciclin analogue PGI2 and agonist of prostacyclin receptors; compounds that inhibit the degradation of cyclic guanosine monophosphate (cGMP) and/or cyclic adenosine monophosphate (cAMP), such as inhibitors of phosphodiesterases (PDE) 1, 2, 3, 4 and/or 5, especially PDE 5 inhibitors; human neutrophilic elastase inhibitors; compounds inhibiting the signal transduction cascade, such as tyrosine kinase and/or serine/threonine kinase inhibitors; antithrombotic agents, for example platelet aggregation inhibitors, anticoagulants or profibrinolytic substances; active substances for lowering blood pressure, for example calcium antagonists, angiotensin II antagonists, ACE inhibitors, endothelin antagonists, renin inhibitors, aldosterone synthase inhibitors, alpha receptor blockers, beta receptor blockers, mineralocorticoid receptor antagonists; neutral endopeptidase inhibitor; osmotic agents; ENaC blockers; anti-inflammatories including corticosteroids and antagonists of chemokine receptors; antihistamine drugs; anti-tussive drugs; antibiotics such as macrolide and DNase drug substance and selective cleavage agents such as recombinant human deoxyribonuclease I (rhDNase); agents that inhibit ALK5 and/or ALK4 phosphorylation of Smad2 and Smad3; tryptophan hydrolyase 1 (TPH1) inhibitors and multi-kinase inhibitors.

In a preferred embodiment, the compounds of the invention are dosed in combination with phosphodiesterase V such as sildenafil, vardenafil and tadalafil; organic nitrates and NO donors (for example sodium nitroprusside, nitroglycerin, isosorbide mononitrate, isosorbide dinitrate, molsidomine or SIN-1, and inhaled NO); synthetic prostaciclin analogue PGI2 such as iloprost, treprostinil, epoprostenol and beraprost; agonist of prostacyclin receptors such as selexipag and compounds of WO 2012/007539; stimulator of soluble guanylate cyclase (sGC) like riociguat and tyrosine kinase like imatinib, sorafenib and nilotinib and endothelin antagonist (for example macitentan, bosentan, sitaxentan and ambrisentan).

In a further embodiment the compounds of the invention are dosed in combination with beta2-agonists such as salbutamol, salmeterol, and vilanterol, corticosteroids such as fluticasone propionate or furoate, flunisolide, mometasone furoate, rofleponide and ciclesonide, dexamethasone, anticholinergic or antimuscarinic agents such as ipratropium bromide, oxytropium bromide, tiotropium bromide, oxybutynin, and combinations thereof.

In a further embodiment the compounds of the invention are dosed in combination with mitogen-activated protein kinases (P38 MAP kinase) inhibitors, nuclear factor kappa-B kinase subunit beta (IKK2) inhibitors, leukotriene modulators, non-steroidal anti-inflammatory agents (NSAIDs), mucus regulators, mucolytics, expectorant/mucokinetic modulators, peptide mucolytics inhibitors of JAK, SYK inhibitors, inhibitors of PI3Kdelta or PI3Kgamma.

The dosages of the compounds of the invention depend upon a variety of factors including the particular disease to be treated, the severity of the symptoms, the route of administration, the frequency of the dosage interval, the particular compound utilized, the efficacy, toxicology profile, and pharmacokinetic profile of the compound.

Advantageously, the compounds of formula (I) can be administered for example, at a dosage comprised between 0.001 and 10000 mg/day, preferably between 0.1 and 500 mg/day.

When the compounds of formula (I) are administered by inhalation route, they are preferably given at a dosage comprised between 0.001 and 500 mg/day, preferably between 0.1 and 100 mg/day.

A pharmaceutical composition comprising a compound of the invention suitable to be administered by inhalation is in various respirable forms, such as inhalable powders (DPI), propellant-containing metering aerosols (PMDI) or propellant-free inhalable formulations (e.g. UDV).

The invention is also directed to a device comprising the pharmaceutical composition comprising a compound according to the invention, which is selected from a single- or multi-dose dry powder inhaler, a metered dose inhaler or a nebulizer, particularly soft mist nebulizer.

Although for the treatment of the diseases of the respiratory tract, the compounds according to the invention can be administered by inhalation; they may be in some case preferably administered by oral route.

When the compounds of formula (I) are administered by oral route, they are preferably given at a dosage comprised from 0.001 mg to 100 mg per kg body weight of a human, often 0.01 mg to about 50 mg per kg, for example 0.1 to 10 mg per kg, in single or multiple doses per day.

A pharmaceutical composition comprising a compound of the invention suitable to be administered by oral route can be formulated in various solid or liquid forms, such as tablets, gelcaps, capsules, caplets, granules, lozenges and bulk powders or aqueous and non-aqueous solutions, emulsions, suspensions, syrups, and elixirs formulations.

The following examples illustrate the invention in more detail.

PREPARATION OF INTERMEDIATES AND EXAMPLES

General Experimental Details

Chemical Names of the compounds were generated with Structure To Name Enterprise 10.0 Cambridge Software or latest.

Purification by 'chromatography' or 'flash chromatography' refers to purification using the Biotage SP1 purification system or equivalent MPLC system using a pre-packed polypropylene column containing unbounded activated silica with irregular particles with average size of 50 µm and nominal 60 Å porosity. When 'NH-silica' and 'C18-silica' are specified, they refer respectively to aminopropyl chain bonded silica and octadecyl carbon chain (C18)-bonded silica. Fractions containing the required product (identified by TLC and/or LCMS analysis) were pooled and concentrated in vacuo or freeze-dried.

Where an Isolute® SCX-2 cartridge was used, 'Isolute® SCX-2 cartridge' refers to a pre-packed polypropylene column containing a non-end-capped propylsulphonic acid functionalised silica strong cation exchange sorbent.

LCMS Methods

Method 1

| | |
|---|---|
| Instrumentation | Acquity H-Class (quaternary pump/PDA detector) + QDa Mass Spectrometer |
| Column | CSH C18 1.7 µm, 50 × 2.1 mm at 40° C. |
| Mobile Phase A | 0.1% Formic acid in water (v/v) |
| Mobile Phase B | 0.1% Formic acid in acetonitrile (v/v) |
| Flow | 1.0 mL/min |

| | Time (min) | % A | % B |
|---|---|---|---|
| Gradient Program | 0.0 | 97 | 03 |
| | 1.5 | 01 | 99 |
| | 1.9 | 01 | 99 |
| | 2.0 | 97 | 03 |
| | 2.5 | 97 | 03 |

| | |
|---|---|
| Detectors | UV, diode array 190-400 nm |
| | MS ionisation method - Electrospray (positive/negative ion) |

Method 2

| | |
|---|---|
| Instrumentation | Acquity H-Class (quaternary pump/PDA detector) + QDa Mass Spectrometer |
| Column | BEH C18 1.7 µm, 50 × 2.1 mm at 40° C. |
| Mobile Phase C | 0.03% Aqueous ammonia (v/v) (7.66 mM) |
| Mobile Phase D | 0.03% Ammonia in Acetonitrile (v/v) (7.66 mM) |
| Flow | 0.8 mL/min |

| | Time (min) | % A | % B |
|---|---|---|---|
| Gradient Program | 0.0 | 97 | 03 |
| | 1.5 | 03 | 97 |
| | 1.9 | 03 | 97 |
| | 2.0 | 97 | 03 |
| | 2.5 | 97 | 03 |

| | |
|---|---|
| Detectors | UV, diode array 190-400 nm |
| | MS ionisation method - Electrospray (positive/negative ion) |

Method 3

| | |
|---|---|
| Instrumentation | Acquity H-Class (quaternary pump/PDA detector) + QDa Mass Spectrometer |
| Column | BEH C18 1.7 µm, 50 × 2.1 mm at 40° C. |
| Mobile Phase C | 0.03% Aqueous ammonia (v/v) (7.66 mM) |
| Mobile Phase D | 0.03% Ammonia in Acetonitrile (v/v) (7.66 mM) |
| Flow | 0.8 mL/min |

| | Time (min) | % A | % B |
|---|---|---|---|
| Gradient Program | 0.0 | 97 | 03 |
| | 4.0 | 03 | 97 |
| | 4.4 | 03 | 97 |
| | 4.5 | 97 | 03 |
| | 5.0 | 97 | 03 |

| | |
|---|---|
| Detectors | UV, diode array 190-400 nm |
| | MS ionisation method - Electrospray (positive/negative ion) |

Method 4

| | |
|---|---|
| Instrumentation | Acquity UPLC (binary pump/PDA detector) + ZQ Mass Spectrometer |
| Column | BEH C18 1.7 µm, 100 × 2.1 mm, at 40° C. |
| Mobile Phase A | 0.1% Formic acid in water (v/v) |
| Mobile Phase B | 0.1% Formic acid in acetonitrile (v/v) |
| Flow | 0.4 mL/min |

| | Time (min) | % A | % B |
|---|---|---|---|
| Gradient Program | 0.0 | 95 | 05 |
| | 0.4 | 95 | 05 |
| | 6.0 | 05 | 95 |
| | 6.8 | 05 | 95 |
| | 7.0 | 95 | 05 |
| | 8.0 | 95 | 05 |

| | |
|---|---|
| Detectors | UV, diode array 200-500 nm |
| | MS ionisation method - Electrospray (positive/negative ion) |

Method 5

| | |
|---|---|
| Instrumentation | UPLC + Waters DAD + Waters SQD2, single quadrupole UPLC-MS |
| Column | HSS C18 1.8 μm 100 × 2.1 mm (Plus guard cartridge), at 40° C. |
| Mobile Phase A | 0.1% Formic acid in water (v/v) |
| Mobile Phase B | 0.1% Formic acid in acetonitrile (v/v) |
| Flow | 0.4 mL/min |

| | Time (min) | % A | % B |
|---|---|---|---|
| Gradient Program | 0.0 | 95 | 05 |
| | 0.4 | 95 | 05 |
| | 6.0 | 05 | 95 |
| | 6.8 | 05 | 95 |
| | 7.0 | 95 | 05 |
| | 8.0 | 95 | 05 |

| | |
|---|---|
| Detectors | UV, diode array 210 nm-400 nm<br>MS ionisation method - Electrospray (positive/negative ion) |

Method 6

| | |
|---|---|
| Instrumentation | UPLC + Waters DAD + Waters SQD2, single quadrupole UPLC-MS |
| Column | BEH Shield RP18 1.7 μm 100 × 2.1 mm (Plus guard cartridge) at 40° C. |
| Mobile Phase A | Aqueous 10 mM ammonium hydrogen carbonate |
| Mobile Phase B | Acetonitrile |
| Flow | 0.4 mL/min |

| | Time (min) | % A | % B |
|---|---|---|---|
| Gradient Program | 0.0 | 95 | 05 |
| | 0.4 | 95 | 05 |
| | 6.0 | 05 | 95 |
| | 6.8 | 05 | 95 |
| | 7.0 | 95 | 05 |
| | 8.0 | 95 | 05 |

| | |
|---|---|
| Detectors | UV, diode array 210 nm-400 nm<br>MS ionisation method - Electrospray (positive/negative ion) |

Method 7

| | |
|---|---|
| Instrumentation | Acquity i-Class (quarternary pump/PDA detector) + Quattro Micro Mass Spectrometer |
| Column | BEH C18 1.7 μm, 100 × 2.1 mm, at 40° C. |
| Mobile Phase A | 0.1% Formic acid in water (v/v) |
| Mobile Phase B | 0.1% Formic acid in acetonitrile (v/v) |
| Flow | 0.4 mL/min |

| | Time (min) | % A | % B |
|---|---|---|---|
| Gradient Program | 0.0 | 95 | 05 |
| | 0.4 | 95 | 05 |
| | 6.0 | 05 | 95 |
| | 6.8 | 05 | 95 |
| | 7.0 | 95 | 05 |
| | 8.0 | 95 | 05 |

| | |
|---|---|
| Detectors | UV, diode array 200-500 nm<br>MS ionisation method - Electrospray (positive/negative ion) |

Method 8

| | |
|---|---|
| Instrumentation | Acquity UPLC (binary pump/PDA detector) + ZQ Mass Spectrometer |
| Column | BEH C18 1.7 μm, 100 × 2.1 mm, at 40° C. |
| Mobile Phase A | 0.1% Aqueous ammonia (v/v) |
| Mobile Phase B | 0.1% Ammonia in acetonitrile (v/v) |
| Flow | 0.4 mL/min |

| | Time (min) | % A | % B |
|---|---|---|---|
| Gradient Program | 0.0 | 95 | 05 |
| | 0.4 | 95 | 05 |
| | 6.0 | 05 | 95 |
| | 6.8 | 05 | 95 |
| | 7.0 | 95 | 05 |
| | 8.0 | 95 | 05 |

| | |
|---|---|
| Detectors | UV, diode array 200-500 nm<br>MS ionisation method - Electrospray (positive/negative ion) |

Method 9

| | |
|---|---|
| Instrumentation | Acquity UPLC (binary pump/PDA detector) + QDa Mass Spectrometer |
| Column | CSH C18 1.7 μm, 50 × 2.1 mm, at 40° C. |
| Mobile Phase A | 0.05% Formic acid (v/v) in 95/5 water/acetonitrile |
| Mobile Phase B | 0.05% Formic acid (v/v) in 5/95 water/acetonitrile |
| Flow | 1.0 mL/min |

| | Time (min) | % A | % B |
|---|---|---|---|
| Gradient Program | 0.0 | 95 | 05 |
| | 1.50 | 05 | 95 |
| | 1.90 | 05 | 95 |
| | 2.0 | 05 | 95 |
| | 2.3 | 05 | 95 |

| | |
|---|---|
| Detectors | UV, diode array 200-500 nm<br>MS ionisation method - Electrospray (positive/negative ion) |

Method 10

| | |
|---|---|
| Instrumentation | Acquity UPLC (binary pump/PDA detector) + QDa Mass Spectrometer |
| Column | BEH C18 1.7 μm, 50 × 2.1 mm, at 40° C. |
| Mobile Phase A | 0.05% Formic acid (v/v) in 95/5 water/acetonitrile |
| Mobile Phase B | 0.05% Formic acid (v/v) in 5/95 water/acetonitrile |
| Flow | 1.0 mL/min |

| | Time (min) | % A | % B |
|---|---|---|---|
| Gradient Program | 0.0 | 95 | 05 |
| | 1.50 | 05 | 95 |
| | 1.90 | 05 | 95 |
| | 2.0 | 05 | 95 |
| | 2.3 | 05 | 95 |

| | |
|---|---|
| Detectors | UV, diode array 200-500 nm<br>MS ionisation method - Electrospray (positive/negative ion) |

Method 11

| | |
|---|---|
| Instrumentation | Acquity UPLC (binary pump/PDA detector) + QDa Mass Spectrometer |
| Column | CSH C18 1.7 μm, 50 × 2.1 mm, at 50° C. |
| Mobile Phase A | Aqueous ammonmium formate (25 mM) pH 3 |
| Mobile Phase B | 0.1% Formic acid in acetonitrile |
| Flow | 0.35 mL/min |

-continued

|  | Time (min) | % A | % B |
|---|---|---|---|
| Gradient Program | 0.00 | 99 | 01 |
|  | 0.50 | 99 | 01 |
|  | 3.00 | 70 | 30 |
|  | 6.50 | 50 | 50 |
|  | 7.50 | 20 | 80 |
|  | 8.10 | 99 | 01 |
|  | 10.00 | 99 | 01 |

| Detectors | UV, diode array 200-500 nm<br>MS ionisation method - Electrospray (positive/negative ion) |
|---|---|

Method 12

| Instrumentation | Acquity UPLC (binary pump/PDA detector) + QDa Mass Spectrometer |
|---|---|
| Column | Kinetex C8 1.7 μm, 50 × 2.1 mm, at 40° C. |
| Mobile Phase A | 0.05% Formic acid (v/v) in 95/5 water/acetonitrile |
| Mobile Phase B | 0.05% Formic acid (v/v) in 5/95 water/acetonitrile |
| Flow | 1.0 mL/min |

|  | Time (min) | % A | % B |
|---|---|---|---|
| Gradient Program | 0.0 | 95 | 05 |
|  | 1.50 | 05 | 95 |
|  | 1.90 | 05 | 95 |
|  | 2.0 | 05 | 95 |
|  | 2.3 | 05 | 95 |

| Detectors | UV, diode array 200-500 nm<br>MS ionisation method - Electrospray (positive/negative ion) |
|---|---|

Method 13 and Method 14

| Instrumentation | Shimadzu LCMS-2020 Single Quadrupole Liquid Chromatograph Mass Spectrometer |
|---|---|
| Column | Aquity HSS C18 1.8 μm, 50 × 2.1 mm, at 25° C. |
| Mobile Phase A | 0.1% formic acid (v/v) in water |
| Mobile Phase B | 0.1% formic acid (v/v) in acetonitrile |
| Flow | 0.5 mL/min |

|  | Time (min) | % A | % B |
|---|---|---|---|
| Gradient Program | 0.00 | 95 | 05 |
|  | 4.00 | 05 | 95 |
|  | 5.00 | 05 | 95 |
|  | 5.20 | 95 | 05 |
|  | 6.00 | 95 | 05 |

| Detectors | UV, 254 nm and 214 nm (method 13)<br>UV, 254 nm and 220 nm (method 14)<br>MS ionisation method - Electrospray (positive/negative ion) |
|---|---|

Method 15

| Instrumentation | Shimadzu LCMS-2020 Single Quadrupole Liquid Chromatograph Mass Spectrometer |
|---|---|
| Column | Aquity HSS C18 1.8 μm, 50 × 2.1 mm, at 25° C. |
| Mobile Phase A | 0.1% formic acid (v/v) in water |
| Mobile Phase B | 0.1% formic acid (v/v) in acetonitrile |
| Flow | 0.5 mL/min |

|  | Time (min) | % A | % B |
|---|---|---|---|
| Gradient Program | 0.00 | 95 | 05 |
|  | 10.00 | 05 | 95 |
|  | 10.50 | 05 | 95 |
|  | 11.00 | 95 | 05 |
|  | 12.00 | 95 | 05 |

| Detectors | UV, 254 nm and 214 nm<br>MS ionisation method - Electrospray (positive/negative ion) |
|---|---|

Method 16

| Instrumentation | Agilent Technologies 1260 Infinity II with DAD detector/Agilent Technologies InfinityLab LC/MSD |
|---|---|
| Column | BEH C18 1.7 μm, 50 × 2.1 mm, at 25° C. |
| Mobile Phase A | 0.05% aqueous ammonium hydroxide (v/v) |
| Mobile Phase B | acetonitrile |
| Flow | 0.5 mL/min |

|  | Time (min) | % A | % B |
|---|---|---|---|
| Gradient Program | 0.00 | 80 | 20 |
|  | 5.00 | 70 | 30 |
|  | 5.60 | 70 | 30 |
|  | 5.90 | 05 | 95 |
|  | 7.10 | 05 | 95 |
|  | 7.50 | 80 | 20 |
|  | 9.00 | 80 | 20 |

| Detectors | UV, Diode array 190-400 nm<br>MS ionisation method - Electrospray (positive/negative ion) |
|---|---|

Method 17

| Instrumentation | Dionex UHPLC Ultimate 3000 with DAD detector |
|---|---|
| Column | Gemini-NX C18 3 μm, 4.6 × 50 mm, at 25° C. |
| Mobile Phase A | 0.05% aqueous ammonium hydroxide (v/v) |
| Mobile Phase B | acetonitrile |
| Flow | 0.5 mL/min |

|  | Time (min) | % A | % B |
|---|---|---|---|
| Gradient Program | 0.00 | 05 | 95 |
|  | 2.00 | 05 | 95 |
|  | 9.50 | 80 | 20 |
|  | 10.50 | 80 | 20 |
|  | 12.00 | 05 | 95 |
|  | 14.00 | 05 | 95 |

| Detectors | UV, Diode array 190-340 nm |
|---|---|

NMR Methods

NMR spectra were obtained on a Bruker Avance 400 MHz, 5 mm QNP probe H, C, F, P, single Z gradient, two channel instrument running TopSpin 2.1, or on a Bruker Avance III 400 MHz, 5 mm BBFO Plus probe, single Z gradient, two channel instrument running TopSpin 3.0, or on a Varian Unity Inova 400 spectrometer with a 5 mm inverse detection triple resonance probe operating at 400 MHz. Chemical shift are reported as δ values in ppm relative to tetramethylsilane. Coupling constants (J values) are given in hertz (Hz) and multiplicities are reported using the following abbreviation: s=singlet, d=doublet, t=triplet, q=quartet, m=multiplet, br=broad, nd=not determined.

SFC Methods

Where compounds were purified using Supercritical Fluid Chromatography (SFC) either a Waters Thar Prep100 preparative SFC system (P200 $CO_2$ pump, 2545 modifier pump, 2998 UV/VIS detector, 2767 liquid handler with Stacked Injection Module) or a Waters Thar Investigator semi preparative system (Waters Fluid Delivery Module, 2998 UV/VIS detector, Waters Fraction Collection Module) was used. The compounds were purified using the column and conditions specified and fractions that contained the desired product were concentrated by vacuum centrifugation.

MDAP Methods

Compounds were purified by reverse phase HPLC using a Waters Fractionlynx preparative HPLC system (2525 pump, 2996/2998 UV/VIS detector, 2767 liquid handler) or Gilson preparative HPLC system (322 pump, 155 UV/VIS detector, GX-281 liquid handler) or equivalent system. Collection was triggered by a threshold absorbance value at 260 nm and the presence of target molecular ion as observed under ESI conditions. The fractions that contained the desired product were lyophilized. The specific details of the conditions used, including the column, solvents, gradient and modifier (acidic or basic), are provided for some examples and merely provided for assistance. When specific conditions are not provided, they can be readily optimized by those skilled in the art.

In the procedures that follow, some of the starting materials are identified through an "Intermediate" or "Example" number with indications on step name. When reference is made to the use of a "similar" or "analogous" procedure, as will be appreciated by those skilled in the art, such a procedure may involve minor variations, for example reaction temperature, reagent/solvent amount, reaction time, work-up conditions or chromatographic purification conditions.

The stereochemistry of the compounds in the Examples, where indicated, has been assigned on the assumption that absolute configuration at resolved stereogenic centers of starting materials is maintained throughout any subsequent reaction conditions.

All solvents and commercial reagents were used as received. Where the preparation of starting materials is not described, these are commercially available, known in the literature, or readily obtainable by those skilled in the art using standard procedures.

Abbreviations

ACN (acetonitrile), BINAP (2,2'-Bis(diphenylphosphino)-1,1'-binaphthalene), COMU ((1-Cyano-2-ethoxy-2-oxoethylidenaminooxy)dimethylamino-morpholino-carbenium hexafluorophosphate), DCM (dichloromethane), DIPEA or DIEA (N-Ethyldiisopropylamine), DMF (N,N-Dimethylformamide), DMSO (Dimethylsulfoxide), dppf (1,1'-Ferrocenediyl-bis(diphenylphosphine)), EtOH (ethanol), EtOAc (ethyl acetate), FA (Formic acid), HATU (1-[Bis(dimethylamino)methylene]-1H-1,2,3-triazolo[4,5-b]pyridinium 3-oxid hexafluorophosphate, N-[(Dimethylamino)-1H-1,2,3-triazolo-[4,5-b]pyridin-1-yl-methylene]-N-methylmethanaminium hexafluorophosphate N-oxide), HPLC (High performance liquid chromatography), LCMS (Liquid chromatography-mass spectrometry), MDAP (Mass-directed auto-purification), MeOH (methanol), Me-THF (2-Methyltetrahydrofuran), MTBE (methyl tert-butyl ether), NMP (N-methylpyrrolidone), NMR (Nuclear magnetic resonance), Rt (Retention time), RT (Room temperature), SCX (Strong cation exchange), TBTU (2-(1H-Benzotriazole-1-yl)-1,1,3,3-tetramethylaminium tetrafluoroborate), TFA (Trifluoroacetic acid), THF (Tetrahydrofuran).

Preparation of Intermediates

Intermediate A1

Step A

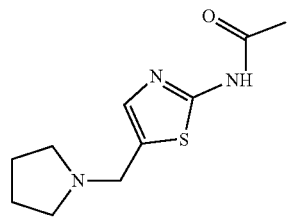

N-(5-(Pyrrolidin-1-ylmethyl)thiazol-2-yl)acetamide (Intermediate A1-a)

N-(Thiazol-2-yl)acetamide (1.00 g, 7.03 mmol), formalin (1.6 mL, 58.08 mmol), pyrrolidine (1.0 mL, 11.98 mmol) and acetic acid (1.0 mL, 17.47 mmol) were stirred in a closed vial at 100° C. overnight. Then the reaction was allowed to cool to RT, diluted with water (10 mL) and made basic (pH~12) by addition of $K_2CO_3$. The aqueous phase was extracted with DCM (3×10 mL), dried over $MgSO_4$, and evaporated to dryness. The solid residue was re-dissolved in EtOH (10 mL) and then aqueous 37% w/w HCl (4 mL) was added. The solution was concentrated under reduced pressure to afford the title compound (1.58 g) which was carried onto the next step without purification.

LCMS (Method 1): Rt=0.17 min, m/z 225.8 [M+H]$^+$

Step B

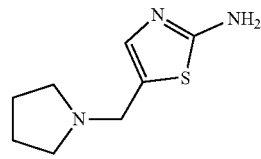 [SMILES: Nc1ncc(CN2CCCC2)s1]

5-(Pyrrolidin-1-ylmethyl)thiazol-2-amine (Intermediate A1)

N-(5-(Pyrrolidin-1-ylmethyl)thiazol-2-yl)acetamide (1.58 g, 7.01 mmol) was dissolved in EtOH (25 mL) and a solution of 4M HCl in dioxane (10 mL, 40.0 mmol) was added dropwise. The resulting mixture was allowed to stir at 50° C. overnight. The crude mixture was concentrated under reduced pressure. This residue was re-dissolved in DCM/methanol, loaded onto an Isolute® SCX-2 column and eluted with 2N methanolic ammonia. The solution was concentrated in vacuo to afford the desired product (568 mg).

LCMS (Method 1): Rt=0.16 min, m/z 183.9 [M+H]$^+$

Intermediate A2

Step A

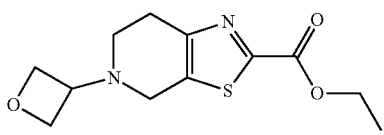 [SMILES: CCOC(=O)c1nc2c(s1)CN(C1COC1)CC2]

Ethyl 5-(oxetan-3-yl)-4,5,6,7-tetrahydrothiazolo[5,4-c]pyridine-2-carboxylate (Intermediate A2-a)

4,5,6,7-Tetrahydrothiazolo[5,4-c]pyridine-2-carboxylate hydrochloride (300 mg, 1.2 mmol) and oxetan-3-one (104 mg, 1.4 mmol) were dissolved in DCM (4 mL) and stirred for 5 min before addition of triisopropoxytitanium(IV)chloride (0.576 mL, 2.4 mmol). The resulting solution was stirred at RT for 4 h. Sodium triacetoxyborohydride (0.875 mL, 3.6 mmol) was added and the mixture stirred at RT for 12 h. The reaction was quenched by the addition of isopropanol and evaporated to dryness. The resulting crude was dissolved in EtOAc and washed with aqueous saturated NaHCO$_3$. The organic layer was dried over Na$_2$SO$_4$ and evaporated under reduced pressure. The resulting crude material was purified by flash chromatography on NH-silica by eluting with 0-3% MeOH in DCM to give the title compound (192 mg).

LCMS (Method 9): Rt=0.43 min, m/z 269.1 [M+H]$^+$

Step B

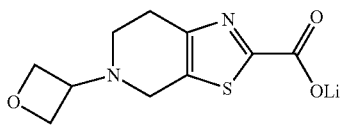

Lithium 5-(oxetan-3-yl)-4,5,6,7-tetrahydrothiazolo[5,4-c]pyridine-2-carboxylate (Intermediate A2)

Intermediate A2-a (192 mg, 0.7 mmol) was dissolved in THF (6 mL) and water (2 mL), then LiOH (86 mg, 3.6 mmol) added and the mixture stirred at RT for 1 h. The mixture was evaporated under reduced pressure to give the desired product (312 mg) that was used in the next step without further purification.

LCMS (Method 9): Rt=0.18 min, m/z 241.1 [M+H]$^+$

Intermediate A3

Step A

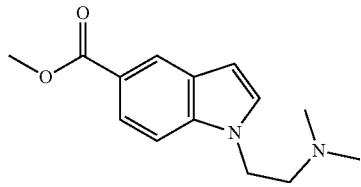

Methyl 1-(2-(dimethylamino)ethyl)-1H-indole-5-carboxylate (Intermediate A3-a)

A solution of 2-(trimethylphosphoranylidene)acetonitrile 0.5 M in THF (3.42 mL, 1.71 mmol) was added to a mixture of N,N-dimethylethanolamine (0.174 mL, 1.71 mmol) and methyl 1H-indole-5-carboxylate (100 mg, 0.57 mmol) in toluene (5 mL). The reaction mixture was stirred at 110° C. for 15 h. A further equivalent of 2-(trimethylphosphoranylidene)acetonitrile solution 0.5 M in THF and N,N-dimethylethanolamine were needed to achieve complete conversion. The reaction mixture was evaporated under reduced pressure and the resulting crude taken into EtOAc. The organic layer was washed twice with saturated aqueous NaHCO$_3$ and evaporated to dryness. The crude was purified by flash chromatography on NH-silica by eluting with 0-50% EtOAc in hexane to give the title compound (110 mg).

LCMS (Method 9): Rt=0.38 min, m/z 246.9 [M+H]$^+$

Step B

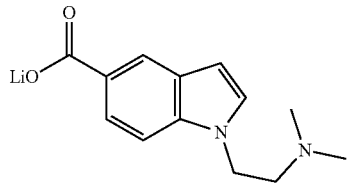

Lithium 1-(2-(dimethylamino)ethyl)-1H-indole-5-carboxylate (Intermediate A3)

Intermediate A3 was prepared from intermediate A3-a using a similar procedure to that described in step b of intermediate A2.

LCMS (Method 9): Rt=0.19 min, m/z 233.9 [M+H]$^+$

Intermediate A4

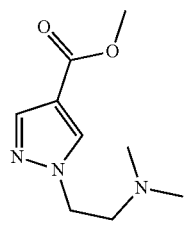

Methyl 1-(2-(dimethylamino)ethyl)-1H-pyrazole-4-carboxylate (Intermediate A4)

Methyl 1H-pyrazole-4-carboxylate (200 mg, 1.59 mmol) and Cs$_2$CO$_3$ (1.55 g, 4.76 mmol) were stirred in acetonitrile (10 mL) then potassium iodide (92 mg, 0.56 mmol) and 2-chloro-N,N-dimethylethanamine hydrochloride (343 mg, 2.38 mmol) was added. The mixture was stirred at 75° C. for 3.5 h, then reaction mixture was filtered, and the filtrate evaporated under reduced pressure. The crude material was purified by flash chromatography on NH-silica by eluting with 0-30% EtOAc in hexane to give the title compound (260 mg).

LCMS (Method 9): Rt=0.20 min, m/z 198.0 [M+H]$^+$

Intermediate B1

Step A

3-Fluoro-4-iodopyridin-2-amine (Intermediate B1-a)

To a solution of 2,3-difluoro-4-iodopyridine (2.00 g, 8.30 mmol) and acetamidine hydrochloride in DMSO (15 mL) was added water (0.75 mL, 41.50 mmol) and sodium hydroxide (0.83 g, 20.75 mmol) and the reaction mixture heated at 130° C. for 24 h. The reaction mixture was passed down an Isolute® SCX-2 cartridge eluting with methanol and then 2M methanolic ammonia. The solution was concentrated in vacuo and the product was purified by chromatography on silica by eluting with 0-10% methanol in DCM. The product fractions were concentrated in vacuo to give the product as a solid (872 mg).

LCMS (Method 2): Rt=1.14 min, m/z 239.1 [M+H]$^+$

Step B

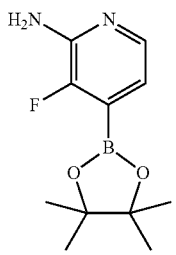 [SMILES: CC1(C)OB(c2ccnc(N)c2F)OC1(C)C]

3-Fluoro-4-(4,4,5,5-tetramethyl-1,3,2-dioxaborolan-2-yl)pyridin-2-amine (Intermediate B1)

To a degassed solution of intermediate B1-a (200 mg, 0.84 mmol), bis(pinacolato)diboron (260 mg, 1.01 mmol) and potassium acetate (210 mg, 2.10 mmol) in dioxane (4 mL) was added Pd(dppf)Cl$_2$·DCM (34 mg, 0.042 mmol) and the reaction mixture heated at 110° C. for 19 h. The reaction mixture was filtered through Celite®, concentrated in vacuo and washed with cold methanol (2 mL), the residue was dried to give a solid that was used directly in the next step.

Intermediate C1

Step A

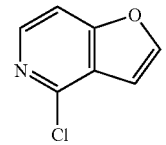

4-Chlorofuro[3,2-c]pyridine (Intermediate C1-a)

A mixture of furo[3,2-c]pyridin-4-ol (70.4 g, 0.52 mol) in phosphoryl trichloride (430 mL) was heated at reflux for 1 h. Phosphoryl trichloride was distilled off, the residue poured into ice/water and neutralized to pH~6 with aqueous saturated NaHCO$_3$. The aqueous phase was extracted twice with DCM, then the organic layer was washed with saturated aqueous NaCl and evaporated to dryness. The crude material was purified by column chromatography on silica gel eluting with EtOAc-hexane to give the title compound (72.8 g).

LCMS (Method 13): Rt=2.71 min, m/z 153.9 [M+H]$^+$

Step B

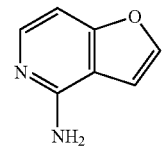

Furo[3,2-c]pyridin-4-amine (Intermediate C1-b)

A solution of intermediate C1-a (72.8 g, 0.47 mol) in dry toluene (730 mL) was purged with argon over 20 min, then racemic BINAP (17.72 g, 0.028 mol), tris(dibenzylideneacetone)dipalladium(0) (8.69 g, 0.0095 mol) and potassium tert-butoxide (74.50 g, 0.66 mol) were added. After addition of benzophenone imine (95.5 mL, 0.57 mol), the mixture was heated at 90° C. for 1.5 h. The reaction mixture was cooled to RT, diluted with THF and filtered through a pad of diatomaceous earth followed by washing with THF and diethyl ether. The combined filtrate was evaporated and the residue taken into MeOH (260 mL) and added dropwise to a solution of hydroxylamine hydrochloride (98.87 g, 1.42 mol) in MeOH (1200 mL) which had previously been neutralized in an ice bath with NaOH (56.91 g, 1.42 mol). The reaction mixture was stirred at RT for 1 h and evaporated to dryness. The crude material was purified by chromatography on silica by eluting with 10-100% EtOAc in hexane to give a solid that was further purified by trituration and filtration in a mixture of MTBE and DCM. A second purification by chromatography on silica by eluting with 0-10% MeOH in DCM afforded the pure title compound (45.1 g).

LCMS (Method 14): Rt=0.83 min, m/z 135.0 [M+H]$^+$

Step C

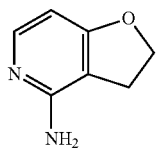

2,3-Dihydrofuro[3,2-c]pyridin-4-amine
(Intermediate C1-c)

Intermediate C1-b (44.1 g, 0.33 mol) was dissolved in MeOH (530 mL) and acetic acid (56.4 mL), then 10% Pd/C (50% wet, 17.74 g) was added and the reaction mixture purged with argon before being hydrogenated at a pressure of 10 bar of $H_2$ at 50° C. under vigorous stirring. After 20 h a further half equivalent of 10% Pd/C (50% wet) and further 3 h of hydrogenation were needed in order to achieve full conversion. The reaction mixture was filtered and washed with MeOH. The combined filtrate was evaporated and the residue partitioned between EtOAc (500 mL) and water (500 mL). The aqueous layer was washed with further EtOAc (300 mL), neutralized with solid $NaHCO_3$ and saturated with NaCl. This aqueous mixture was extracted with DCM (8×300 mL) and the combined organic layers washed with saturated aqueous NaCl (800 mL), dried over $Na_2SO_4$ and evaporated to afford the title compound (24.57 g).

LCMS (Method 15): Rt=0.81 min, m/z 137.1 $[M+H]^+$

Step D

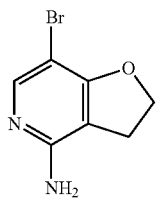

7-Bromo-2,3-dihydrofuro[3,2-c]pyridin-4-amine
(Intermediate C1)

Intermediate C1-c (24.57 g, 0.180 mol) was dissolved in ACN (1230 mL) and then a solution of N-bromosuccinimide (35.33 g, 0.198 mol) in ACN (490 mL) was added dropwise over 3 h at −10° C. in darkness. The reaction was quenched with aqueous saturated $NaHCO_3$ (500 mL), water (500 mL), EtOAc (1000 mL) and aqueous 5% NaCl (500 mL). The resulting organic and aqueous phases were separated, and the aqueous layer further washed with EtOAc (1000 mL). The combined organic layers were washed with aqueous 5% NaCl (7×2000 mL) and concentrated to dryness. The residual solid was treated with a mixture of EtOAc (500 mL) and water (200 mL), placed in a sonic bath for some minutes and acidified with aqueous 10% $KHSO_4$ (300 mL). The solid that appeared was collected by filtration. The biphasic filtrate was partitioned and the organic layer washed twice with aqueous 10% $KHSO_4$ (200 mL each). The combined aqueous layer was washed with EtOAc (3×500 mL) and mixed with the previous collected solid. The resulting aqueous mixture was neutralized to pH7 with $NaHCO_3$ and extracted with EtOAc (3×1000 mL). The combined organic phase was washed with saturated aqueous NaCl (500 mL), dried over anhydrous $MgSO_4$, and concentrated to give the title compound as a solid (27.1 g).

LCMS (Method 16): Rt=1.69 min, m/z 215.0/217.0 $[M+H]^+$

Intermediate C2

Step A

Intermediate C2-a was prepared similarly to intermediate C1-a by replacing the starting furo[3,2-c]pyridin-4-ol with the indicated starting material.

| | Structure | Starting material | LC-MS |
|---|---|---|---|
| C2-a | | 2-methylfuro[3,2-c]-pyridin-4-ol | Rt = 3.09 min, m/z 169.7 $[M + H]^+$ (Method 14) |

Step B

Intermediate C2-b

| | Structure | Starting material | LC and $^1$H-NMR |
|---|---|---|---|
| C2-b | | Intermediate C2-a | Rt = 7.27 min, (Method 17) $^1$H NMR (300 MHz, DMSO-d6) δ 7.71 (d, J = 6.1 Hz, 1H), 6.82 (dd, J = 6.1, 1.0 Hz, 1H), 6.76-6.64 (m, 3H), 2.41 (d, J = 1.1 Hz, 3H). |

Synthesis of Intermediate C2-b was modified from a general procedure following the two-step method herein described.

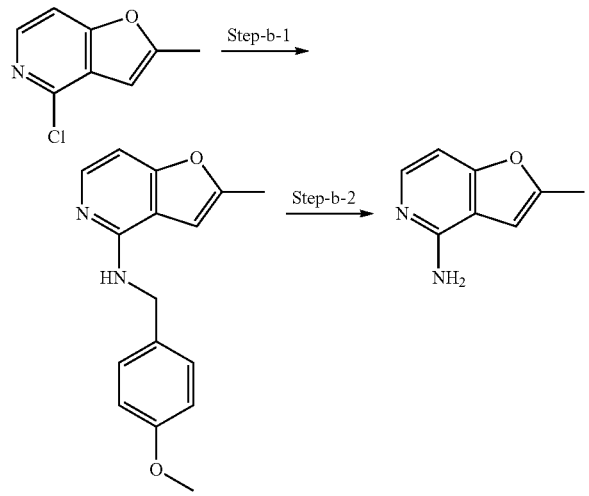

Step b-1

Intermediate C2-a (4.7 g, 30 mmol) and (4-methoxyphenyl)methanamine (8.2 g, 60 mmol) were dissolved in NMP (15.5 mL) and DIPEA (10 mL, 60 mmol) was added. The mixture was heated at 170° C. overnight. The reaction mixture was diluted with water, extracted with EtOAc and the combined organic phases was washed with saturated aqueous NaCl, dried over $Na_2SO_4$ and evaporated to dryness. The resulting mixture was chromatographed on silica by eluting with 0-15% EtOAc in hexane to give an intermediate (2.90 g) promptly used in the next step.

Step b-2

The intermediate isolated in step b-1 (2.90 g) was dissolved in TFA (14 mL) and the mixture stirred for 2 h at 50° C. The resulting solution was diluted with EtOAc and washed with aqueous saturated $NaHCO_3$. The organic layer was washed with saturated aqueous NaCl, dried over anhydrous $Na_2SO_4$ and evaporated to dryness. The crude material was chromatographed on silica by eluting with 0-5% MeOH in DCM giving the title compound (1.3 g).

Step C

Intermediate C2-c was prepared similarly to intermediate C1-c by replacing the starting intermediate C1-b with the indicated starting materials.

| | Structure | Starting material | LC-MS |
|---|---|---|---|
| C2-c | (structure shown) | Intermediate C2-b | Rt = 1.77 min, m/z 151.1 $[M + H]^+$ (Method 14) |

Step D

Intermediate C2 was prepared similarly to intermediate C1 by replacing the starting intermediate C1-c with the indicated starting materials.

| | Structure | Starting material | LC and $^1$H-NMR |
|---|---|---|---|
| C2 | (structure shown) | Intermediate C2-c | Rt = 7.26 min (Method 17) $^1$H NMR (300 MHz, DMSO-d6) δ 7.73 (d, J = 0.9 Hz, 1H), 5.92 (s, 2H), 5.15 - 4.94 (m, 1H), 3.19 (ddd, J = 9.2, J =, J = 0.8 Hz, 1H), 2.61 (ddd, J = 15.5, J = 7.4, J = 0.9 Hz, 1H), 1.41 (d, J = 6.3 Hz, 3H). |

Intermediate D1

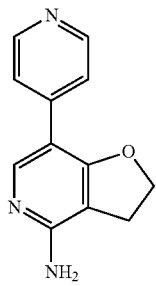

7-(Pyridin-4-yl)-2,3-dihydrofuro[3,2-c]pyridin-4-amine (Intermediate D1)

Intermediate C1 (2.36 g, 11 mmol), pyridine-4-boronic acid (1.75 g 14 mmol), and cesium carbonate (10.73 g, 33 mmol) were stirred in DMF (94 mL)/water (47 mL) and purged with argon for 30 min. Tetrakis(triphenylphosphine)palladium(0) (1.27 g, 1.1 mmol) was added and the mixture heated at 100° C. overnight. The reaction mixture was allowed to cool to RT, diluted with water (94 mL) and extracted with EtOAc (7×225 mL). The combined organic layer was washed with saturated aqueous NaCl (700 mL) and concentrated. The crude material was purified by chromatography on silica by eluting with 0-10% MeOH in DCM. The solid obtained was triturated in 10% DCM in ethyl ether for 30 min, filtered and washed with cooled DCM to give the title compound (1.47 g).

LCMS (Method 1): Rt=0.13 min, m/z 213.9 [M+H]$^+$

Intermediate E1

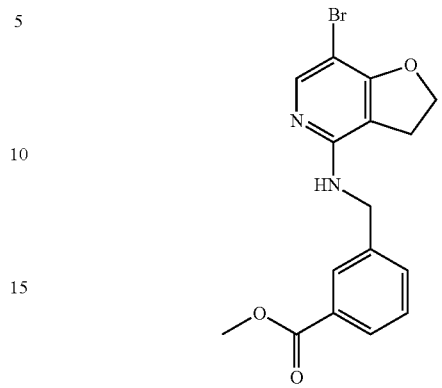

Methyl 3-(((7-bromo-2,3-dihydrofuro[3,2-c]pyridin-4-yl)amino)methyl)benzoate (Intermediate E1)

Intermediate C1 (15.6 g, 0.074 mol) and methyl 3-formylbenzoate (18.1 g, 0.11 mol) were dissolved in anhydrous DCM (470 mL) with molecular sieves and kept under inert atmosphere. After 10 min, chloro(triisopropoxy)titanium (IV) (35.4 mL, 0.148 mol) was added dropwise and the resulting mixture stirred at RT over 2.5 h. Sodium triacetoxyborohydride (31.4 g, 0.148 mol) followed by acetic acid (8.5 mL, 0.148 mol) were added and the mixture stirred at RT overnight. The reaction mixture was quenched with methanol and solvents were evaporated. The residue was dissolved in EtOAc and aqueous saturated NaHCO$_3$ solution. After being stirred for 15 min, the mixture was filtered through a thin pad of diatomaceous earth and washed with EtOAc. The combined filtrate was collected and organic-aqueous phases were separated. The organic layer was dried over Na$_2$SO$_4$ and evaporated. The crude material was purified by chromatography on silica by eluting with 20%-40% EtOAc in hexane to give the title compound (19.3 g).

LCMS (Method 9): Rt=0.85 min, m/z 362.9/364.9 [M+H]$^+$

Intermediate E2-E3

The following intermediates were prepared using a procedure similar to that used for the synthesis of Intermediate E1 by replacing Intermediate C1 and/or methyl 3-formylbenzoate with those indicated in the table below.

| | Structure | Starting material | LC-MS |
|---|---|---|---|
| E2 | (structure shown) | Intermediate C1 and tert-butyl (3-formylphenyl)carbamate | Rt = 0.87 min, m/z 420.2/422.4 [M + H]$^+$ (Method 9) |

| | Structure | Starting material | LC-MS |
|---|---|---|---|
| E3 | ![E3 structure] | Intermediate C1 and Methyl 2-formyl-isonicotinate | Rt = 0.88 min, m/z 363.8/365.8 [M + H]+ (Method 1) |
| E4 | ![E4 structure] | Intermediate C1 and Methyl 6-formyl-picolinate | Rt = 1.22 min, m/z 391.8/393.7 [M + H]+ (Method 1) Note: Isopropyl ester isolated instead of methylester |

Intermediate F1

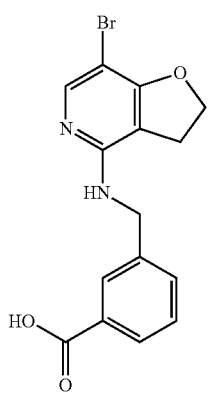

3-(((7-Bromo-2,3-dihydrofuro[3,2-c]pyridin-4-yl)amino)methyl)benzoic Acid (Intermediate F1)

A solution of intermediate E1 (100 mg, 0.27 mmol), lithium hydroxide monohydrate (0.035 g, 0.83 mmol) in THF (1 mL), MeOH (1 mL) and water (2 mL) was stirred at ambient temperature for 1.5 h. The resulting mixture was diluted with water and extracted with EtOAc. The pH of the aqueous phase was adjusted to pH~2-3 with 1M HCl. The organic layer was dried over sodium sulphate and evaporated in vacuo to give the product as a white solid (89 mg).

LCMS (Method 1): Rt=0.81 min, m/z 348.9/350.9 [M+H]+

Intermediate F2

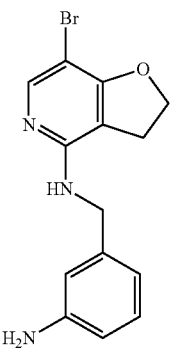 [SMILES: Nc1cccc(CNc2ncc(Br)c3c2CCO3)c1]

N-(3-Aminobenzyl)-7-bromo-2,3-dihydrofuro[3,2-c]pyridin-4-amine (Intermediate F2)

Intermediate E2 (800 mg) was dissolved in acetonitrile (6 mL) and treated with aqueous HCl 12 M. The solution was stirred at RT and after 1 h a precipitate appeared. The solid was collected by filtration to give the title compound (550 mg).

LCMS (Method 9): Rt=0.38 min, m/z 320.0/322.0 [M+H]$^+$

Intermediate F3-F4

The following intermediates were prepared using a procedure similar to that used for the synthesis of Intermediate F1 by replacing intermediate E1 with the starting material indicated in the table below.

| | Structure | Starting material | LC-MS |
|---|---|---|---|
| F3 | (structure shown) | Intermediate E3 | Rt = 0.74 min, m/z 349.8/351.8 [M + H]$^+$ (Method 1) |
| F4 | (structure shown) | Intermediate E4 | Rt = 0.92 min, m/z 350.1/352.1 [M + H]$^+$ (Method 1) |

Intermediate G1

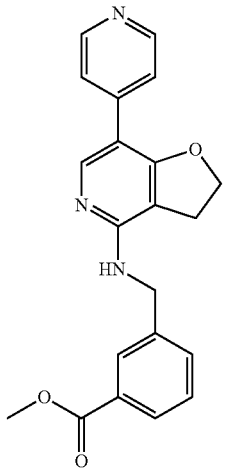 [SMILES: COC(=O)c1cccc(CNc2ncc(-c3ccncc3)c3c2CCO3)c1]

Methyl 3-(((7-(pyridin-4-yl)-2,3-dihydrofuro[3,2-c]pyridin-4-yl)amino)methyl)benzoate (Intermediate G1)

A solution of $K_3PO_4$ (19.6 g, 0.092 mol) in water (48 mL) was added to a solution of intermediate E1 (11.97 g, 0.033 mol) and pyridin-4-ylboronic acid (8.9 g, 0.073 mol) in dioxane (204 mL). The resulting mixture was degassed with a stream of argon, then $Pd_2(dba)_3$ (3.0 g, 0.0033 mol) and tricyclohexylphosphine (2.3 g, 0.0083 mol) were added and the mixture stirred at 120° C. overnight. The reaction mixture was concentrated and the residue taken into water and EtOAc. The layers were separated and the aqueous phase was further extracted with EtOAc. The combined organic phases were dried over $MgSO_4$ and concentrated. The crude product was purified by chromatography on silica by eluting with 50%-100% EtOAc in hexane to give the title compound (6.4 g).

LCMS (Method 9): Rt=0.45 min, m/z 362.0 [M+H]$^+$

Intermediate G2

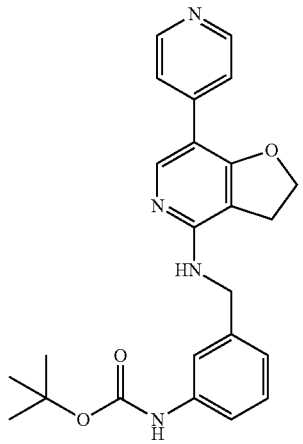 [SMILES: CC(C)(C)OC(=O)Nc1cccc(CNc2ncc(-c3ccncc3)c3c2CCO3)c1]

tert-Butyl (3-(((7-(pyridin-4-yl)-2,3-dihydrofuro[3,2-c]pyridin-4-yl)amino)methyl)phenyl)carbamate (Intermediate G2)

Intermediate G2 was prepared using a procedure similar to that used for the synthesis of intermediate E1 by replacing intermediate C1 with intermediate D1 and methyl 3-formylbenzoate with tert-butyl (3-formylphenyl)carbamate.

LCMS (Method 9): Rt=0.65 min, m/z 419.2 [M+H]$^+$

Intermediate H1

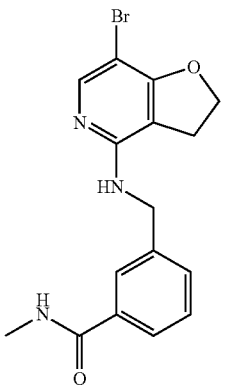 [SMILES: CNC(=O)c1cccc(CNc2ncc(Br)c3c2CCO3)c1]

3-(((7-Bromo-2,3-dihydrofuro[3,2-c]pyridin-4-yl)amino)methyl)-N-methylbenzamide (Intermediate H1)

A mixture of intermediate F1 (40 mg, 0.12 mmol), methylamine hydrochloride (23 mg, 0.35 mmol), TBTU (150 mg, 0.46 mmol) and DIPEA (0.12 mL, 0.69 mmol) in DCM (4 mL) was stirred at RT for 18 h. The resulting mixture was diluted with water and extracted with DCM. The organic layer was dried over $Na_2SO_4$ and evaporated in vacuo. The residue, diluted with methanol, was passed down an Isolute® SCX-2 cartridge eluting with methanol and then 2M methanolic ammonia. The solution was concentrated in vacuo to give the desired product (29 mg).

LCMS (Method 1): Rt=0.73 min, m/z 362.0-364.0 [M+H]$^+$

Intermediate H2

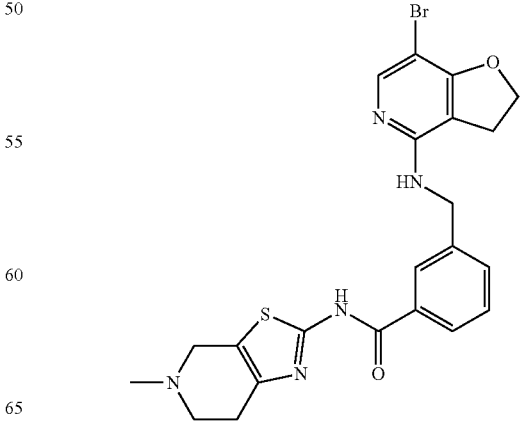

3-(((7-Bromo-2,3-dihydrofuro[3,2-c]pyridin-4-yl)amino)methyl)-N-(5-methyl-4,5,6,7-tetrahydrothiazolo[5,4-c]pyridin-2-yl)benzamide (Intermediate H2)

A solution of intermediate F1 (0.247 g, 1.46 mmol), TBTU (0.61 g, 1.90 mmol) and DIPEA (0.76 mL, 4.38 mmol) in DMF (10 mL) was stirred at RT for 18 h. The reaction mixture was diluted with EtOAc (20 mL), washed with water (15 mL) and saturated aqueous NaCl (15 mL). The organic layer was dried with $Na_2SO_4$ and concentrated in vacuo. The residue, diluted with methanol, was passed down an Isolute® SCX-2 cartridge eluting with methanol and then 2M methanolic ammonia. The solution was concentrated in vacuo and the product was purified by chromatography on silica by eluting with 0-10% methanol in DCM to give the title compound (293 mg).

LCMS (Method 1): Rt=0.71 min, m/z 500.0/502.0 $[M+H]^+$

Intermediates H3 and H4

The following intermediates were prepared using a procedure similar to that used for the synthesis of intermediate H2 by replacing intermediate F1 with those indicated in the table below.

Intermediate H5

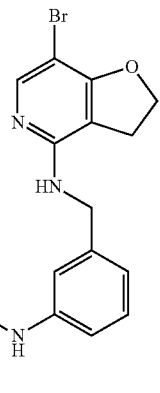

| | Structure | Starting material | LC-MS |
|---|---|---|---|
| H3 | 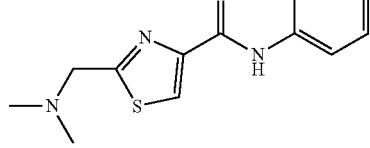 | Intermediate F3 | Rt = 0.65 min, m/z 500.8/502.8 $[M + H]^+$ (Method 1) |
| H4 | | Intermediate F4 | Rt = 0.85 min, m/z 501.1/503.1 $[M + H]^+$ (Method 1) |

N-(3-(((7-Bromo-2,3-dihydrofuro[3,2-c]pyridin-4-yl)amino)methyl)phenyl)-2 ((dimethylamino) methyl)thiazole-4-carboxamide (Intermediate H5)

2-((Dimethylamino)methyl)thiazole-4-carboxylic acid hydrochloride (69.6 mg, 0.31 mmol), COMU (134 mg, 0.31 mmol) and DIPEA (0.342 mL, 1.25 mmol) were dissolved in anhydrous DCM (4 mL) and stirred for 10 min prior to the addition of intermediate F2 (100 mg, 0.31 mmol) and a further eq. of DIPEA. The mixture was stirred for 1 hr at RT, then diluted with DCM (20 mL) and washed twice with aqueous saturated NaHCO$_3$ (20 mL each). The organic phase was evaporated under vacuum and purified by reversed phase flash chromatography on C18-silica by eluting with 0-60% A to B (A=water/acetonitrile 95/5+0.1% HCOOH, B:A=water/acetonitrile 5/95+0.1% HCOOH) to give the desired intermediate (123 mg).

LCMS (Method 9): Rt=0.46 min, m/z 488.0/490.0 [M+H]$^+$

Intermediate H6

The following intermediate was prepared using a procedure similar to that used for the synthesis of intermediate H5 by replacing 2-((dimethylamino)methyl)thiazole-4-carboxylic acid hydrochloride with the indicated starting material.

| | Structure | Starting material | LC-MS |
|---|---|---|---|
| H6 | 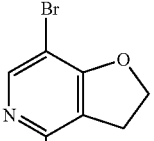 | 5-Methyl-4,5,6,7-tetrahydrothiazolo[4,5-c]pyridine-2-carboxylic acid | Rt = 0.47 min, m/z 500.0/501.9 [M + H]$^+$ (Method 9) |

Intermediate H7

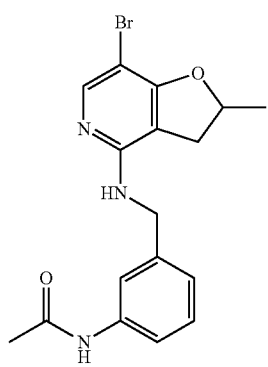 [SMILES: CC(=O)Nc1cccc(CNc2ncc(Br)c3c2CC(C)O3)c1]

N-(3-(((7-Bromo-2-methyl-2,3-dihydrofuro[3,2-c]pyridin-4-yl)amino)methyl)phenyl)acetamide (Intermediate H7)

Intermediate H7 was prepared using a procedure similar to that used for the synthesis of intermediate E1 by replacing intermediate C1 with intermediate C2 and methyl 3-formylbenzoate with N-(3-formylphenyl)acetamide.

LCMS (Method 9): Rt=0.59 min, m/z 375.6/377.7 [M+H]$^+$

Intermediate H8

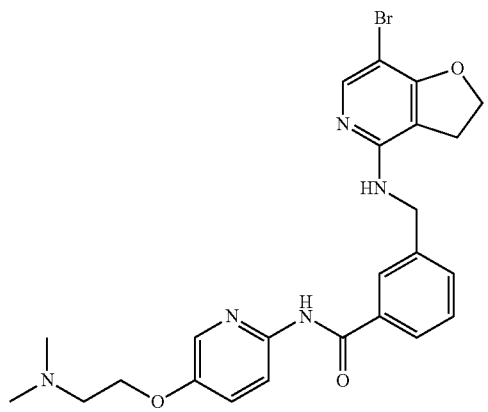 [SMILES: CN(C)CCOc1ccc(NC(=O)c2cccc(CNc3ncc(Br)c4c3CCO4)c2)nc1]

3-(((7-Bromo-2,3-dihydrofuro[3,2-c]pyridin-4-yl)amino)methyl)-N-(5-(2-(dimethylamino)ethoxy)pyridin-2-yl)benzamide (Intermediate H9)

To a stirred solution of Intermediate F1 (400 mg, 1.15 mmol), 5-(2-dimethylamino-ethoxy)-pyridin-2-ylamine (0.23 mg, 1.26 mmol) and TBTU (440 mg, 1.37 mmol) in DCM (12 mL) was added DIPEA (0.60 mL, 3.44 mmol) and the resulting mixture was stirred at ambient temperature for 18 h. A further amount of TBTU (1 eq) was added and the mixture was stirred for 48 h. The reaction mixture was diluted with DCM and washed with water. The organic layer was dried and concentrated in vacuo to give the title compound (380 mg).

LCMS (Method 2): Rt=1.46 min, m/z 512.3/514.3 [M+H]$^+$

Intermediate I1

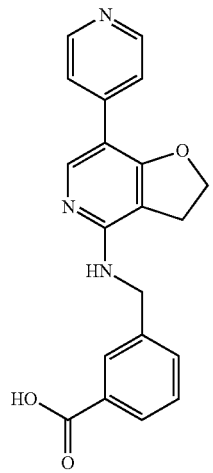 [SMILES: O=C(O)c1cccc(CNc2ncc(-c3ccncc3)c3c2CCO3)c1]

3-(((7-(Pyridin-4-yl)-2,3-dihydrofuro[3,2-c]pyridin-4-yl)amino)methyl)benzoic Acid (Intermediate I1)

To a solution of intermediate G1 (1.92 g, 0.0055 mmol) in THF (34 mL) and methanol (34 mL), an aqueous solution of lithium hydroxide (1.15 g of LiOH*H$_2$O in 34 mL of water) was added and resulting mixture was stirred at RT over 5 h. The organic solvents were evaporated and the residual aqueous solution neutralized with concentrated hydrochloric acid. After appearance of a precipitate, the mixture was sonicated for few minutes, then a small amount of NaCl was added and the mixture stirred for 10 min at RT. The resulting solid was collected by filtration, washed with water and dried to give the title compound (1.92 g).

LCMS (Method 9): Rt=0.35 min, m/z 347.9 [M+H]$^+$

Intermediate I2

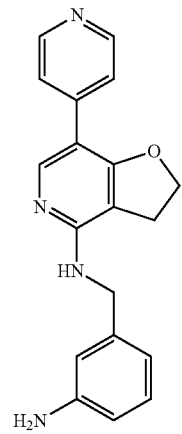

N-(3-Aminobenzyl)-7-(pyridin-4-yl)-2,3-dihydrofuro[3,2-c]pyridin-4-amine Dihydrochloride (Intermediate I2)

Intermediate G2 (371 mg, 0.89 mmol) was dissolved in MeOH (7 mL) and the solution was treated with concentrated 37% w/w aqueous hydrochloric acid (7 mL). The resulting solution was stirred for 1 h, then evaporated to dryness to give the title compound (360 mg) that was used in subsequent steps without further purification.

LCMS (Method 9): Rt=0.18 min, m/z 319.1 [M+H]$^+$

Intermediate J1

Step A

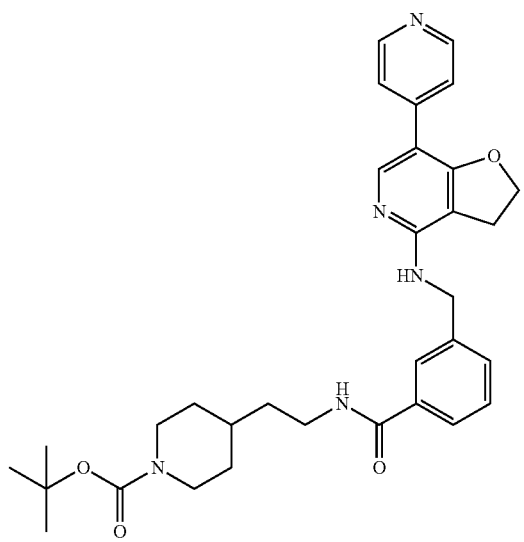 [SMILES: CC(C)(C)OC(=O)N1CCC(CCNC(=O)c2cccc(CNc3ncc(-c4ccncc4)c4c3CCO4)c2)CC1]

tert-Butyl 4-(2-(3-(((7-(pyridin-4-yl)-2,3-dihydrofuro[3,2-c]pyridin-4-yl)-amino)methyl)benzamido)ethyl)piperidine-1-carboxylate (Intermediate J1-a)

A solution of intermediate I1 (0.5 g, 1.44 mmol), tert-butyl 4-(2-aminoethyl)piperidine-1-carboxylate (0.362 g, 1.58 mmol), TBTU (0.56 g, 1.73 mmol) and DIPEA (0.75 mL, 4.32 mmol) in DMF (10 mL) was stirred at RT for 18 h. The reaction mixture was diluted with EtOAc (20 mL), washed with water (15 mL) and saturated aqueous NaCl (15 mL). The organic layer was dried through a phase separator and concentrated in vacuo. Purification by chromatography on silica by eluting with 0-10% methanol in DCM afforded the title compound (600 mg).

LCMS (Method 1): Rt=1.06 min, m/z 558.1 [M+H]$^+$

Step B

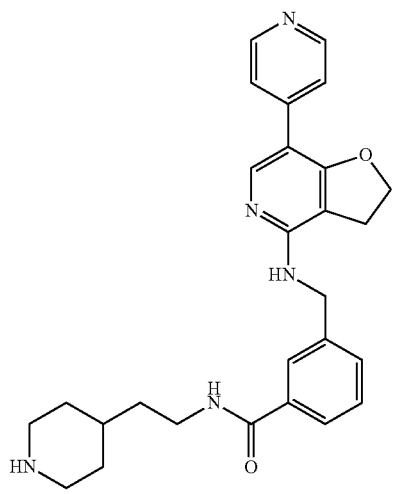 [SMILES: O=C(NCCC1CCNCC1)c1cccc(CNc2ncc(-c3ccncc3)c3c2CCO3)c1]

N-(2-(Piperidin-4-yl)ethyl)-3-(((7-(pyridin-4-yl)-2,3-dihydrofuro[3,2-c]pyridin-4-yl)amino)methyl)benzamide (Intermediate J1)

A mixture of intermediate J1-a (0.5 g, 0.90 mmol) in DCM (6 mL) and TFA (2 mL) was stirred at RT for 2 h. The reaction mixture was diluted with methanol, loaded onto an Isolute® SCX-2 cartridge, washed with methanol and eluted with 7N methanolic ammonia. The solution was concentrated in vacuo to afford the title compound (440 mg).

LCMS (Method 5): Rt=1.70 min, m/z 458.0 [M+H]$^+$

Intermediates J2

The following intermediate was prepared by a two steps process from intermediate I1 using a similar procedure as described for intermediate J1 by replacing in step a the given amine.

| | Structure | Amine | LC-MS |
|---|---|---|---|
| J2 | 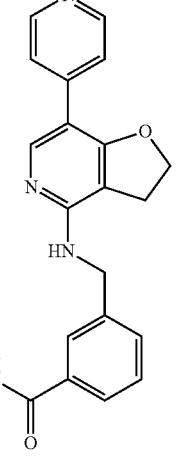 | tert-Butyl 5-aminohexahydrocyclopenta[c]pyrrole-2(1H)-carboxylate | Rt = 1.74 min, m/z 456.3 [M + H]+ (Method 5) |

Preparation of Examples

Example 1

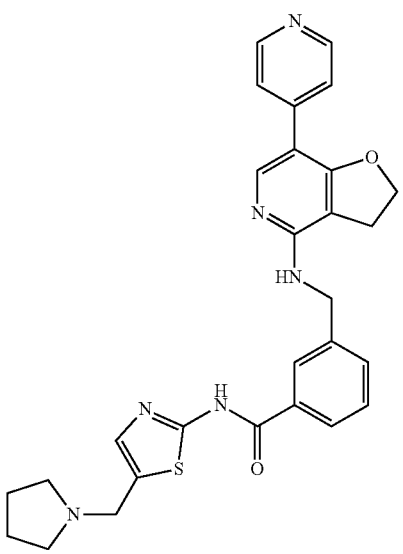 [SMILES: O=C(Nc1ncc(CN2CCCC2)s1)c1cccc(CNc2ncc(-c3ccncc3)c3c2CCO3)c1]

3-(((7-(Pyridin-4-yl)-2,3-dihydrofuro[3,2-c]pyridin-4-yl)amino)methyl)-N-(5-(pyrrolidin-1-ylmethyl)thiazol-2-yl)benzamide (Example 1)

A solution of intermediate I1 (110 mg, 0.317 mmol), intermediate A1 (64 mg, 0.348 mmol), TBTU (132 mg, 0.412 mmol) and DIPEA (0.22 mL, 1.27 mmol) in DMF (4.0 mL) was stirred at RT for 6 h. The reaction mixture was diluted with EtOAc (5 mL) and washed with water (5 mL). The organic layer was dried over $Na_2SO_4$ and concentrated in vacuo. The residue was purified by MDAP preparative HPLC (Kinetex C18 5 μm 50×4.6 mmL, 10%-95% acetonitrile in water+0.1% HCOOH). The relevant fractions were combined and loaded onto an Isolute® SCX-2 cartridge, washed with methanol and the product was eluted with 2N methanolic ammonia. The residue was concentrated in vacuo and further purified by MDAP (Xbridge Phenyl 19×150 mm, 10 μm 40-100% methanol/$H_2O$ (10 mM $NH_4CO_3$), 20 mL/min, RT) to afford a pale beige powder (3.9 mg).

LCMS (Method 4): Rt=1.89 min, m/z 513.2 [M+H]+.

$^1$H NMR (300 MHz, DMSO-d6) δ 12.48 (weak s, 1H), 8.51-8.47 (m, 2H), 8.22 (d, J=4.7 Hz, 1H), 8.03 (s, 1H), 7.94 (d, J=7.6 Hz, 1H), 7.67-7.63 (m, 2H), 7.58 (d, J=7.7 Hz, 1H), 7.46 (t, J=7.7 Hz, 1H), 7.35 (s, 1H), 7.17 (t, J=6.2 Hz, 1H), 4.78-4.68 (m, 4H), 3.75 (s, 2H), 3.09 (t, J=8.8 Hz, 2H), 1.71 (dd, J=3.1, 6.3 Hz, 4H).

Examples 2-24

The following examples were prepared from intermediate I1 and the amine given in a manner 'analogous' or 'similar' to that used for example 1. Such procedures may involve minor variations, for example reaction temperature, reagent/solvent amount, reaction time, work-up conditions or chromatographic purification conditions (eg. HPLC-MDAP or flash chromatography). In some cases, where modification involved reaction solvent (eg. DCM-DMF mix instead of DMF) or coupling agents (e.g. HATU instead of TBTU), such changes were reported as a note.

| Ex | Structure-Name | Amine | ¹H NMR | LC-MS |
|---|---|---|---|---|
| 2 | 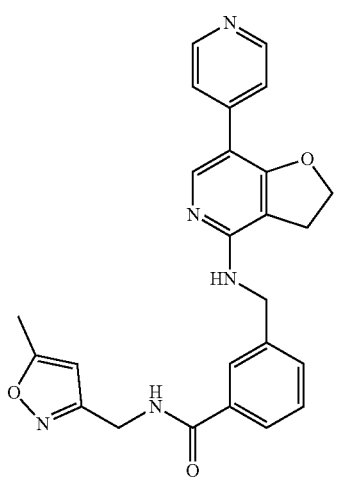 [SMILES: Cc1cc(CNC(=O)c2cccc(CNc3ncc(-c4ccncc4)c4c3CCO4)c2)no1]<br>N-((5-methylisoxazol-3-yl)methyl)-3-(((7-(pyridin-4-yl)-2,3-dihydrofuro[3,2-c]pyridin-4-yl)amino)methyl)benzamide | (5-Methylisoxazol-3-yl)methanamine | (400 MHz, DMSO-d6) δ 9.06 (dd, J = 5.9, 5.9 Hz, 1H), 8.52-8.50 (m, 2H), 8.23 (s, 1H), 7.88 (s, 1H), 7.76-7.70 (m, 1H), 7.67-7.65 (m, 2H), 7.54-7.49 (m, 1H), 7.45-7.39 (m, 1H), 7.16 (t, J = 6.1 Hz, 1H), 6.15 (s, 1H), 4.75 (t, J = 9.0 Hz, 2H), 4.69 (d, J = 6.0 Hz, 2H), 4.46 (d, J = 5.9 Hz, 2H), 3.09 (t, J = 8.9 Hz, 2H), 2.37 (s, 3H). | Rt = 2.18 min, m/z 442.6 [M + H]⁺ (Method 5) |
| 3 | 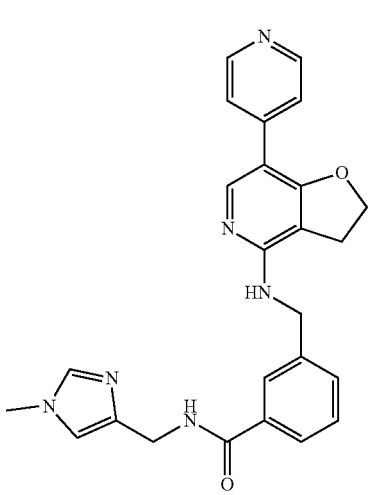 [SMILES: Cn1cnc(CNC(=O)c2cccc(CNc3ncc(-c4ccncc4)c4c3CCO4)c2)c1]<br>N-((1-methyl-1H-imidazol-4-yl)methyl)-3-(((7-(pyridin-4-yl)-2,3-dihydrofuro[3,2-c]pyridin-4-yl)amino)methyl)benzamide | (1-Methyl-1H-imidazol-4-yl)methanamine | (400 MHz, DMSO-d6) δ 8.76 (t, J = 5.7 Hz, 1H), 8.52-8.50 (m, 2H), 8.23 (s, 1H), 7.87 (s, 1H), 7.73 (d, J = 7.8 Hz, 1H), 7.66 (q, J = 2.1 Hz, 2H), 7.49 (d, J = 5.9 Hz, 2H), 7.41-7.36 (m, 1H), 7.14 (t, J = 6.1 Hz, 1H), 6.94 (d, J = 1.1 Hz, 1H), 4.75 (t, J = 8.9 Hz, 2H), 4.68 (d, J = 6.0 Hz, 2H), 4.32 (d, J = 5.5 Hz, 2H), 3.59 (s, 3H), 3.08 (t, J = 9.0 Hz, 2H). | Rt = 1.61 min, m/z 441.0 [M + H]⁺ (Method 5) |

| Ex | Structure-Name | Amine | ¹H NMR | LC-MS |
|---|---|---|---|---|
| 4 | N-(3-fluoropropyl)-3-(((7-(pyridin-4-yl)-2,3-dihydrofuro[3,2-c]pyridin-4-yl)amino)methyl)benzamide | 3-Fluoropropan-1-amine | (400 MHz, DMSO-d6) δ 8.54-8.50 (m, 3H), 8.22 (d, J = 3.3 Hz, 1H), 7.84 (s, 1H), 7.71-7.65 (m, 3H), 7.51-7.47 (m, 1H), 7.40 (t, J = 7.7 Hz, 1H), 7.17-7.12 (m, 1H), 4.75 (t, J = 8.9 Hz, 2H), 4.69 (d, J = 6.1 Hz, 2H), 4.58 (t, J = 5.8 Hz, 1H), 4.46 (t, J = 5.9 Hz, 1H), 3.12-3.05 (m, 3H), 1.98-1.84 (m, 2H). | Rt = 2.09 min, m/z 407.0 [M + H]⁺ (Method 5) |
| 5 | 3-(((7-(pyridin-4-yl)-2,3-dihydrofuro[3,2-c]pyridin-4-yl)amino)methyl)-N-(pyrimidin-5-ylmethyl)benzamide | Pyrimidin-5-ylmethanamine | (400 MHz, DMSO-d6) δ 9.13 (t, J = 6.1 Hz, 1H), 9.10 (s, 1H), 8.78 (s, 2H), 8.52-8.50 (m, 2H), 8.23 (s, 1H), 7.87 (s, 1H), 7.75-7.72 (m, 1H), 7.67-7.65 (m, 2H), 7.54-7.50 (m, 1H), 7.42 (t, J = 7.6 Hz, 1H), 7.15 (t, J = 6.1 Hz, 1H), 4.74 (t, J = 9.0 Hz, 2H), 4.69 (d, J = 6.0 Hz, 2H), 4.50 (d, J = 5.8 Hz, 2H), 3.08 (t, J = 8.9 Hz, 2H). | Rt = 1.91 min, m/z 439.0 [M + H]⁺ (Method 5) |

-continued

| Ex | Structure-Name | Amine | ¹H NMR | LC-MS |
|---|---|---|---|---|
| 6 | N-(isoxazol-3-ylmethyl)-3-(((7-(pyridin-4-yl)-2,3-dihydrofuro[3,2-c]pyridin-4-yl)amino)methyl)benzamide | Isoxazol-3-ylmethanamine | (400 MHz, DMSO-d6) δ 9.09 (t, J = 5.9 Hz, 1H), 8.84 (d, J = 1.8 Hz, 1H), 8.51 (m, 2H), 8.23 (s, 1H), 7.88 (s, 1H), 7.74 (d, J = 7.9 Hz, 1H), 7.66 (m, 2H), 7.52 (d, J = 7.9 Hz, 1H), 7.42 (t, J = 7.7 Hz, 1H), 7.16 (t, J = 6.1 Hz, 1H), 6.51 (d, J = 1.8 Hz, 1H), 4.75 (t, J = 8.9 Hz, 2H), 4.69 (d, J = 6.1 Hz, 2H), 4.55 (d, J = 5.9 Hz, 2H), 3.08 (t, J = 8.9 Hz, 2H). | Rt = 2.04 min, m/z 428.0 [M + H]⁺ (Method 5) |
| 7 | 3-(((7-(pyridin-4-yl)-2,3-dihydrofuro[3,2-c]pyridin-4-yl)amino)methyl)-N-(tetrahydro-2H-pyran-4-yl)benzamide | Tetrahydro-2H-pyran-4-amine | (400 MHz, DMSO-d6) δ 8.52-8.49 (m, 2H), 8.32-8.27 (m, 1H), 8.23 (s, 1H), 7.84 (s, 1H), 7.70 (d, J = 7.8 Hz, 1H), 7.66 (q, J = 2.0 Hz, 2H), 7.51-7.47 (m, 1H), 7.39 (t, J = 7.7 Hz, 1H), 7.15 (t, J = 6.1 Hz, 1H), 4.75 (t, J = 9.0 Hz, 2H), 4.69 (d, J = 6.0 Hz, 2H), 4.03-3.96 (m, 1H), 3.92-3.85 (m, 2H), 3.41 (t, J = 8.7 Hz, 2H), 3.08 (t, J = 8.9 Hz, 2H), 1.79-1.72 (m, 2H), 1.65-1.53 (m, 2H). | Rt = 3.82 min, m/z 431.0 [M + H]⁺ (Method 6) |

-continued

| Ex | Structure-Name | Amine | ¹H NMR | LC-MS |
|---|---|---|---|---|
| 8 | N-((1-N-(oxazol-4-ylmethyl)-3-(((7-(pyridin-4-yl)-2,3-dihydrofuro[3,2-c]pyridin-4-yl)amino)methyl)benzamide | Oxazol-4-ylmethanamine | (400 MHz, DMSO-d6) δ 8.91 (t, J = 5.8 Hz, 1H), 8.52-8.50 (m, 2H), 8.32 (d, J = 1.0 Hz, 1H), 8.23 (s, 1H), 7.96 (d, J = 1.0 Hz, 1H), 7.87 (s, 1H), 7.74 (d, J = 7.7 Hz, 1H), 7.67-7.65 (m, 2H), 7.52-7.48 (m, 1H), 7.43-7.38 (m, 1H), 7.17-7.12 (m, 1H), 4.75 (t, J = 8.9 Hz, 2H), 4.69 (d, J = 5.9 Hz, 2H), 4.38 (d, J = 5.1 Hz, 2H), 3.08 (t, J = 8.9 Hz, 2H). | Rt = 1.92 min, m/z 428.0 [M + H]⁺ (Method 5) |
| 9 | hydroxycyclopropyl)methyl)-3-(((7-(pyridin-4-yl)-2,3-dihydrofuro[3,2-c]pyridin-4-yl)amino)methyl)benzamide | 1-(Aminomethyl)-cyclopropan-1-ol | (400 MHz, DMSO-d6) δ 8.52-8.50 (m, 2H), 8.37 (t, J = 5.7 Hz, 1H), 8.24-8.23 (m, 1H), 7.86 (s, 1H), 7.73 (d, J = 7.8 Hz, 1H), 7.66 (q, J = 2.1 Hz, 2H), 7.51-7.48 (m, 1H), 7.40 (t, J = 7.7 Hz, 1H), 7.16 (t, J = 6.1 Hz, 1H), 5.46-5.42 (m, 1H), 4.75 (t, J = 9.0 Hz, 2H), 4.69 (d, J = 6.0 Hz, 2H), 3.44 (d, J = 5.6 Hz, 2H), 3.08 (t, J = 9.0 Hz, 2H), 0.56-0.55 (m, 4H). | Rt = 1.92 min, m/z 417.0 [M + H]⁺ (Method 5) |

| Ex | Structure-Name | Amine | ¹H NMR | LC-MS |
|----|---------------|-------|--------|-------|
| 10 | N-((4-methylmorpholin-2-yl)methyl)-3-(((7-(pyridin-4-yl)-2,3-dihydrofuro[3,2-c]pyridin-4-yl)amino)methyl)benzamide | (4-Methyl-morpholin-2-yl)methanamine | (400 MHz, DMSO-d6) δ 8.52-8.49 (m, 3H), 8.24-8.23 (m, 1H), 7.85 (s, 1H), 7.71 (d, J = 7.8 Hz, 1H), 7.66 (q, J = 2.1 Hz, 2H), 7.51-7.48 (m, 1H), 7.40 (t, J = 7.7 Hz, 1H), 7.17-7.12 (m, 1H), 4.75 (t, J = 9.0 Hz, 2H), 4.68 (d, J = 6.0 Hz, 2H), 3.81-3.75 (m, 1H), 3.62-3.55 (m, 1H), 3.52-3.44 (m, 1H), 3.32-3.26 (m, 2H), 3.08 (t, J = 8.9 Hz, 2H), 2.71 (d, J = 11.3 Hz, 1H), 2.58 (d, J = 11.7 Hz, 1H), 2.16 (s, 3H), 2.00-1.92 (m, 1H), 1.71 (t, J = 10.6 Hz, 1H). | Rt = 1.57 min, m/z 460.0 [M + H]⁺ (Method 5) |
| 11 | N-(pyridin-4-yl)-3-(((7-(pyridin-4-yl)-2,3-dihydrofuro[3,2-c]pyridin-4-yl)amino)methyl)benzamide | Pyridin-4-amine | (400 MHz, DMSO-d6) δ 10.63-10.61 (m, 1H), 8.52-8.48 (m, 4H), 8.24-8.23 (m, 1H), 7.95-7.93 (m, 1H), 7.84 (d, J = 7.9 Hz, 1H), 7.79 (q, J = 2.1 Hz, 2H), 7.68-7.58 (m, 3H), 7.50 (t, J = 7.6 Hz, 1H), 7.22-7.17 (m, 1H), 4.79-4.72 (m, 4H), 3.10 (t, J = 8.9 Hz, 2H). | Rt = 1.79 min, m/z 424.0 [M + H]⁺ (Method 5) |

| Ex | Structure-Name | Amine | ¹H NMR | LC-MS |
|---|---|---|---|---|
| 12 | 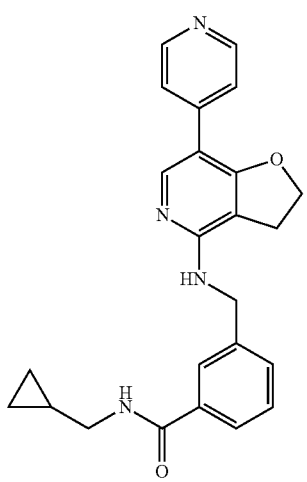 [SMILES: O=C(NCC1CC1)c1cccc(CNc2ncc(-c3ccncc3)c3c2CCO3)c1]<br>N-(cyclopropylmethyl)-3-(((7-(pyridin-4-yl)-2,3-dihydrofuro[3,2-c]pyridin-4-yl)amino)methyl)benzamide | Cyclopropyl-methanamine | (400 MHz, DMSO-d6) δ 8.56-8.52 (m, 3H), 8.25 (s, 1H), 7.87 (s, 1H), 7.74-7.67 (m, 3H), 7.53-7.49 (m, 1H), 7.44-7.39 (m, 1H), 7.17 (t, J = 6.1 Hz, 1H), 4.77 (t, J = 9.0 Hz, 2H), 4.71 (d, J = 6.0 Hz, 2H), 3.17 (t, J = 6.2 Hz, 2H), 3.11 (t, J = 8.9 Hz, 2H), 1.11-1.00 (m, 1H), 0.48-0.42 (m, 2H), 0.28-0.23 (m, 2H). | Rt = 2.3 min, m/z 401.0 [M + H]⁺ (Method 5) |
| 13 | 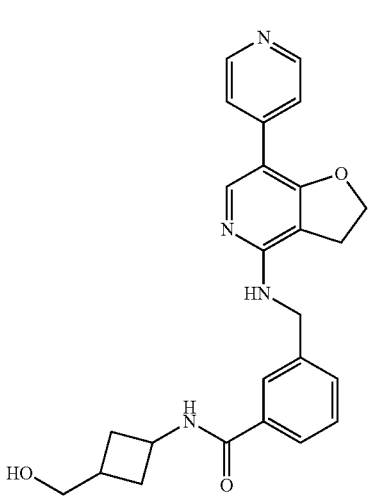 [SMILES: O=C(NC1CC(CO)C1)c1cccc(CNc2ncc(-c3ccncc3)c3c2CCO3)c1]<br>N-(3-(hydroxymethyl)cyclobutyl)-3-(((7-(pyridin-4-yl)-2,3-dihydrofuro[3,2-c]pyridin-4-yl)amino)methyl)benzamide | (3-Aminocyclo-butyl)methanol | (400 MHz, DMSO-d6) δ 8.55-8.50 (m, 3H), 8.23 (s, 1H), 7.83 (s, 1H), 7.72-7.65 (m, 3H), 7.50-7.46 (m, 1H), 7.39 (t, J = 7.7 Hz, 1H), 7.14 (t, J = 6.1 Hz, 1H), 4.75 (t, J = 8.9 Hz, 2H), 4.68 (d, J = 6.0 Hz, 2H), 4.52-4.48 (m, 1H), 4.32-4.24 (m, 1H), 3.38 (t, J = 5.7 Hz, 2H) 3.08 (t, J = 8.9 Hz, 2H), 2.31-2.22 (m, 2H), 2.10-2.07 (m, 1H), 1.84-1.74 (m, 2H). | Rt = 1.94 min, m/z 431.0 [M + H]⁺ (Method 5) |

| Ex | Structure-Name | Amine | ¹H NMR | LC-MS |
|---|---|---|---|---|
| 14 | N-(5-methoxypyridin-2-yl)-3-(((7-(pyridin-4-yl)-2,3-dihydrofuro[3,2-c]pyridin-4-yl)amino)methyl)benzamide | 5-Methoxypyridin-2-amine | (400 MHz, DMSO-d6) δ 10.64-10.62 (m, 1H), 8.61-8.58 (m, 2H), 8.37 (s, 1H), 8.15-8.09 (m, 2H), 8.00 (s, 1H), 7.93-7.89 (m, 3H), 7.57-7.43 (m, 4H), 4.80 (dd, J = 9.0, 9.0 Hz, 2H), 4.74 (d, J = 6.0 Hz, 2H), 3.85 (s, 3H), 3.15-3.08 (m, 2H). | Rt = 2.51 min, m/z 454.0 [M + H]⁺ (Method 5) |
| 15 | N-((1-(tert-butyl)-5-oxopyrrolidin-3-yl)methyl)-3-(((7-(pyridin-4-yl)-2,3-dihydrofuro[3,2-c]pyridin-4-yl)amino)methyl)benzamide | 4-(Aminomethyl)-1-(tert-butyl)-pyrrolidin-2-one | (400 MHz, DMSOd6) δ 8.63-8.58 (m, 1H), 8.52-8.50 (m, 2H), 8.23 (s, 1H), 7.83 (s, 1H), 7.71-7.65 (m, 3H), 7.52-7.48 (m, 1H), 7.41 (t, J = 7.6 Hz, 1H), 7.18-7.13 (m, 1H), 4.75 (t, J = 8.9 Hz, 2H), 4.69 (d, J = 6.0 Hz, 2H), 3.51 (dd, J = 7.5, 9.7 Hz, 1H), 3.29-3.22 (m, 3H), 3.12-3.05 (m, 2H), 2.48-2.41 (m, 1H), 2.40-2.32 (m, 1H), 2.05 (dd, J = 5.0, 16.3 Hz, 1H), 1.31-1.30 (m, 9H). | Rt = 2.4 min, m/z 500.2 [M + H]⁺ (Method 5) |

| Ex | Structure-Name | Amine | ¹H NMR | LC-MS |
|---|---|---|---|---|
| 16 | 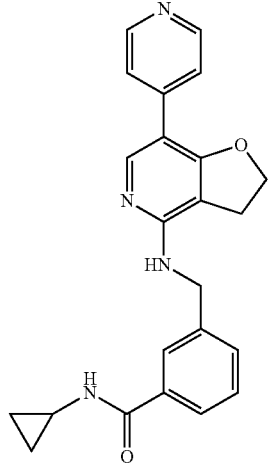 [SMILES: O=C(NC1CC1)c1cccc(CNc2ncc(-c3ccncc3)c3c2CCO3)c1]<br>N-cyclopropyl-3-(((7-(pyridin-4-yl)-2,3-dihydrofuro[3,2-c]pyridin-4-yl)amino)methyl)benzamide | Cyclopropyl-amine | (400 MHz, DMSO-d6) δ 8.52-8.50 (m, 2H), 8.42 (d, J = 4.1 Hz, 1H), 8.23 (s, 1H), 8.19 (s, 1H), 7.81 (s, 1H), 7.68-7.64 (m, 2H), 7.48 (d, J = 7.5 Hz, 1H), 7.38 (t, J = 7.6 Hz, 1H), 7.14 (t, J = 6.1 Hz, 1H), 4.75 (t, J = 8.9 Hz, 2H), 4.68 (d, J = 6.1 Hz, 2H), 3.08 (t, J = 8.9 Hz, 2H), 2.88-2.81 (m, 1H), 0.73-0.67 (m, 2H), 0.60-0.55 (m, 2H). | Rt = 2.05 min, m/z 387.0 [M + H]⁺ (Method 5) |
| 17 | 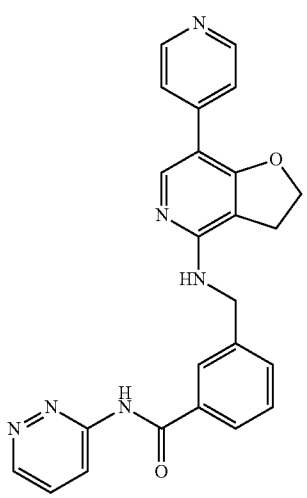 [SMILES: O=C(Nc1cccnn1)c1cccc(CNc2ncc(-c3ccncc3)c3c2CCO3)c1]<br>N-(pyridazin-3-yl)-3-(((7-(pyridin-4-yl)-2,3-dihydrofuro[3,2-c]pyridin-4-yl)amino)methyl)benzamide | Pyridazin-3-amine | (400 MHz, DMSO-d6) δ 11.44-11.40 (m, 1H), 9.03 (dd, J = 1.4, 4.7 Hz, 1H), 8.52-8.50 (m, 2H), 8.39 (dd, J = 1.4, 9.0 Hz, 1H), 8.25-8.24 (m, 1H), 8.05 (s, 1H), 7.96 (d, J = 7.7 Hz, 1H), 7.75 (dd, J = 4.8, 9.0 Hz, 1H), 7.67 (q, J = 2.0 Hz, 2H), 7.60 (d, J = 8.0 Hz, 1H), 7.51-7.46 (m, 1H), 7.18 (t, J = 6.1 Hz, 1H), 4.79-4.71 (m, 4H), 3.10 (t, J = 8.9 Hz, 2H). | Rt = 2.13 min, m/z 425.0 [M + H]⁺ (Method 5) |

| Ex | Structure-Name | Amine | ¹H NMR | LC-MS |
|---|---|---|---|---|
| 18 | 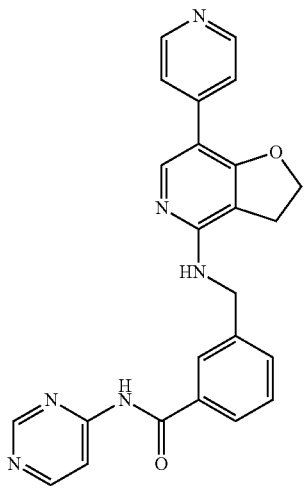 [SMILES: O=C(Nc1ccncn1)c1cccc(CNc2ncc(-c3ccncc3)c3c2CCO3)c1]<br>3-(((7-(pyridin-4-yl)-2,3-dihydrofuro[3,2-c]pyridin-4-yl)amino)methyl)-N-(pyrimidin-4-yl)benzamide | pyrimidin-4-amine | (400 MHz, DMSO-d6) δ 11.20 (s, 1H), 8.95 (d, J = 1.0 Hz, 1H), 8.71 (d, J = 5.8 Hz, 1H), 8.50-8.48 (m, 2H), 8.23-8.19 (m, 2H), 7.99 (s, 1H), 7.89 (d, J = 7.9 Hz, 1H), 7.65 (q, J = 2.1 Hz, 2H), 7.58 (d, J = 7.8 Hz, 1H), 7.46 (t, J = 7.7 Hz, 1H), 7.15 (t, J = 6.1 Hz, 1H), 4.77-4.69 (m, 4H), 3.08 (t, J = 8.9 Hz, 2H). | Rt = 2.13 min, m/z 425.0 [M + H]⁺ (Method 7) |
| 19 | 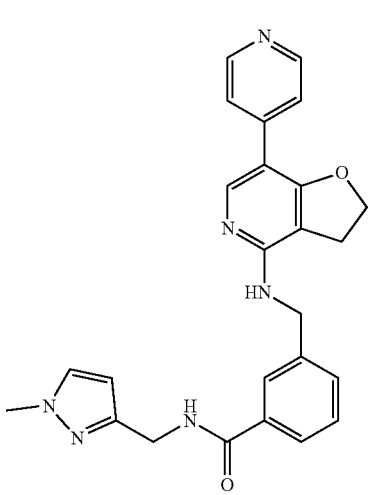 [SMILES: Cn1ccc(CNC(=O)c2cccc(CNc3ncc(-c4ccncc4)c4c3CCO4)c2)n1]<br>N-((1-methyl-1H-pyrazol-3-yl)methyl)-3-(((7-(pyridin-4-yl)-2,3-dihydrofuro[3,2-c]pyridin-4-yl)amino)methyl)benzamide | (1-Methyl-1H-pyrazol-3-yl)methanamine | (400 MHz, DMSO-d6) δ 8.85 (t, J = 5.8 Hz, 1H), 8.52-8.50 (m, 2H), 8.23 (s, 1H), 7.87 (s, 1H), 7.73 (d, J = 7.8 Hz, 1H), 7.66 (q, J = 2.1 Hz, 2H), 7.57 (d, J = 2.1 Hz, 1H), 7.51-7.47 (m, 1H), 7.39 (t, J = 7.7 Hz, 1H), 7.14 (t, J = 6.1 Hz, 1H), 6.12 (d, J = 2.1 Hz, 1H), 4.75 (t, J = 8.9 Hz, 2H), 4.68 (d, J = 6.0 Hz, 2H), 4.40 (d, J = 5.9 Hz, 2H), 3.78 (s, 3H), 3.08 (t, J = 8.9 Hz, 2H). | Rt = 3.76 min, m/z 441.0 [M + H]⁺ (Method 6) |

| Ex | Structure-Name | Amine | ¹H NMR | LC-MS |
|---|---|---|---|---|
| 20 | 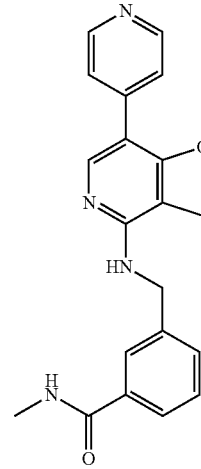<br>N-methyl-3-(((7-(pyridin-4-yl)-2,3-dihydrofuro[3,2-c]pyridin-4-yl)amino)methyl)benzamide | Methylamine | (400 MHz, DMSO-d6) 8.49 (d, J = 6.3 Hz, 2H), 8.39 (dd, J = 4.3, 8.9 Hz, 1H), 8.22 (s, 1H), 7.81 (dd, J = 1.3, 1.3 Hz, 1H), 7.68-7.64 (m, 3H), 7.47 (ddd, J = 1.3, 1.3, 7.7 Hz, 1H), 7.38 (dd, J = 7.6, 7.6 Hz, 1H), 7.13 (dd, J = 6.0, 6.0 Hz, 1H), 4.73 (t, J = 8.8 Hz, 2H), 4.67 (d, J = 6.4 Hz, 2H), 3.07 (t, J = 8.7 Hz, 2H), 2.77 (d, J = 4.4 Hz, 3H). | Rt = 3.13 min, m/z 361.0 [M + H]⁺ (Method 8) |
| 21 | 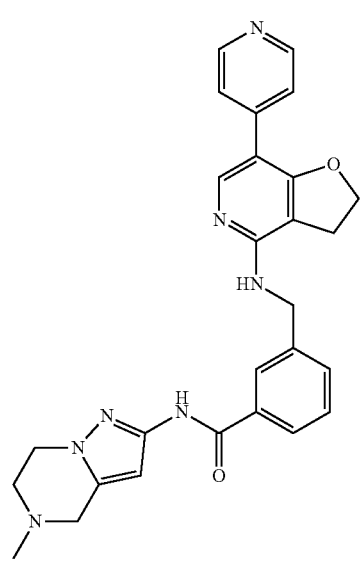 [SMILES: CN1CCn2nc(NC(=O)c3cccc(CNc4ncc(-c5ccncc5)c5c4CCO5)c3)cc2C1]<br>N-(5-methyl-4,5,6,7-tetrahydropyrazolo[1,5-a]pyrazin-2-yl)-3-(((7-(pyridin-4-yl)-2,3-dihydrofuro[3,2-c]pyridin-4-yl)amino)methyl)benzamide | 5-methyl-4,5,6,7-tetrahydro-pyrazolo[1,5-a]pyrazin-2-amine | (600 MHz, DMSO-d6) δ 10.73 (s, 1H), 8.49 (d, J = 5.3 Hz, 2H), 8.22 (s, 1H), 7.95 (s, 1H), 7.84 (d, J = 7.7 Hz, 1H), 7.65 (d, J = 5.2 Hz, 2H), 7.51 (d, J = 7.7 Hz, 1H), 7.40 (t, J = 7.7 Hz, 1H), 7.13 (t, J = 6.2 Hz, 1H), 6.40 (s, 1H), 4.71-4.76 (m, 2H), 4.67-4.76 (m, 2H), 3.99 (t, J = 5.5 Hz, 2H), 3.55 (s, 2H), 3.07 (t, J = 9.0 Hz, 2H), 2.8 (t, J = 5.5 Hz, 2H), 2.28 (s, 3H). | Rt = 0.33 min, m/z 481.2 [M + H]⁺ (Method 9) Note: reaction solvent DCM-DMF mix, coupling agent HATU |

-continued

| Ex | Structure-Name | Amine | ¹H NMR | LC-MS |
|---|---|---|---|---|
| 22 | 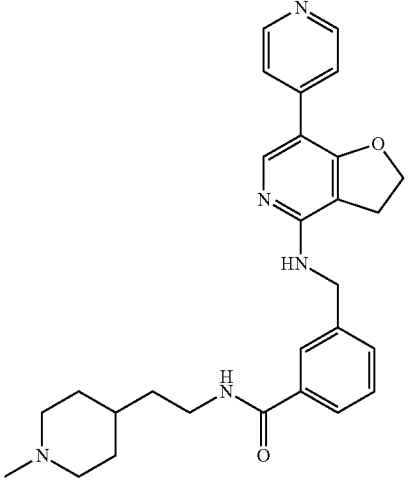 [SMILES: CN1CCC(CCNC(=O)c2cccc(CNc3ncc(-c4ccncc4)c4c3CCO4)c2)CC1]<br>N-(2-(1-methylpiperidin-4-yl)ethyl)-3-(((7-(pyridin-4-yl)-2,3-dihydrofuro[3,2-c]pyridin-4-yl)amino)methyl)benzamide | 2-(1-methylpiperidin-4-yl)ethan-1-amine | (400 MHz, DMSO-d6) δ 8.47 (dd, J = 6.1, 1.7 Hz, 2H), 8.35 (t, J = 5.7 Hz, 1H), 8.20 (s, 1H), 7.79 (br s, 1H), 7.67-7.64 (m, 1H), 7.63 (dd, J = 6.1, 1.7 Hz, 2H), 7.45 (dt, J = 7.7, 1.3 Hz, 1H), 7.36 (t, J = 7.7 Hz, 1H), 7.09 (t, J = 6.1 Hz, 1H), 4.72 (t, J = 8.9 Hz, 2H), 4.65 (d, J = 5.7 Hz, 2H), 3.27-3.22 (m, 2H), 3.05 (t, J = 8.9 Hz, 2H), 2.77-2.69 (m, 2H), 2.13 (br s, 3H), 1.67-1.60 (m, 2H), 1.42 (q, J = 6.8 Hz, 2H), 1.30-1.04 (m, 5H). | Rt = 0.32 min, m/z 472.3 [M + H]⁺ (Method 10) Note: reaction solvent DCM-DMF mix, coupling agent HATU |
| 23 | 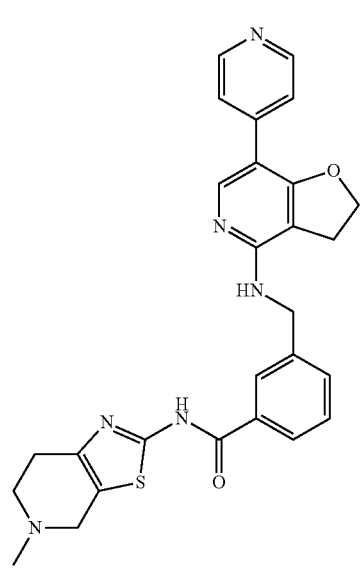 [SMILES: CN1CCc2nc(NC(=O)c3cccc(CNc4ncc(-c5ccncc5)c5c4CCO5)c3)sc2C1]<br>N-(5-methyl-4,5,6,7-tetrahydrothiazolo[5,4-c]pyridin-2-yl)-3-(((7-(pyridin-4-yl)-2,3-dihydrofuro[3,2-c]pyridin-4-yl)amino)methyl)benzamide | 5-methyl-4,5,6,7-tetrahydrothiazolo[5,4-c]pyridin-2-amine | (400 MHz, DMSO-d6) δ 12.42 (s, 1H), 8.46 (d, J = 6.1 Hz, 2H), 8.19 (s, 1H), 8.00 (s, 1H), 7.91 (d, J = 7.9 Hz, 1H), 7.62 (d, J = 6.4 Hz, 2H), 7.54 (d, J = 7.7 Hz, 1H), 7.45-7.40 (m, 1H), 7.10 (t, J = 6.1 Hz, 1H), 4.74-4.65 (m, 4H), 3.48 (s, 2H), 3.05 (t, J = 8.9 Hz, 2H), 2.70-2.64 (m, 4H), 2.35 (s, 3H). | Rt = 0.45 min, m/z 499.2 [M + H]⁺ (Method 10) Note: reaction solvent DCM-DMF mix, coupling agent HATU |

| Ex | Structure-Name | Amine | ¹H NMR | LC-MS |
|---|---|---|---|---|
| 24 | 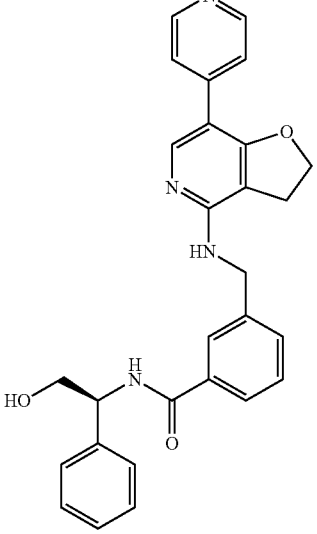<br>(S)-N-(2-hydroxy-1-phenylethyl)-3-(((7-(pyridin-4-yl)-2,3-dihydrofuro[3,2-c]pyridin-4-yl)amino)methyl)benzamide | (S)-2-amino-2-phenylethan-1-ol | (400 MHz, DMSO-d6) 8.60 (d, J = 8.1 Hz, 1H), 8.46 (d, J = 6.1 Hz 2H), 8.18 (s, 1H), 7.83 (s, 1H), 7.73 (d, J = 7.7 Hz, 1H), 7.61 (d, J = 6.4 Hz, 2H), 7.46 (d, J = 7.7 Hz, 1H), 7.40-7.32 (m, 3H), 7.27 (t, J = 7.7 Hz, 2H), 7.22-7.16 (m, 1H), 7.08 (t, J = 6.1 Hz, 1H), 5.06-4.99 (m, 1H), 4.87 (t, J = 5.8 Hz, 1H), 4.70 (t, J = 8.9 Hz, 2H), 4.65 (d, J = 6.1 Hz, 2H), 3.72-3.58 (m, 2H), 3.03 (t, J = 8.9 Hz, 2H). | Rt = 0.62 min, m/z 467.2 [M + H]+ (Method 10) Note: reaction solvent DCM-DMF mix, coupling agent HATU |

Example 25

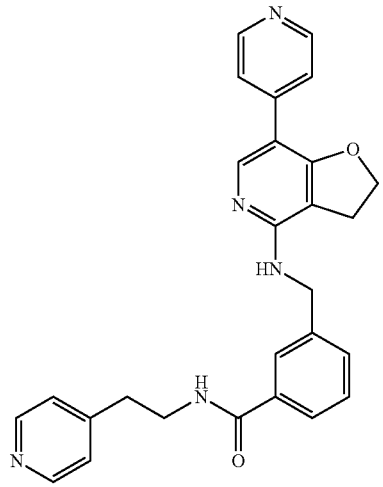 [SMILES: O=C(NCCc1ccncc1)c1cccc(CNc2ncc(-c3ccncc3)c3c2CCO3)c1]

3-(((7-(Pyridin-4-yl)-2,3-dihydrofuro[3,2-c]pyridin-4-yl)amino)methyl)-N-(2-(pyridin-4-yl)ethyl)benzamide (Example 25)

A microwave vial was charged with intermediate G1 (0.055 g, 0.194 mmol), bis(trimethylaluminum)-1,4-diazabicyclo[2.2.2]octane (0.149 g, 0.581 mmol) and 2-(pyridin-4-yl)ethan-1-amine (0.069 mL, 0.581 mmol) in anhydrous THF (3 mL) and the resulting solution was heated at 120° C. for 45 min under microwave irradiation. The reaction was quenched by the addition of water and the mixture distilled at reduced pressure to remove the organic solvent. The resulting aqueous mixture was extracted twice with DCM. The combined organic layers were dried over $Na_2SO_4$ and concentrated to dryness. The crude material was chromatographed on NH-Silica by eluting with 0-10% MeOH in DCM to give the title compound (22 mg).

LCMS (Method 10): Rt=0.39 min, m/z 452.2 [M+H]+.

¹H NMR (300 MHz, DMSO-d6) 8.49 (t, J=5.6 Hz, 1H), 8.46 (d, J=6.1 Hz, 2H), 8.42 (d, J=5.9 Hz, 2H), 8.18 (s, 1H), 7.77-7.73 (m, 1H), 7.62 (d, J=6.1 Hz, 2H), 7.61 (dt, J=7.7, 1.5 Hz, 1H), 7.44 (dt, J=7.7, 1.5 Hz, 1H), 7.34 (t, J=7.7 Hz, 1H), 7.22 (d, J=5.9 Hz 2H), 7.08 (t, J=6.0 Hz, 1H), 4.70 (t, J=8.9 Hz, 2H), 4.63 (d, J=6.1 Hz, 2H), 3.49 (q, J=6.0 Hz, 2H), 3.03 (t, J=8.9 Hz, 2H), 2.83 (t, J=7.1 Hz, 2H).

Examples 26-30

The following examples were prepared from intermediate G1 and the amine given in a manner 'analogous' to that used for example 25. Such procedures may involve minor variations, for example reaction temperature, reagent/solvent amount, reaction time, work-up conditions or chromatographic purification conditions (eg. HPLC-MDAP or flash chromatography).

| Ex | Structure-Name | Amine | ¹H NMR | LC-MS |
|----|----|----|----|----|
| 26 | 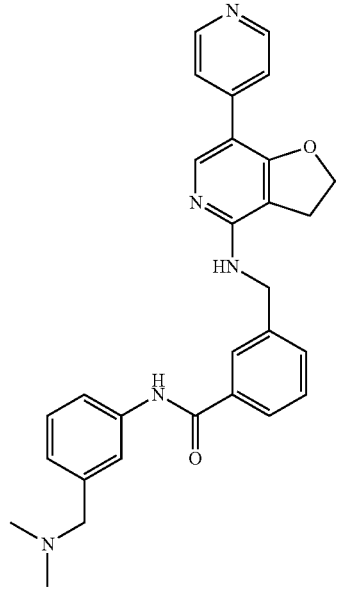 [SMILES: CN(C)Cc1cccc(NC(=O)c2cccc(CNc3ncc(-c4ccncc4)c4c3CCO4)c2)c1]<br>N-(3-((dimethylamino)methyl)phenyl)-3-(((7-(pyridin-4-yl)-2,3-dihydrofuro[3,2-c]pyridin-4-yl)amino)methyl)benzamide | 3-((dimethylamino)methyl)aniline | (400 MHz, DMSO-d6) δ 10.16 (s, 1H), 8.46 (d, J = 6.4 Hz, 2H), 8.19 (s, 1H), 7.89 (t, J = 1.5 Hz, 1H), 7.79 (dt, J = 7.9, 1.5 Hz, 1H), 7.69 (t, J = 1.5 Hz, 1H), 7.65 (d, J = 8.1 Hz, 1H), 7.62 (d, J = 6.4 Hz, 2H), 7.50 (dt, J = 7.7, 1.5 Hz, 1H), 7.42 (t, J = 7.7 Hz, 1H), 7.24 (t, J = 7.9 Hz, 1H), 7.12 (t, J = 6.0 Hz, 1H), 6.97 (d, J = 7.5 Hz, 1H), 4.73-4.66 (m, 3H), 3.33 (s, 2H), 3.05 (t, J = 8.9 Hz, 2H), 2.12 (s, 6H). | Rt = 0.45 min, m/z 480.3 [M + H]⁺ (Method 10) |
| 27 | 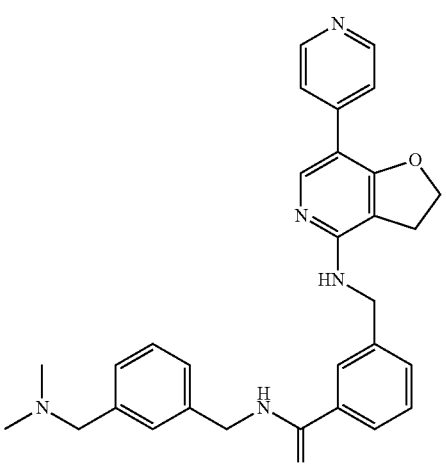<br>N-(3-((dimethylamino)methyl)benzyl)-3-(((7-(pyridin-4-yl)-2,3-dihydrofuro[3,2-c]pyridin-4-yl)amino)methyl)benzamide | 1-(3-(aminomethyl)phenyl)-N,N-dimethylmethanamine | ¹H-NMR (400 MHz, DMSO-d6) δ 8.96 (t, J = 5.9 Hz, 1H), 8.46 (d, J = 6.4 Hz, 2H), 8.18 (s, 1H), 7.84 (s, 1H), 7.71 (dt, J = 7.7, 1.5 Hz, 1H), 7.61 (d, J = 6.4 Hz, 2H), 7.46 (d, J = 7.7 Hz, 1H), 7.36 (t, J = 7.7 Hz, 1H), 7.23-7.19 (m, 2H), 7.16-7.13 (m, 1H), 7.12-7.07 (m, 2H), 4.70 (t, J = 9.0 Hz, 2H), 4.64 (d, J = 6.0 Hz, 2H), 4.43 (d, J = 5.9 Hz, 2H), 3.32-3.29 (m, 2H), 3.03 (t, J = 9.0 Hz, 2H), 2.07 (m, 6H). | Rt = 0.44 min, m/z 494.4 [M + H]⁺ (Method 10) |

-continued

| Ex | Structure-Name | Amine | ¹H NMR | LC-MS |
|---|---|---|---|---|
| 28 | N-(2-morpholinoethyl)-3-(((7-(pyridin-4-yl)-2,3-dihydrofuro[3,2-c]pyridin-4-yl)amino)methyl)benzamide | 2-morpholino-ethan-1-amine | (400 MHz, DMSO-d6) δ 8.46 (d, J = 6.1 Hz, 2H), 8.35-8.29 (m, 1H), 8.18 (s, 1H), 7.77 (s, 1H), 7.65-7.59 (m, 3H), 7.44 (d, J = 7.7 Hz, 1H), 7.35 (t, J = 7.7 Hz, 1H), 7.09 (t, J = 6.0 Hz, 1H), 4.70 (t, J = 9.0 Hz, 2H), 4.64 (d, J = 6.0 Hz, 2H), 3.56-3.50 (m, 4H), 3.34 (q, J = 6.0 Hz, 2H), 3.04 (t, J = 9.0 Hz, 2H), 2.44-2.33 (m, 6H). | Rt = 0.23 m/z 460.3 [M + H]+ (Method 10) |
| 29 | N-(2-(pyridin-3-yl)ethyl)-3-(((7-(pyridin-4-yl)-2,3-dihydrofuro[3,2-c]pyridin-4-yl)amino)methyl)benzamide | 2-(pyridin-3-yl)ethan-1-amine | (400 MHz, DMSO-d6) δ 8.49 (t, J = 5.5 Hz, 1H), 8.46 (d, J = 6.1 Hz, 2H), 8.42-8.35 (m, 3H), 8.18 (s, 1H), 7.75 (s, 1H), 7.63-7.58 (m, 3H), 7.44 (d, J = 7.7 Hz, 1H), 7.34 (t, J = 7.7 Hz, 1H), 7.29-7.24 (m, 2H), 7.08 (t, J = 6.0 Hz, 1H), 4.70 (t, J = 9.0 Hz, 2H), 4.63 (d, J = 6.0 Hz, 2H), 3.47 (q, J = 6.0 Hz, 2H), 3.03 (t, J = 9.0 Hz, 2H), 2.83 (t, J = 7.1 Hz, 2H). | Rt = 0.40 min m/z 452.3 [M + H]+ (Method 10) |

| Ex | Structure-Name | Amine | ¹H NMR | LC-MS |
|---|---|---|---|---|
| 30 | 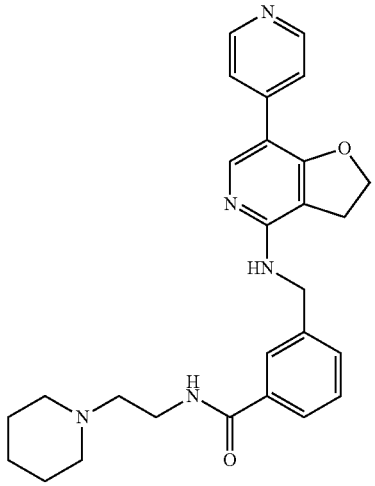 [SMILES: O=C(NCCN1CCCCC1)c1cccc(CNc2ncc(-c3ccncc3)c3c2CCO3)c1]<br>N-(2-(piperidin-1-yl)ethyl)-3-(((7-(pyridin-4-yl)-2,3-dihydrofuro[3,2-c]pyridin-4-yl)amino)methyl)benzamide | 2-(piperidin-1-yl)ethnan-1-amine | (400 MHz, DMSO-d6) δ 8.46 (d, J = 6.4 Hz, 2H), 8.30-8.24 (m, 1H), 8.18 (s, 1H), 7.77 (s, 1H), 7.65-7.58 (m, 3H), 7.44 (d, J = 7.7 Hz, 1H), 7.35 (t, J = 7.7 Hz, 1H), 7.08 (t, J = 6.1 Hz, 1H), 4.70 (t, 2H, J = 9.0 Hz), 4.64 (d, J = 6.0 Hz, 2H), 3.36-3.29 (m, 2H), 3.03 (t, J = 9.0 Hz, 2H), 2.43-2.29 (m, 6H), 1.48-1.41 (m, 4H), 1.37-1.30 (m, 2H). | Rt = 0.25 min m/z 458.4 [M + H]⁺ (Method 10) |

Example 31

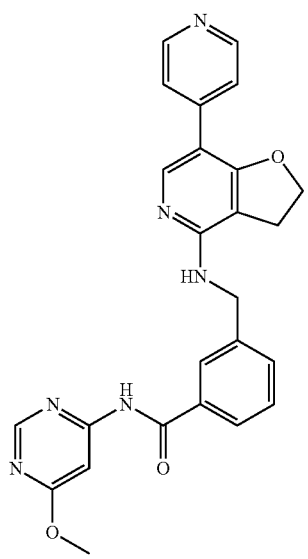 [SMILES: COc1cc(NC(=O)c2cccc(CNc3ncc(-c4ccncc4)c4c3CCO4)c2)ncn1]

N-(6-Methoxypyrimidin-4-yl)-3-(((7-(pyridin-4-yl)-2,3-dihydrofuro[3,2-c]pyridin-4-yl)amino)methyl)benzamide (Example 31)

To a solution of intermediate I1 (200 mg, 0.576 mmol) and 1-(methylsulfonyl)-1H-benzotriazole (454 mg, 2.3 mmol) dissolved in THF (10 mL) were added triethylamine (0.48 mL) and 4-amino-6-methoxypyrimidine (144 mg, 1.15 mmol) and the reaction mixture was flushed with argon. The reaction was heated to 150° C. under microwave irradiation for 4 h. Further 4-amino-6-methoxypyrimidine (72 mg, 0.575 mmol) and 1-(methylsulfonyl)-1H-benzotriazole (227 mg, 1.15 mmol) were added and the reaction was heated to 150° C. for a further 2 h. The reaction mixture was purified using an Isolute® SCX-2 column eluting with methanol followed by 2M methanolic ammonia. The relevant fractions were combined and concentrated in vacuo. The resulting solid was dissolved in EtOAc and washed with 10% citric acid. The organic layer was extracted and washed with aqueous potassium carbonate. The organic layers were extracted, dried (Na₂SO₄), filtered and concentrated in vacuo. The crude material was dissolved in DCM and purified using flash chromatography on silica by eluting with 0-100% DCM in EtOAc followed by 20% methanol in EtOAc. The relevant fractions were combined and concentrated in vacuo and the resulting solid further purified by MDAP (Luna Phenyl-Hexyl 21.2×150 mm, 10 μm 20-80% methanol/H₂O (0.1% FA), 20 mL/min, RT) to give the desired product (8.67 mg).

LCMS (Method 5): Rt=2.58 min, m/z 455.0 [M+H]⁺

¹H NMR (400 MHz, DMSO-d6) δ 11.11 (br s, 1H), 8.62 (d, J=1 Hz, 1H), 8.51 (dd, J=1.66, 4.60 Hz, 2H), 8.24 (s, 1H), 7.99 (bs, 1H), 7.89 (d, J=7.8 Hz, 1H), 7.66 (dd, J=1.6, 4.6 Hz, 2H), 7.57-7.62 (m, 2H), 7.46 (t, J=7.7 Hz, 1H), 7.17 (t, J=6.1 Hz, 1H), 4.70-4.78 (m, 4H), 3.95 (s, 3H), 3.09 (t, J=9.0 Hz, 2H).

Example 32

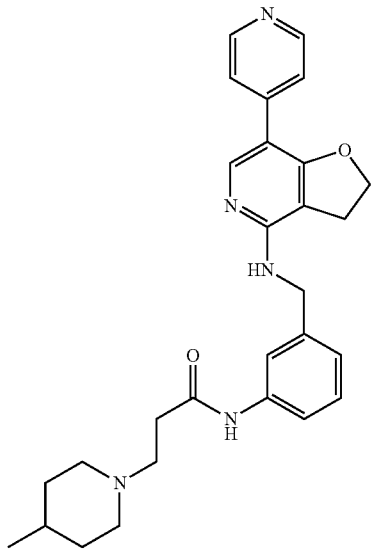 [SMILES: CC1CCN(CCC(=O)Nc2cccc(CNc3ncc(-c4ccncc4)c4c3CCO4)c2)CC1]

3-(4-Methylpiperidin-1-yl)-N-(3-(((7-(pyridin-4-yl)-2,3-dihydrofuro[3,2-c]pyridin-4-yl)amino)methyl)phenyl)propanamide (Example 32)

3-(4-Methylpiperidin-1-yl)propanoic acid (26.9 mg, 0,157 mmol), HATU (143 mg, 0.377 mmol) and DIPEA (0.086 mL, 0.314 mmol) were dissolved in anhydrous DCM (4 mL) and stirred for 10 min. Intermediate I2 (50 mg, 0.157 mmol) was added and the reaction stirred for 1 h at RT. The reaction was diluted with DCM and washed twice with water. The organic layer was evaporated and the crude purified on NH-silica by eluting with 0-2% MeOH in DCM, relevant fractions were pooled and repurified by flash chromatography on RP-C18-silica by eluting from 100% A (water/acetonitrile 95:5+0.1% HCOOH) to 80% B (acetonitrile/water 95:5+0.1% HCOOH) to afford the title compound (5.2 mg).

LCMS (Method 11): Rt=3.44 min, m/z 472.2.0 [M+H]$^+$
$^1$H NMR (400 MHz, CDCl$_3$) δ 10.35 (br s, 1H), 8.50 (d, J=6.1 Hz, 2H), 8.38 (s, 1H), 8.18 (s, 1H), 7.61 (s, 1H), 7.49-7.57 (m, 2H), 7.39 (d, J=7.9 Hz, 1H), 7.16-7.23 (m, 3H), 7.04 (d, J=7.9 Hz, 1H), 4.29-4.86 (m, 4H), 3.19 (d, J=11.8 Hz, 2H), 2.96-3.08 (m, 4H), 2.73 (t, J=6.4 Hz, 2H), 2.35 (t, J=11.4 Hz, 2H), 1.71 (d, J=11.4 Hz, 2H), 1.30-1.53 (m, 3H), 0.91-0.98 (m, 3H).

Examples 33-39

The following examples were prepared from intermediate I2 and the acid starting material given (or the correspondent carboxylate salt) in a manner 'analogous' or 'similar' to that used for example 32. Such procedures may involve minor variations, for example reaction temperature, reagent/solvent amount, reaction time, work-up conditions or chromatographic purification conditions (eg. HPLC-MDAP or flash chromatography). In some cases, where modification involved reaction solvent (eg. DCM-DMF mix instead of DMF) or coupling agents, changes were reported as a note. In some cases a tert-butoxycarbonyl (Boc) protected acid starting material was used and Boc group removed before purification using general methods well known to those skilled in the art.

| Ex | Structure-Name | Starting Material | $^1$H NMR | LC-MS |
|---|---|---|---|---|
| 33 | | 3-(morpholinomethyl) benzoic acid | (400 MHz, DMSO-d6) δ 10.20 (s, 1H), 8.38-8.57 (m, 2H), 8.23 (s, 1H), 7.80-7.88 (m, 2H), 7.70-7.74 (m, 1H), 7.65 (d, J = 6.1 Hz, 3H), 7.42-7.55 (m, 2H), 7.25-7.31 (m, 1H), 7.05-7.12 (m, 2H), 4.69-4.78 (m, 2H), 4.50-4.68 (m, 2H), 3.58 (br. s., 4H), 3.54 (s, 2H), 2.96-3.17 (m, 2H), 2.25-2.43 (m, 4H). | Rt = 3.52 min, m/z 522.0 [M + H]$^+$ (Method 11) |

-continued

| Ex | Structure-Name | Starting Material | ¹H NMR | LC-MS |
|---|---|---|---|---|
| | 3-(morpholinomethyl)-N-(3-(((7-(pyridin-4-yl)-2,3-dihydrofuro[3,2-c]pyridin-4-yl)amino)methyl)phenyl)benzamide | | | |
| 34 | 5-methyl-N-(3-(((7-(pyridin-4-yl)-2,3-dihydrofuro[3,2-c]pyridin-4-yl)amino)methyl)phenyl)-4,5,6,7-tetrahydrothiazolo[5,4-c]pyridine-2-carboxamide | 5-methyl-4,5,6,7-tetrahydro-thiazolo[5,4-c]pyridine-2-carboxylic acid | (400 MHz, DMSO-d6) δ 10.56 (s, 1H), 8.44-8.47 (m, 2H), 8.19 (s, 1H), 7.81 (br s, 1H), 7.64 (s, 1H), 7.60-7.63 (m, 2H), 7.21-7.26 (m, 1H), 7.02-7.08 (m, 2H), 4.70 (t, J = 9.0 Hz, 2H), 4.60 (d, J = 5.92 Hz, 2H), 3.66 (s, 2 H), 3.04 (t, J = 9.0 Hz, 2H), 2.86 (t, J = 5.6 Hz, 2H), 2.74 (t, J = 5.6 Hz, 2 H), 2.37 (s, 3H), 1.04-1.28 (m, 1 H). | Rt = 3.35 min, m/z 499.1 [M + H]⁺ (Method 11) |
| 35 | 4-(4-methylpiperazin-1-yl)-N-(3-(((7-(pyridin-4-yl)-2,3-dihydrofuro[3,2-c]pyridin-4-yl)amino)methyl)phenyl)butanamide | 4-(4-methyl-piperazin-1-yl)butanoic acid | (400 MHz, DMSO-d6) δ 9.78 (s, 1H), 8.42-8.56 (m, 2H), 8.21 (s, 1H), 7.58-7.73 (m, 2H), 7.48-7.50 (m, 2H), 7.19 (t, J = 7.7 Hz,1H), 7.03-7.10 (m, 1H), 6.94-7.03 (m, 1H), 4.73 (t, J = 9.0 Hz, 2H), 4.59 (d, J = 6.1 Hz, 2H), 3.05 (t, J = 9.0 Hz, 2H), 2.16-2.48 (m, 12H), 2.11 (s, 3H), 1.70 (qt, J = 7.2 Hz, 1H). | Rt = 3.12 min, m/z 487.2 [M + H]⁺ (Method 11) |

| Ex | Structure-Name | Starting Material | ¹H NMR | LC-MS |
|---|---|---|---|---|
| 36 | 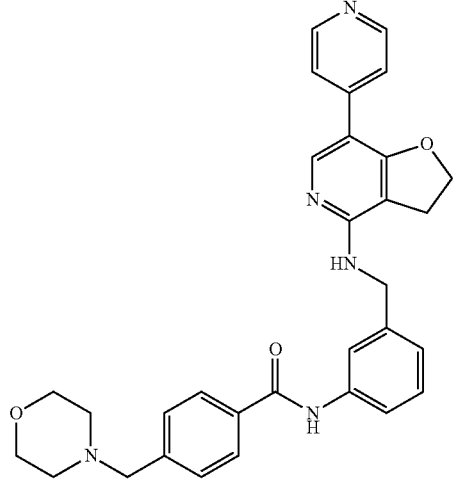 [SMILES: O=C(Nc1cccc(CNc2ncc(-c3ccncc3)c3c2CCO3)c1)c1ccc(CN2CCOCC2)cc1]<br>4-(morpholinomethyl)-N-(3-(((7-(pyridin-4-yl)-2,3-dihydrofuro[3,2-c]pyridin-4-yl)amino)methyl)phenyl)benzamide | 4-(morpholino methyl) benzoic acid | (400 MHz, DMSO-d6) δ 10.08 (s, 1H), 8.41-8.53 (m, 2H), 8.16 (s, 1H), 7.85-7.95 (m, 2H), 7.70-7.78 (m, 1H), 7.53-7.68 (m, 3H), 7.40-7.50 (m, 2H), 7.20-7.35 (m, 1H), 6.97-7.18 (m, 2H), 4.68-4.81 (m, 2H), 4.50-4.67 (m, 2H), 3.43-3.55 (m, 4H), 2.85-3.17 (m, 2H), 2.26-2.42 (m, 4H). | Rt = 3.40 min, m/z 522.2 [M + H]⁺ (Method 11) |
| 37 | 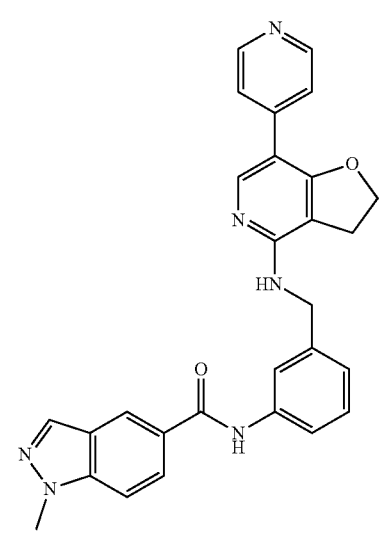 [SMILES: Cn1ncc2cc(C(=O)Nc3cccc(CNc4ncc(-c5ccncc5)c5c4CCO5)c3)ccc21]<br>1-methyl-N-(3-(((7-(pyridin-4-yl)-2,3-dihydrofuro[3,2-c]pyridin-4-yl)amino)methyl)phenyl)-1H-indazole-5-carboxamide | 1-methyl-1H-indazole-5-carboxylic acid | (400 MHz, DMSO-d6) δ 10.23 (s, 1H), 8.49 (d, J = 6.1 Hz, 2H), 8.43-8.47 (m, 1H), 8.23 (d, J = 2.2 Hz, 2H), 7.94-8.02 (m, 1H), 7.65 (d, J = 6.6 Hz, 5H), 7.21-7.36 (m, 1H), 7.01-7.13 (m, 2H), 4.74 (t, J = 8.8 Hz, 2H), 4.49-4.68 (m, 2H), 4.09 (s, 3H), 3.08 (t, J = 8.8 Hz, 2H). | Rt = 4.10 min, m/z 477.2 [M + H]⁺ (Method 11) |

| Ex | Structure-Name | Starting Material | $^1$H NMR | LC-MS |
|---|---|---|---|---|
| 38 | 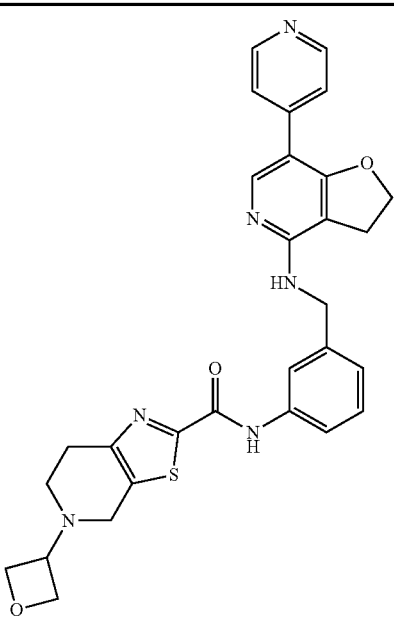<br>5-(oxetan-3-yl)-N-(3-(((7-(pyridin-4-yl)-2,3-dihydrofuro[3,2-c]pyridin-4-yl)amino)methyl)phenyl)-4,5,6,7-tetrahydrothiazolo[5,4-c]pyridine-2-carboxamide | Intermediate A2 | (400 MHz, DMSO-d6) δ 10.29 (s, 1H), 9.49 (br s, 2H), 8.76 (d, J = 6.6 Hz, 2H), 8.50 (br s, 1H), 8.24 (d, J = 5.3 Hz, 2H), 7.83-7.90 (m, 3H), 7.66 (d, J = 8.3 Hz, 1H), 7.26-7.42 (m, 2H), 7.11 (d, J = 7.9 Hz, 1H), 4.90 (t, J = 9.0 Hz, 2H), 4.75 (d, J = 4.4 Hz, 2H), 4.25-4.40 (m, 2H), 3.29-3.47 (m, 1H), 3.01-3.25 (m, 4H), 1.54-1.94 (m, 4H), 1.12-1.41 (m, 2H). | Rt = 4.00 min, m/z 541.1 [M + H]$^+$ (Method 11) |
| 39 | 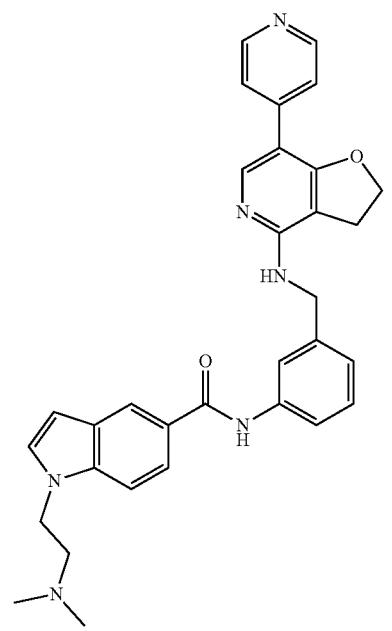 [SMILES: CN(C)CCn1ccc2cc(C(=O)Nc3cccc(CNc4ncc(-c5ccncc5)c5c4CCO5)c3)ccc21]<br>1-(2-(dimethylamino)ethyl)-N-(3-(((7-(pyridin-4-yl)-2,3-dihydrofuro[3,2-c]pyridin-4-yl)amino)methyl)phenyl)-1H-indole-5-carboxamide | A3 | (400 MHz, DMSO-d6) δ 10.04 (s, 1H) 8.46 (br d, J = 4.60 Hz, 2H) 8.20 (br s, 1H) 7.67-7.78 (m, 2H) 7.58-7.67 (m, 3H) 7.54 (d, J = 8.55 Hz, 1H) 7.46 (d, J = 3.07 Hz, 1H) 7.23 (t, J = 7.89 Hz, 1H) 6.98-7.08 (m, 2H) 6.53 (d, J = 3.07 Hz, 1H) 4.70 (t, J = 8.88 Hz, 2H) 4.61 (d, J = 5.92 Hz, 2H) 4.26 (t, J = 6.47 Hz, 2H) 3.01-3.07 (m, 2H) 2.55-2.61 (m, 2H) 2.15 (s, 6H). | Rt = 3.33 min, m/z 533.2 [M + H]$^+$ (Method 11) |

| Ex | Structure-Name | Starting Material | ¹H NMR | LC-MS |
|---|---|---|---|---|
| 40 | 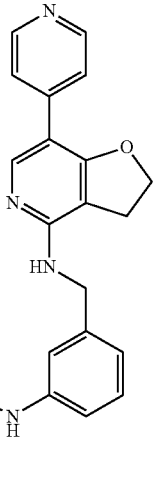<br>N-(3-(((7-(pyridin-4-yl)-2,3-dihydrofuro[3,2-c]pyridin-4-yl)amino)methyl)phenyl)-1,2,3,4-tetrahydroisoquinoline-6-carboxamide | 2-(tert-butoxy-carbonyl)-1,2,3,4-tetrahydroiso-quinoline-6-carboxylic acid | (400 MHz, DMSO-d6) δ 10.29 (s, 1H), 9.49 (br s, 2H), 8.76 (d, J = 6.6 Hz, 2H), 8.50 (br s, 1H), 8.24 (d, J = 5.3 Hz, 2H), 7.83 (br s, 3H), 7.66 (d, J = 8.3 Hz, 1H), 7.21-7.46 (m, 2H), 7.11 (d, J = 7.9 Hz, 1H), 4.90 (t, J = 9.0 Hz, 2H), 4.75 (d, J = 4.4 Hz, 2H), 4.26-4.41 (m, 2H), 3.33-3.50 (m, 2H), 3.03-3.26 (m, 4H). | Rt = 0.43 min, m/z 478.3 [M + H]⁺ (Method 12) Note: The acid was used as Boc-protected and protective group removed prior to purification |

Example 41

1-(2-(Dimethylamino)ethyl)-N-(3-(((7-(pyridin-4-yl)-2,3-dihydrofuro[3,2-c]pyridin-4-yl)amino)methyl)phenyl)-1H-pyrazole-4-carboxamide (Example 41)

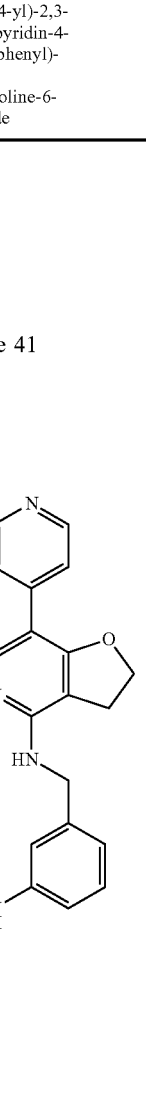

A microwave vial was charged with intermediate I2, bis(trimethylaluminum)-1,4-diazabicyclo[2.2.2]octane (217 mg, 0.85 mmol), Intermediate A4 (28 mg, 0.14 mmol) and THF (3 mL), sealed and heated under microwave irradiation at 120° C. for 2 h. Reaction mixture was quenched by the addition of water and the resulting mixture was purified by flash chromatography on NH-silica by eluting with 0-3% MeOH in DCM to give the title compound (4.6 mg).

LCMS (Method 11): Rt=3.14 min, m/z 484.2 [M+H]⁺

1H NMR (400 MHz, DMSO-d6) δ 9.65 (s, 1H), 8.49 (d, J=6.6 Hz, 2H), 8.32 (s, 1H), 8.23 (s, 1H), 8.01 (s, 1H), 7.50-7.64 (m, 4H), 7.17-7.32 (m, 1H), 6.91-7.16 (m, 2H), 4.69-4.90 (m, 2H), 4.51-4.67 (m, 2H), 4.22 (t, J=6.4 Hz, 2H), 2.99-3.18 (m, 2H), 2.62-2.69 (m, 2H), 2.16 (s, 6H).

Example 42

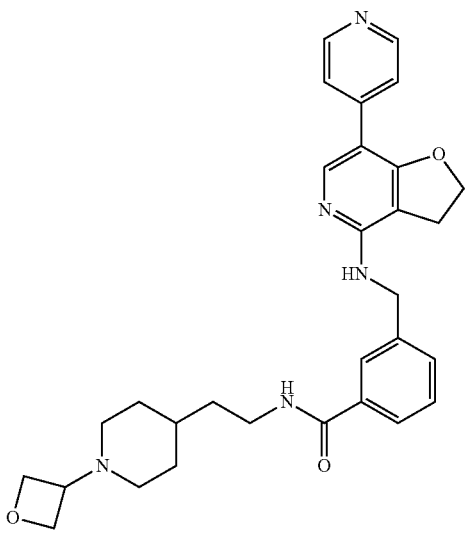 [SMILES: O=C(NCCC1CCN(C2COC2)CC1)c1cccc(CNc2ncc(-c3ccncc3)c3c2CCO3)c1]

N-(2-(1-(Oxetan-3-yl)piperidin-4-yl)ethyl)-3-(((7-(pyridin-4-yl)-2,3-dihydrofuro[3,2-c]pyridin-4-yl)amino)methyl)benzamide (Example 42)

To a mixture of intermediate J1 (80 mg, 0.18 mmol) and 3-oxetananone (0.30 mL, 0.53 mmol) in methanol (2 mL) was added sodium cyanoborohydride (0.033 mg, 0.53 mmol) and the resulting mixture was stirred at RT. After 18 h, the resulting mixture was diluted with DCM and washed with aqueous 1M NaOH. The organic layer was dried over sodium sulfate and evaporated in vacuo. The residue was purified by MDAP (Luna Phenyl-Hexyl 21.2×150 mm, 10 μm 5-60% methanol/$H_2O$+0.1% HCOOH, 20 mL/min, RT) to give the desired product (35 mg).

LCMS (Method 5): Rt=1.75 min, m/z 514.0 $[M+H]^+$ $^1$H NMR (400 MHz, DMSO-d6) δ 8.51 (dd, J=1.6, 4.6 Hz, 2H), 8.40 (dd, J=5.6, 5.6 Hz, 1H), 8.27-8.24 (m, 1H), 8.23 (s, 1H), 7.82 (s, 1H), 7.69-7.65 (m, 3H), 7.48 (d, J=7.9 Hz, 1H), 7.41-7.36 (m, 1H), 7.14 (dd, J=6.0, 6.0 Hz, 1H), 4.75 (t, J=8.9 Hz, 2H), 4.69 (d, J=5.9 Hz, 2H), 4.50 (t, J=6.5 Hz, 2H), 4.40 (t, J=6.1 Hz, 2H), 3.35-3.25 (m, 2H), 3.08 (t, J=9.0 Hz, 2H), 2.65 (d, J=11.0 Hz, 2H), 1.72-1.64 (m, 4H), 1.46 (q, J=6.9 Hz, 2H), 1.33-1.25 (m, 1H), 1.21-1.10 (m, 2H).

Examples 43a/43b

The following examples were prepared from the given intermediate using a similar procedure to that used to prepare example 42

| Ex | Structure | Starting material | $^1$H NMR | LC-MS |
|---|---|---|---|---|
| 43a (Isomer 1) 43b (Isomer 2) | N N-(2-(oxetan-3-yl)octahydrocyclopenta[c]pyrrol-5-yl)-3-(((7-(pyridin-4-yl)-2,3-dihydrofuro[3,2-c]pyridin-4-yl)amino)methyl)benzamide (isomer 1) | Intermediate J2 | Isomer 1 (400 MHz, DMSO-d6) δ, J = 1.6, 4.6 Hz, 2H), 8.13 (s, 1H), 8.18 (d, J = 7.5 Hz, 1H), 7.80 (s, 1H), 7.64-7.69 (m, 3H), 7.48 (d, J = 8.0 Hz, 1H), 7.38 (t, J = 7.5 Hz, 1H), 7.15 (t, J = 6.1 Hz, 1H), 4.75 (t, J = 8.8 Hz, 2H), 4.68 (d, J = 6.1 Hz, 2H), 4.56 (t, J = 6.5 Hz, 2H), 4.38-4.48 (m, 3H), 3.46 (p, J = 6.2 Hz, 1H), 3.08 (t, J = 8.9 Hz, 2H), 2.66 (s, 2H), 2.56 (s, 1H), 2.17 (d, J = 9 Hz, 2H), 1.68-1.77 (m, 4H). Isomer 2 (400 MHz, DMSO-d6) δ, J = 8.7 Hz, 1H), 8.51 (dd, J = 1.6, 4.6 Hz, 2H), 8.23 (s, 1H), 7.86 (s, 1H), 7.72 (d, J = 8.0 Hz, 1H), 7.66 (dd, J = 1.7, 4.6 Hz, 2H), 7.47 (d, J = 7.7 Hz, 1H), 7.37 (t, J = 7.6 Hz, 1H), 7.13 (t, J = 6.1 Hz, 1H), 4.75 (t, J = 8.9 Hz, 2H), 4.68 (d, J = 6.0 Hz, 2H), 4.58 (t, J = 6.6 Hz, 2H), 4.45 (t, J = 6 Hz, 2H), 4.25 (sext, J = 7.9 Hz, 1H), 3.53 (p, J = 6.4 Hz, 1H), 3.08 (t, J = 8.8 Hz, 2H), 2.65 (d, J = 9.2 Hz, 2H), 2.54-2.62 | Isomer 1 LCMS Rt = 1.74 min, m/z 512.0 $[M + H]^+$ (Method 5) Isomer 2 LCMS Rt = 1.73 min, m/z 512.4 $[M + H]^+$ (Method 5) |

| Ex | Structure | Starting material | ¹H NMR | LC-MS |
|---|---|---|---|---|
| | N-(2-(oxetan-3-yl)octahydrocyclopenta[c]pyrrol-5-yl)-3-(((7-(pyridin-4-yl)-2,3-dihydrofuro[3,2-c]pyridin-4-yl)amino)methyl)benzamide (isomer 2) | | (m, 2H), 2.06-2.17 (m, 4H), 1.45-1.55 (m, 2H). | |

Example 44

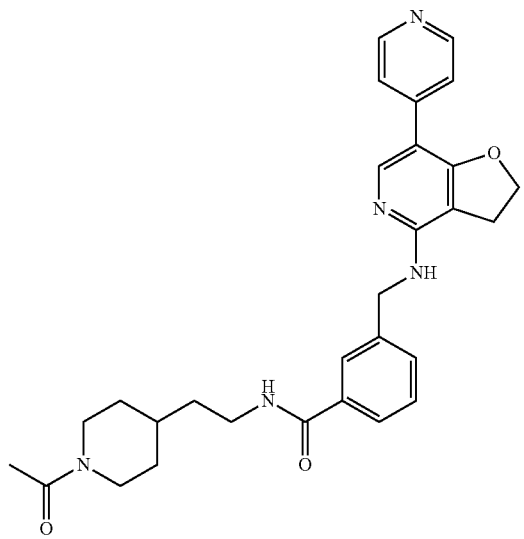 [SMILES: CC(=O)N1CCC(CCNC(=O)c2cccc(CNc3ncc(-c4ccncc4)c4c3CCO4)c2)CC1]

N-(2-(1-Acetylpiperidin-4-yl)ethyl)-3-(((7-(pyridin-4-yl)-2,3-dihydrofuro[3,2-c]pyridin-4-yl)amino)methyl)benzamide (Example 44)

To a mixture of intermediate J1 (80 mg, 0.18 mmol) and triethylamine (49 μL, 0.35 mmol) in DCM (1.5 mL) was added acetic anhydride (25 μL, 0.26 mmol) and the resulting mixture was stirred at RT for 1 h. The resulting mixture was quenched with water, diluted with DCM and the organic phase dried through a phase separator and concentrated in vacuo. The residue was purified by MDAP (Sunfire C18 19×150 mm, 10 μm 5-60% acetonitrile/H$_2$O (10 mM NH$_4$CO$_3$), 20 mL/min, RT) to give the product as a white solid (50.5 mg).

LCMS (Method 5): Rt=2.27 min, m/z 500.0 [M+H]$^+$

¹H NMR (400 MHz, DMSO-d6) δ 8.51 (dd, J=1.6, 4.6 Hz, 2H), 8.42 (dd, J=5.6, 5.6 Hz, 1H), 8.23 (s, 1H), 7.83 (s, 1H), 7.69 (d, J=8.0 Hz, 1H), 7.66 (dd, J=1.6, 4.6 Hz, 2H), 7.48 (d, J=7.9 Hz, 1H), 7.42-7.37 (m, 1H), 7.15 (t, J=6.0 Hz, 1H), 4.75 (t, J=8.9 Hz, 2H), 4.68 (d, J=6.0 Hz, 2H), 4.35 (d, J=13.1 Hz, 1H), 3.77 (d, J=13.6 Hz, 1H), 3.32-3.26 (m, 2H), 3.08 (t, J=9.0 Hz, 2H), 3.00-2.92 (m, 1H), 2.50-2.42 (m, 1H), 1.98 (s, 3H), 1.77-1.68 (m, 2H), 1.58-1.52 (m, 1H), 1.47 (q, J=6.9 Hz, 2H), 1.13-1.01 (m, 1H), 1.01-0.88 (m, 1H).

Example 45

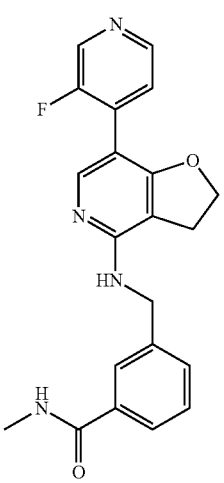 [SMILES: CNC(=O)c1cccc(CNc2ncc(-c3ccncc3F)c3c2CCO3)c1]

3-(((7-(3-Fluoropyridin-4-yl)-2,3-dihydrofuro[3,2-c]pyridin-4-yl)amino)methyl)-N-methylbenzamide (Example 45)

A degassed mixture of intermediate H1 (200 mg, 0.56 mmol), 3-fluoro-4-(4,4,5,5-tetramethyl-1,3,2-dioxaborolan-2-yl)pyridine (148 mg, 0.66 mmol), tetrakis(triphenylphosphine)palladium(0) (64 mg, 0.056 mmol) and caesium carbonate (0.54 g, 1.66 mmol) in dioxane (8 mL) and water (0.8 mL) was heated at 100° C. for 18 h. The reaction mixture, diluted with EtOAc, was washed with brine, the organic layer was dried with sodium sulphate and concentrated in vacuo. The residue, dissolved in MeOH, was passed down an Isolute® SCX-2 cartridge eluting with MeOH and then 2M methanolic ammonia. The solution was concentrated in vacuo and the residue was purified by flash chromatography (12 g, 15 μm Silica column, 0-5% MeOH in EtOAc), the relevant fractions were combined, concentrated and freeze dried to give the product an off-white solid (21.9 mg).

LCMS (Method 8): Rt=3.31 min, m/z 379.2 [M+H]$^+$

¹H NMR (400 MHz, DMSO-d6) δ8.55 (d, J=2.5 Hz, 1H), 8.39 (dd, J=1.0, 4.9 Hz, 2H), 7.96 (d, J=1.2 Hz, 1H), 7.83-7.80 (m, 1H), 7.67-7.65 (m, 1H), 7.54 (dd, J=5.0, 6.7 Hz, 1H), 7.49-7.45 (m, 1H), 7.40-7.36 (m, 1H), 7.18-7.13 (m, 1H), 4.68 (t, J=8.4 Hz, 2H), 4.66 (d, J=6.4 Hz, 2H), 3.08 (t, J=8.9 Hz, 2H), 2.77 (d, J=4.6 Hz, 3H).

Example 46

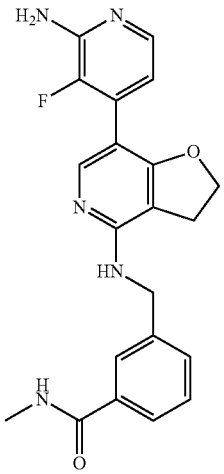 [SMILES: CNC(=O)c1cccc(CNc2ncc(-c3ccnc(N)c3F)c3c2CCO3)c1]

3-(((7-(2-Amino-3-fluoropyridin-4-yl)-2,3-dihydro-furo[3,2-c]pyridin-4-yl)amino)methyl)-N-methyl-benzamide (Example 46)

To a degassed solution of intermediate H1 (90 mg, 0.25 mmol), intermediate B1 (200 mg, 0.30 mmol) and cesium carbonate (120 mg, 0.37 mmol) in dioxane (2 mL) and water (0.3 mL) was added Pd(pddf)Cl$_2$·DCM (20 mg, 0.025 mmol). The mixture was heated at 90° C. for 20 h. The reaction mixture was passed down an Isolute® SCX-2 cartridge eluting with methanol and then 2M methanolic ammonia. The solution was concentrated in vacuo and the product was purified by MDAP (Xbridge Phenyl 19×150 mm, 10 μm 20-80% methanol/10 mM aqueous NH$_4$CO$_3$, 20 mL/min, RT) to give the desired product (13.1 mg).

LCMS (Method 5): Rt=1.91 min, m/z 394.0 [M+H]$^+$ $^1$H NMR (400 MHz, DMSO-d6) δ 8.43-8.39 (m, 1H), 7.87 (s, 1H), 7.83 (s, 1H), 7.71-7.66 (m, 2H), 7.51-7.47 (m, 1H), 7.39 (t, J=7.7 Hz, 1H), 7.04 (t, J=6.1 Hz, 1H), 6.58 (t, J=5.0 Hz, 1H), 6.11 (s, 2H), 4.69-4.63 (m, 4H), 3.08 (t, J=8.8 Hz, 2H), 2.78 (d, J=4.5 Hz, 3H).

Example 47

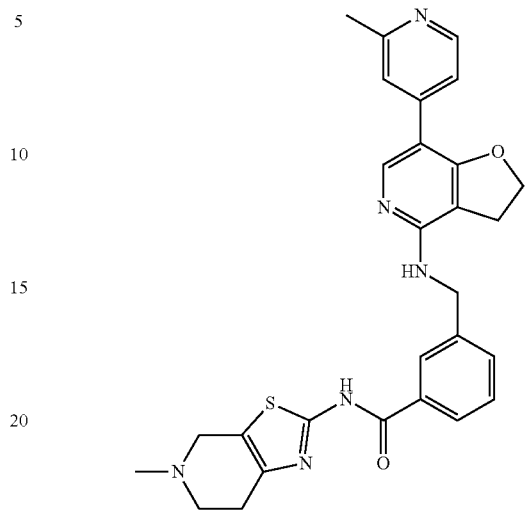

N-(5-Methyl-4,5,6,7-tetrahydrothiazolo[5,4-c]pyri-din-2-yl)-3-(((7-(2-methylpyridin-4-yl)-2,3-dihydro-furo[3,2-c]pyridin-4-yl)amino)methyl)benzamide (Example 47)

A degassed mixture of intermediate H2 (150 mg, 0.3 mmol), 2-methyl-4-(4,4,5,5-tetramethyl-1,3,2-dioxaboro-lan-2-yl)pyridine (79 mg, 0.36 mmol), tetrakis(triph-enylphosphine)palladium (35 mg, 0.030 mmol) and cesium carbonate (293 mg, 0.899 mmol) in DMF (5 mL) and water (1 mL) was heated at 100° C. for 2.5 h. The resulting mixture was diluted with water and extracted with EtOAc. The organic layer was dried over sodium sulphate and evaporated in vacuo. The residue, diluted with methanol, was passed down an Isolute® SCX-2 cartridge eluting with methanol and then 2M methanolic ammonia. The solution was concentrated in vacuo and the product was purified by chromatography on silica by eluting with 0-10% MeOH in DCM. The relevant fractions were combined and concentrated, and the residue was purified by MDAP (Sunfire C18 19×150 mm, 10 μm 5-60% acetonitrile/H$_2$O (0.1% FA), 20 mL/min, RT) to give the desired product (17.6 mg).

LCMS (Method 4): Rt=3.45 min, m/z 513.2 [M+H]$^+$ $^1$H NMR (400 MHz, DMSO-d6) δ 12.49 (s, 1H), 8.35 (d, J=5.2 Hz, 1H), 8.19 (s, 1H), 8.03 (s, 1H), 7.94 (d, J=7.8 Hz, 1H), 7.61-7.41 (m, 4H), 7.12 (t, J=6.1 Hz, 1H), 4.76-4.68 (m, 4H), 3.54 (s, 2H), 3.07 (t, J=8.9 Hz, 2H), 2.74-2.66 (m, 4H), 2.45 (s, 3H), 2.39 (s, 3H).

Examples 48 to 56

The following examples were prepared using a similar procedure to that used for example 47 by replacing intermediate H2 and/or 2-methyl-4-(4,4,5,5-tetramethyl-1,3,2-dioxaborolan-2-yl)pyridine with the appropriate starting materials given in the table below. Such procedures may involve minor variations, for example reaction temperature, reagent/solvent amount, reaction time, work-up conditions or chromatographic purification conditions (eg. HPLC-MDAP or flash chromatography).

| Ex | Structure | Starting materials | ¹H NMR | LC-MS |
|---|---|---|---|---|
| 48 | 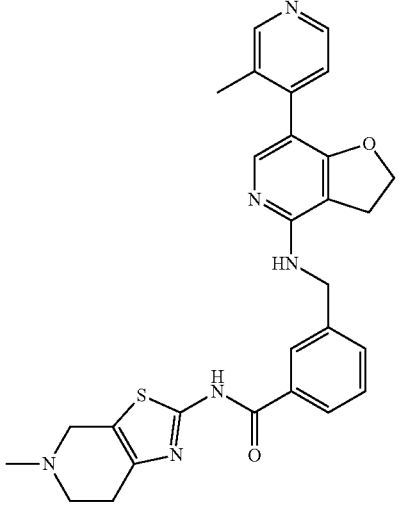<br>N-(5-methyl-4,5,6,7-tetrahydrothiazolo[5,4-c]pyridin-2-yl)-3-(((7-(3-methylpyridin-4-yl)-2,3-dihydrofuro[3,2-c]pyridin-4-yl)amino)methyl)benzamide | Intermediate H2 and 3-methyl-4-(4,4,5,5-tetramethyl-1,3,2-dioxaborolan-2-yl)pyridine | (400 MHz, DMSO-d6) δ 8.43 (s, 1H), 8.36 (d, $J$ = 4.9 Hz, 1H), 8.19 (s, 1H), 8.06 (s, 1H), 7.95 (d, $J$ = 8.0 Hz, 1H), 7.72 (s, 1H), 7.61 (d, $J$ = 7.9 Hz, 1H), 7.48 (t, $J$ = 7.7 Hz, 1H), 7.17 (d, $J$ = 4.9 Hz, 1H), 7.01 (t, $J$ = 6.1 Hz, 1H), 4.70 (d, $J$ = 6.0 Hz, 2H), 4.65 (t, $J$ = 8.8 Hz, 2H), 3.53 (s, 2H), 3.09 (t, $J$ = 8.9 Hz, 2H), 2.73-2.68 (m, 4H), 2.39 (s, 3H), 2.19 (s, 3H). | Rt = 3.56 min, m/z 513.2 [M + H]+ (Method 4) |
| 49 | 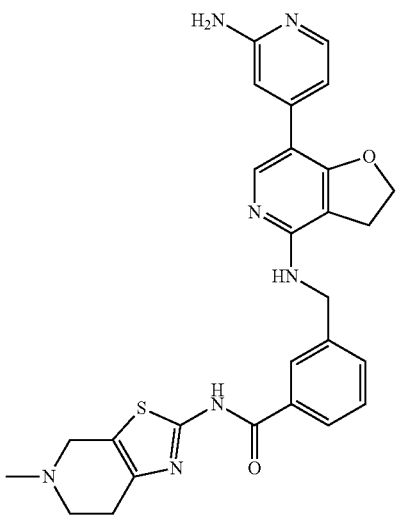<br>3-(((7-(2-aminopyridin-4-yl)-2,3-dihydrofuro[3,2-c]pyridin-4-yl)amino)methyl)-N-(5-methyl-4,5,6,7-tetrahydrothiazolo[5,4-c]pyridin-2-yl)benzamide | Intermediate H2 and 4-(4,4,5,5-tetramethyl-1,3,2-dioxaborolan-2-yl)pyridin-2-amine | ¹H NMR (400 MHz, DMSO-d6) δ 8.26 (s, 1H), 8.04 (s, 2H), 7.94 (d, $J$ = 7.8 Hz, 1H), 7.84 (d, $J$ = 6.0 Hz, 1H), 7.57 (d, $J$ = 7.8 Hz, 1H), 7.45 (t, $J$ = 7.7 Hz, 1H), 7.02 (t, $J$ = 6.0 Hz, 1H), 6.75-6.72 (m, 2H), 5.80 (s, 2H), 4.73-4.66 (m, 4H), 3.06 (t, $J$ = 8.9 Hz, 2H), 2.72-2.67 (m, 6H), 2.38 (s, 3H). | Rt = 1.75 min, m/z 514.2 [M + H]+ (Method 4) |

| Ex | Structure | Starting materials | ¹H NMR | LC-MS |
|---|---|---|---|---|
| 50 | 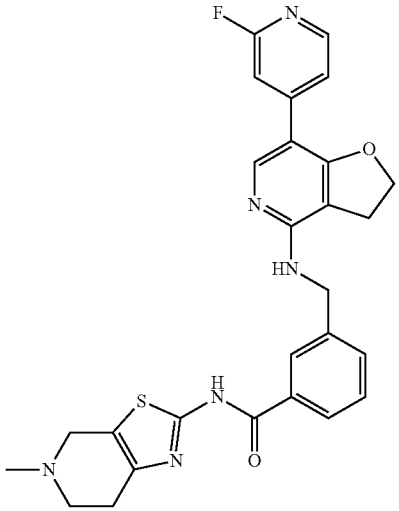<br>3-(((7-(2-fluoropyridin-4-yl)-2,3-dihydrofuro[3,2-c]pyridin-4-yl)amino)methyl)-N-(5-methyl-4,5,6,7-tetrahydrothiazolo[5,4-c]pyridin-2-yl)benzamide | Intermediate H2 and 2-fluoro-4-(4,4,5,5-tetramethyl-1,3,2-dioxaborolan-2-yl)pyridine | ¹H NMR (400 MHz, DMSO-d6) δ 12.52 (s, 1H), 8.32 (s, 1H), 8.17-8.13 (m, 1H), 8.03 (s, 1H), 7.94 (d, J = 7.9 Hz, 1H), 7.68-7.65 (m, 1H), 7.57 (d, J = 7.8 Hz, 1H), 7.49-7.41 (m, 2H), 7.27 (t, J = 6.1 Hz, 1H), 4.80-4.69 (m, 4H), 3.81-3.54 (m, 2H), 3.09 (t, J = 8.9 Hz, 2H), 2.96-2.80 (m, 2H), 2.78-2.70 (m, 2H), 1.24 (s, 3H) | Rt = 2.32 min<br>m/z 517.1 [M + H]⁺ (Method 7) |
| 51 | 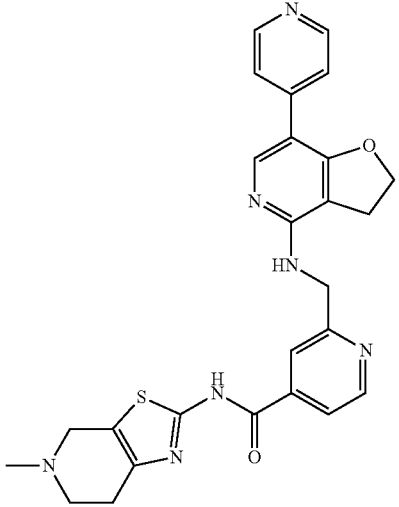<br>N-(5-methyl-4,5,6,7-tetrahydrothiazolo[5,4-c]pyridin-2-yl)-2-(((7-(pyridin-4-yl)-2,3-dihydrofuro[3,2-c]pyridin-4-yl)amino)methyl)isonicotinamide | Intermediate H3 and pyridin-4-ylboronic acid | (400 MHz, DMSO-d6) δ 12.81 (s, 1H), 8.70 (d, J = 5.1 Hz, 1H), 8.50-8.48 (m, 2H), 8.20 (s, 1H), 7.88-7.83 (m, 2H), 7.66-7.64 (m, 2H), 7.23 (t, J = 6.0 Hz, 1H), 4.80-4.73 (m, 4H), 3.50 (s, 2H), 3.33 (s, 2H), 3.15-3.10 (m, 2H), 2.71-2.67 (m, 4H), 2.37 (s, 3H). | Rt = 1.65 min<br>m/z 500.1 [M + H]⁺ (Method 4) |

| Ex | Structure | Starting materials | ¹H NMR | LC-MS |
|----|-----------|--------------------|--------|-------|
| 52 | 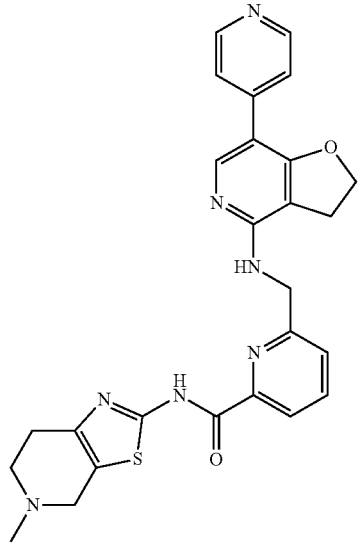 [SMILES: CN1CCc2nc(NC(=O)c3cccc(CNc4ncc(-c5ccncc5)c5c4CCO5)n3)sc2C1]<br><br>N-(5-methyl-4,5,6,7-tetrahydrothiazolo[5,4-c]pyridin-2-yl)-6-(((7-(pyridin-4-yl)-2,3-dihydrofuro[3,2-c]pyridin-4-yl)amino)methyl)picolinamide | Intermediate H4 and pyridin-4-ylboronic acid | (300 MHz, DMSO-d6) δ 11.85 (s, 1H), 8.51-8.48 (m, 2H), 8.21 (s, 1H), 8.03-7.99 (m, 2H), 7.66-7.61 (m, 3H), 7.33 (dd, J = 6.1, 6.1 Hz, 1H), 4.87-4.73 (m, 4H), 3.55 (s, 2H), 3.16 (dd, J = 8.9, 8.9 Hz, 2H), 2.72 (s, 4H), 2.39 (s, 3H). | Rt = 3.69 min m/z 500.2 [M + H]⁺ (Method 4) |
| 53 | 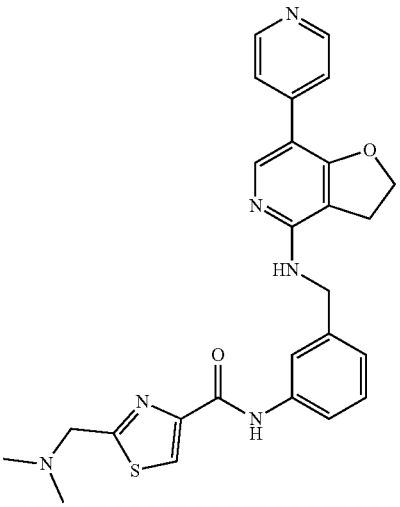 [SMILES: CN(C)Cc1nc(C(=O)Nc2cccc(CNc3ncc(-c4ccncc4)c4c3CCO4)c2)cs1]<br><br>2-((dimethylamino)methyl)-N-(3-(((7-(pyridin-4-yl)-2,3-dihydrofuro[3,2-c]pyridin-4-yl)amino)methyl)phenyl)thiazole-4-carboxamide | Intermediate H5 and pyridin-4-ylboronic acid | (400 MHz, DMSO-d6) δ 10.07 (s, 1H), 8.48 (d, J = 6.6 Hz, 2H), 8.36 (s, 1H), 8.22 (s, 1H), 7.80 (s, 1H), 7.57-7.71 (m, 3H), 7.26 (t, J = 7.9 Hz, 1H), 6.92-7.15 (m, 2H), 4.73 (t, J = 9.0 Hz, 2H), 4.63 (d, J = 6.1 Hz, 2H), 3.82 (s, 2H), 3.07 (t, J = 8.8 Hz, 2H), 2.31 (s, 6H). | Rt = 3.09 min m/z 487.0 [M + H]⁺ (Method 11) |

-continued

| Ex | Structure | Starting materials | ¹H NMR | LC-MS |
|---|---|---|---|---|
| 54 | 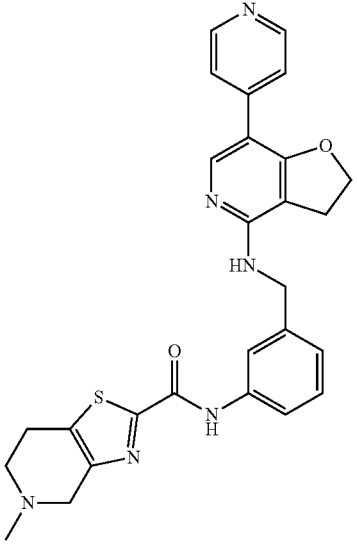 [SMILES: CN1CCc2sc(C(=O)Nc3cccc(CNc4ncc(-c5ccncc5)c5c4CCO5)c3)nc2C1]<br>5-methyl-N-(3-(((7-(pyridin-4-yl)-2,3-dihydrofuro[3,2-c]pyridin-4-yl)amino)methyl)phenyl)-4,5,6,7-tetrahydrothiazolo[4,5-c]pyridine-2-carboxamide | Intermediate H6 and pyridin-4-ylboronic acid | (400 MHz, DMSO-d6) δ 10.59 (s, 1H), 8.39-8.53 (m, 2 H), 8.23 (s, 1H), 8.17 (s, 1H), 7.84 (s, 1 H), 7.57-7.71 (m, 3H), 7.27 (t, J = 7.8 Hz, 1H), 7.08 (s, 2H), 4.74 (s, 2H), 4.63 (d, J = 5.7 Hz, 2H), 3.61 (s, 2H), 3.07 (s, 2H), 2.95 (s, 2H), 2.71 (s, 2H), 2.42 (s, 3H). | Rt = 0.39 min m/z 499.1 [M + H]⁺ (Method 9) |
| 55 | 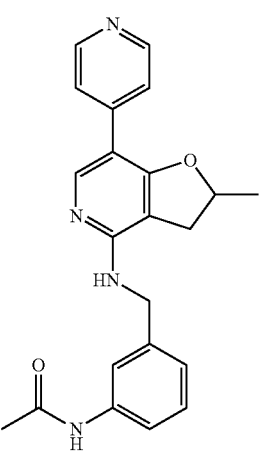 [SMILES: CC(=O)Nc1cccc(CNc2ncc(-c3ccncc3)c3c2CC(C)O3)c1]<br>N-(3-(((2-methyl-7-(pyridin-4-yl)-2,3-dihydrofuro[3,2-c]pyridin-4-yl)amino)methyl)phenyl)acetamide | Intermediate H7 and pyridin-4-ylboronic acid | (400 MHz, DMSO-d6) δ 9.86 (s, 1H), 8.49 (d, J = 5.7 Hz, H), 8.10-8.20 (m, 2H), 7.65 (d, J = 6.1 Hz, 2H), 7.40-7.50 (m, 2H), 7.20 (t, J = 7.8 Hz, 1H), 7.01 (d, J = 4.4 Hz, 2H), 5.14 (dt, J = 8.9, 6.7 Hz, 1H), 4.59 (d, J = 6.1 Hz, 2H), 3.22 (dd, J = 15.3, 9.2 Hz, 1H), 2.64 (dd, J = 15.3, 7.0 Hz, 1H), 2.01 (s, 3H), 1.46 (d, J = 6.1 Hz, 3H). | Rt = 3.53 min m/z 375.1 [M + H]⁺ (Method 11) |

| Ex | Structure | Starting materials | ¹H NMR | LC-MS |
|---|---|---|---|---|
| 56 | 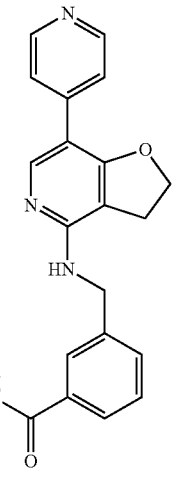<br>N-(5-(2-(dimethylamino)ethoxy)pyridin-2-yl)-3-(((7-(pyridin-4-yl)-2,3-dihydrofuro[3,2-c]pyridin-4-yl)amino)methyl)benzamide | Intermediate H8 and pyridin-4-ylboronic acid | (400 MHz, DMSO-d6) δ10.61 (s, 1H), 8.52-8.49 (m, 2H), 8.24 (s, 1H), 8.13-8.07 (m, 2H), 8.00 (s, 1H), 7.89 (d, J = 7.8 Hz, 1H), 7.68-7.65 (m, 2H), 7.55 (d, J = 7.6 Hz, 1H), 7.51 (dd, J = 3.0, 9.3 Hz, 1H), 7.44 (t, J = 7.7 Hz, 1H), 7.16 (t, J = 6.1 Hz, 1H), 4.78-4.69 (m, 4H), 4.13 (t, J = 5.8 Hz, 2H), 3.09 (t, J = 8.8 Hz, 2H), 2.64 (t, J = 5.8 Hz, 2H), 2.24 (s, 6H). | Rt = 1.91 min<br>m/z 511.4 [M + H]⁺<br>(Method 5) |

Example A

Step A

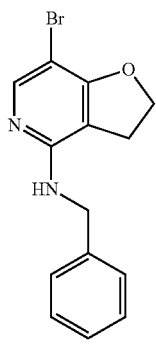 [SMILES: Brc1cnc(NCc2ccccc2)c2c1OCC2]

N-Benzyl-7-bromo-2,3-dihydrofuro[3,2-c]pyridin-4-amine (Intermediate AA)

Intermediate AA was prepared using a procedure similar to that used for the synthesis of Intermediate E1 by replacing methyl 3-formylbenzoate with benzaldehyde.

LC-MS (Method 2): Rt=1.57 min, m/z 307.1/308.1 [M+H]⁺

Step B

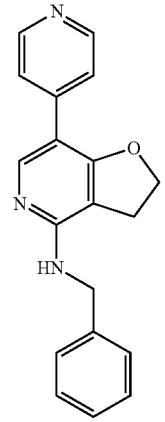 [SMILES: c1ccc(CNc2ncc(-c3ccncc3)c3c2CCO3)cc1]

(N-Benzyl-7-(pyridin-4-yl)-2,3-dihydrofuro[3,2-c]pyridin-4-amine) (Example A)

Example A was prepared using a procedure similar to that used for the synthesis of Intermediate G1 by replacing intermediate E1 with intermediate AA.

LC-MS (Method 5): Rt=2.29 min, m/z 304.0 [M+H]⁺

¹H NMR (400 MHz, DMSO-d6) δ 8.51 (dd, J=1.6, 4.7 Hz, 2H), 8.24 (s, 1H), 7.67 (dd, J=1.8, 4.5 Hz, 2H), 7.37-7.29 (m, 4H), 7.22 (tt, J=1.9, 6.8 Hz, 1H), 7.09 (t, J=6.1 Hz, 1H), 4.74 (t, J=9.0 Hz, 2H), 4.65 (d, J=6.0 Hz, 2H), 3.07 (t, J=8.9 Hz, 2H).

Example B

The following example was prepared from intermediate H1 and the given intermediate using a method similar to that used for example 45.

| Ex | Structure | Intermediate | ¹H NMR | LC-MS |
|---|---|---|---|---|
| B | N-methyl-3-(((7-(2-oxo-1,2-dihydropyridin-4-yl)-2,3-dihydrofuro[3,2-c]pyridin-4-yl)amino)methyl)benzamide | (2-Oxo-1,2-dihydropyridin-4-yl)boronic acid | (400 MHz, DMSO-d6) δ 11.34 (s, 1H), 8.44-8.37 (m, 1H), 8.11 (s, 1H), 7.81 (s, 1H), 7.67 (d, J = 7.7 Hz, 1H), 7.47 (d, J = 7.8 Hz, 1H), 7.39 (dd, J = 7.6, 7.6 Hz, 1H), 7.31 (d, J = 7.0 Hz, 1H), 7.14 (t, J = 6.1 Hz, 1H), 6.63-6.61 (m, 1H), 6.52 (dd, J = 1.9, 7.0 Hz, 1H), 4.72 (t, J = 8.9 Hz, 2H), 4.67 (d, J = 5.9 Hz, 2H), 3.06 (t, J = 9.0 Hz, 2H), 2.78 (d, J = 4.6 Hz, 3H). | Rt = 1.94 min, m/z 377.0 [M + H]⁺ (Method 5) |

Example C

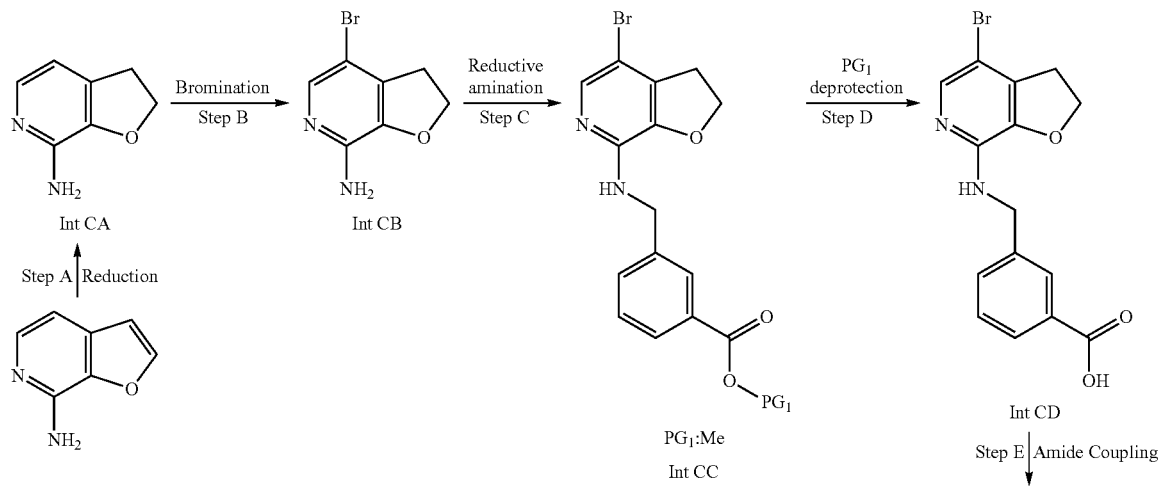

-continued

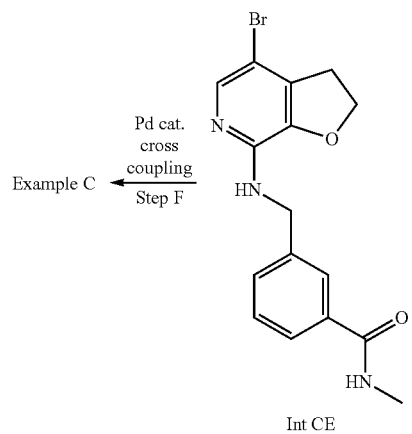

Int CE

Example C ← Pd cat. cross coupling / Step F

Step A

Intermediate CA was prepared similarly to intermediate C1-c by replacing the starting intermediate C1-b with the indicated starting materials.

| | Structure | Starting material | LC-MS |
|---|---|---|---|
| Int CA | (structure shown) | furo[2,3-c]pyridin-7-amine | Rt = 0.75 min, m/z 137.1 [M + H]+ (Method 13) |

Step B

Intermediate CB was prepared similarly to intermediate C1 by replacing the starting intermediate C1-c with the indicated starting materials.

| | Structure | Starting material | LC-MS |
|---|---|---|---|
| CB | (structure shown, Br) | Intermediate CA | Rt = 1.72 min, m/z 214.8/216.8 [M + H]+ (Method 15) |

Step C

Intermediate CC was prepared using a procedure similar to that used for the synthesis of Intermediate E1 by replacing Intermediate C1 and with those indicated in the table below.

| | Structure | Starting material | LC-MS |
|---|---|---|---|
| CC | 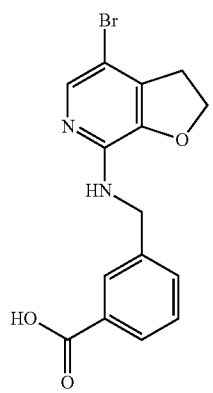 [SMILES: O=C(O)c1cccc(CNc2ncc(Br)c3c2OCC3)c1] | Intermediate CB | Rt = 2.90 min, m/z 363.2/365.2 [M + H]+ (Method 3) |

Step D

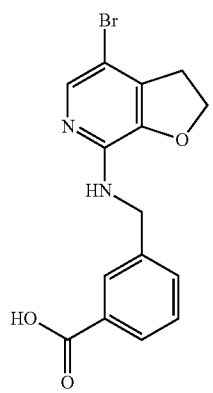 [SMILES: O=C(O)c1cccc(CNc2ncc(Br)c3c2OCC3)c1]

3-(((4-Bromo-2,3-dihydrofuro[2,3-c]pyridin-7-yl)amino)methyl)benzoic Acid (Intermediate CD)

A solution of intermediate CC (720 mg, 1.98 mmol) and lithium hydroxide monohydrate (250 mg, 5.95 mmol) dissolved in methanol (3 mL), THF (3 mL) and water (6 mL) was stirred at RT for 6 h. The organic phase was removed, and the aqueous phase was acidified to pH 2~3 using 1M HCl. The resulting mixture was diluted with water and extracted with Me-THF. The organic layer was dried with $Na_2SO_4$ and concentrated in vacuo leading to afford the desired product (697 mg).

LCMS (Method 2): Rt=0.92 min, m/z 349.2/351.2 [M+H]+

Step E

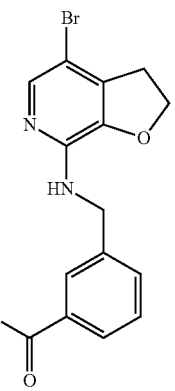

3-(((4-Bromo-2,3-dihydrofuro[2,3-c]pyridin-7-yl)amino)methyl)-N-methylbenzamide (Intermediate CE)

Intermediate CE was prepared using a procedure similar to that used for the synthesis of intermediate H1 by replacing intermediate F1 with intermediate F2.

LCMS (Method 2): Rt=1.32 min, m/z 362.3/364.2 [M+H]+

Step F

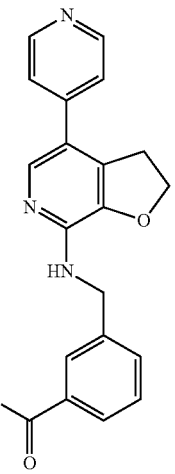

N-methyl-3-(((4-(pyridin-4-yl)-2,3-dihydrofuro[2,3-c]pyridin-7-yl)amino)methyl)benzamide (Example C)

The following example was prepared using a similar procedure to that used for example 47 by replacing intermediate H2 and 2-methyl-4-(4,4,5,5-tetramethyl-1,3,2-dioxaborolan-2-yl)pyridine with Intermediate CE and 4-(4,4,5,5-tetramethyl-1,3-dioxolan-2-yl)pyridine.

LCMS (Method 6): Rt=1.32 min, m/z 361.0 [M+H]+

$^1$H-NMR (400 MHz, DMSO-d6) δ 8.56 (d, J=5.6 Hz, 2H), 8.40 (br s, 1H), 7.84 (s, 1H), 7.81 (s, 1H), 7.65 (d, J=7.7 Hz, 1H), 7.51 (d, J=4.5 Hz, 2H), 7.46 (d, J=7.5 Hz, 1H), 7.37 (t, J=7.8 Hz, 1H), 7.02 (t, J=6.1 Hz, 1H), 4.62-4.69 (m, 4H), 3.38-3.46 (t masked by water, 2H), 2.77 (d, J=4.3 Hz, 3H).

Pharmacological Activity of the Compounds of the Invention.

In Vitro Inhibitory Activity Assay Description (Method A)

The effectiveness of compounds of the present invention to inhibit Rho kinase activity can be determined in a 10 μL assay containing 40 mM Tris pH7.5, 20 mM $MgCl_2$ 0.1 mg/mL BSA, 50 μM DTT and 2.5 μM peptide substrate (Myelin Basic Protein) using an ADP-Glo kit (Promega). Compounds were dissolved in DMSO such that the final concentration of DMSO was 1% in the assay. All reactions/incubations are performed at 25° C. Compound (2 μL) and either Rho kinase 1 or 2 (4 μL) were mixed and incubated for 30 min. Reactions were initiated by addition of ATP (4 μL) such that the final concentration of ATP in the assay was 10 μM. After a 1 hour incubation 10 μL of ADP-Glo Reagent was added and after a further 45 minute incubation 20 μL of Kinase Detection Buffer was added and the mixture incubated for a further 30 minutes. The luminescent signal was measured on a luminometer. Controls consisted of assay wells that did not contain compound with background determined using assay wells with no enzyme added. Compounds were tested in dose-response format and the inhibition of kinase activity was calculated at each concentration of compound. To determine the $IC_{50}$ (concentration of compound required to inhibit 50% of the enzyme activity) data were fit to a plot of % inhibition vs $Log_{10}$ compound concentration using a sigmoidal fit with a variable slope and fixing the maximum to 100% and the minimum to 0%. To determine the Ki values the Cheng-Prusoff equation was utilized ($Ki=IC_{50}/(1+[S]/Km)$).

In Vitro Inhibitory Activity Assay Description (Method B)

The effectiveness of compounds of the present invention to inhibit Rho kinase activity can be determined in a 10 μL assay containing 40 mM Tris pH7.5, 20 mM $MgCl_2$ 0.1 mg/mL BSA, 50 μM DTT and 2.5 μM peptide substrate (Myelin Basic Protein) using an ADP-Glo kit (Promega). Compounds were dissolved in DMSO such that the final concentration of DMSO was 1% in the assay. All reactions/incubations are performed at 25° C. Compound (2 ul) and either Rho kinase 1 or 2 (4 μL) were mixed and incubated for 30 min. Reactions were initiated by addition of ATP (4 μL) such that the final concentration of ATP in the assay was 200 μM. After a 1 hour incubation 10 μL of ADP-Glo Reagent was added and after a further 45 minute incubation 20 ul of Kinase Detection Buffer was added and the mixture incubated for a further 30 minutes. The luminescent signal was measured on a luminometer. Controls consisted of assay wells that did not contain compound with background determined using assay wells with no enzyme added. Compounds were tested in dose-response format and the inhibition of kinase activity was calculated at each concentration of compound. To determine the $IC_{50}$ (concentration of compound required to inhibit 50% of the enzyme activity) data were fit to a plot of % inhibition vs Log 10 compound concentration using a sigmoidal fit with a variable slope and fixing the maximum to 100% and the minimum to 0%. To determine the Ki values the Cheng-Prusoff equation was utilized ($Ki=IC_{50}/(1+[S]/Km)$).

The Ki values obtained with Method A and with Method B were consistent.

Compounds according to the invention showed Ki values lower than 500 nM on both isoforms.

The results for individual compounds are provided below in following table and are expressed as range of activity.

In Vitro Inhibitory Activity Assay Description for PKA

The effectiveness of compounds of the present invention to inhibit PKA activity can be determined in a 10 μL assay containing 40 mM Tris pH7.5, 20 mM MgCl2 0.1 mg/mL BSA, 50 μM DTT and 260 μM peptide substrate (kemptide) using an ADP-Glo kit (Promega). Compounds were dissolved in DMSO such that the final concentration of DMSO was 1% in the assay. All reactions/incubations are performed at 25° C. Compound and PKA enzyme (6 μL) were mixed and incubated for 30 min. Reactions were initiated by addition of ATP (4 μL) such that the final concentration of ATP in the assay was 10 μM. After a 30 minute incubation 10 μL of ADP-Glo Reagent was added and after a further 1 hour incubation 20 μL of Kinase Detection Buffer was added and the mixture incubated for a further 45 minutes. The luminescent signal was measured on a luminometer. Controls consisted of assay wells that did not contain compound with background determined using assay wells with no enzyme added. Compounds were tested in dose-response format and the inhibition of kinase activity was calculated at each concentration of compound. To determine the $IC_{50}$ (concentration of compound required to inhibit 50% of the enzyme activity) data were fit to a plot of % inhibition vs $Log_{10}$ compound concentration using a sigmoidal fit with a variable slope and fixing the maximum to 100% and the minimum to 0%. To determine the Ki values the Cheng-Prusoff equation was utilized ($Ki=IC_{50}/(1+[S]/Km)$).

In vitro inhibitory activities for PKA were reported as selectivity ratio vs. ROCK2. Selectivity ratio PKA/ROCK2 was calculated by dividing the Ki value for PKA by Ki value of ROCK2 (Method B) and reported into table 1.

TABLE 1

| Ex No. | Method A ROCK 1 | Method A ROCK 2 | Method B ROCK 1 | Method B ROCK 2 | Ratio (PKA/ROCK2) |
|---|---|---|---|---|---|
| 1 | +++ | +++ | +++ | +++ | |
| 2 | | | ++ | +++ | *** |
| 3 | | | ++ | +++ | *** |
| 4 | | | ++ | ++ | *** |
| 5 | | | ++ | ++ | *** |
| 6 | | | ++ | +++ | *** |
| 7 | | | ++ | ++ | *** |
| 8 | | | ++ | +++ | *** |
| 9 | | | ++ | ++ | *** |
| 10 | | | +++ | +++ | *** |
| 11 | | | +++ | +++ | *** |
| 12 | | | +++ | ++ | ** |
| 13 | | | ++ | +++ | *** |
| 14 | | | +++ | +++ | *** |
| 15 | | | +++ | +++ | *** |
| 16 | | | ++ | ++ | *** |
| 17 | | | ++ | ++ | *** |
| 18 | | | +++ | +++ | *** |
| 19 | | | ++ | +++ | *** |
| 20 | ++ | ++ | ++ | ++ | *** |
| 21 | +++ | +++ | +++ | +++ | *** |
| 22 | +++ | +++ | +++ | +++ | *** |
| 23 | +++ | +++ | | | |
| 24 | +++ | +++ | | | |
| 25 | +++ | +++ | | | |
| 26 | +++ | +++ | | | |
| 27 | +++ | +++ | | | |
| 28 | +++ | +++ | ++ | ++ | *** |
| 29 | +++ | +++ | | | |
| 30 | +++ | +++ | ++ | ++ | *** |
| 31 | | | +++ | +++ | *** |
| 32 | ++ | ++ | | | |
| 33 | ++ | ++ | | | |
| 34 | +++ | +++ | | | |
| 35 | +++ | +++ | +++ | +++ | *** |
| 36 | +++ | +++ | +++ | +++ | *** |
| 37 | +++ | +++ | | | |
| 38 | +++ | +++ | | | |
| 39 | +++ | +++ | | | |
| 40 | +++ | +++ | | | |

TABLE 1-continued

| Ex No. | Method A ROCK 1 | Method A ROCK 2 | Method B ROCK 1 | Method B ROCK 2 | Ratio (PKA/ROCK2) |
|---|---|---|---|---|---|
| 41 | | | ++ | +++ | *** |
| 42 | | | +++ | +++ | *** |
| 43a | | | +++ | +++ | *** |
| 43b | | | +++ | +++ | *** |
| 44 | | | +++ | +++ | *** |
| 45 | | | ++ | ++ | |
| 46 | | | ++ | ++ | *** |
| 47 | ++ | ++ | | | |
| 48 | +++ | +++ | | | |
| 49 | +++ | +++ | | | |
| 50 | +++ | +++ | | | |
| 51 | ++ | +++ | | | |
| 52 | ++ | +++ | | | |
| 53 | ++ | ++ | | | |
| 54 | +++ | +++ | +++ | +++ | *** |
| 55 | ++ | ++ | | | |
| 56 | | | +++ | +++ | *** |
| A | + | + | + | + | * |
| B | | | + | + | *** |
| C | | | + | + | *** |

In the Table the compounds are classified in terms of potency with respect to their inhibitory activity on ROCK1 and ROCK2 isoforms according to the following classification criterion:

+++: Ki≤3 nM

++: 3<Ki≤30 nM

+: Ki>30 nM

The Compounds according to the invention showed advantageously Ki values equal to or lower than 30 nM, preferably even equal to or lower that 3 nM, at least on ROCK2; further preferably equal to or lower than 30 nM, preferably even equal to or lower that 3 nM, on both isoforms. The compounds according to the invention are more potent than the comparative example B and C.

Moreover, preferred compounds according to the invention exhibit marked selectivity versus PKA. The compounds according to the invention are at least 5 fold, preferably equal to or more than 10 fold, selective in terms of ROCK2 selectivity vs PKA. Overall the compounds of the invention are more selective than the comparative example A.

In the table the compounds are classified in terms of selectivity with respect to their ratio of inhibitory activity (Ki) of PKA on ROCK2 isoform according to the following classification criterion:

***: ratio≥10

**: 5≤ratio<10

*: ratio<5

The invention claimed is:

1. A compound of formula (I)

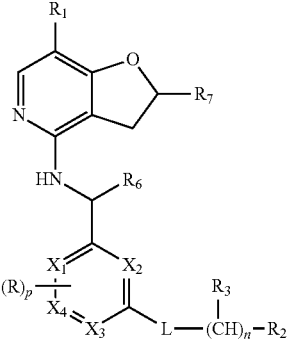

(I)

wherein $X_1$, $X_2$, $X_3$ and $X_4$ are all CH or one of $X_1$, $X_2$, $X_3$ and $X_4$ is N and the others are CH;

p is zero or an integer from 1 to 4;

each R, when present, is selected from $(C_1-C_6)$alkyl and halogen in each occurrence independently selected from F, Cl, Br and I;

$R_1$ is pyridinyl, optionally substituted by one or more groups a selected from halogen, $-(CH_2)_n NR_4 R_5$, and $(C_1-C_6)$alkyl;

L is —C(O)NH— or —NHC(O)—;

n is in each occurrence independently 0 or an integer selected from 1, 2 or 3;

$R_2$ and $R_3$ are in each occurrence independently selected from the group consisting of

—H, halogen,

—OH, $-(CH_2)_n NR_4 R_5$, $(C_1-C_6)$alkyl, $(C_1-C_6)$hydroxyalkyl, $(C_1-C_6)$ alkoxy, $(C_1-C_6)$ alkoxy $(C_1-C_6)$alkyl, $(C_1-C_6)$haloalkyl, $(C_1-C_6)$haloalkoxy, $(C_1-C_6)$haloalkoxy $(C_1-C_6)$alkyl, $(C_3-C_{10})$cycloalkyl, aryl, heteroaryl and $(C_3-C_6)$heterocycloalkyl, each of which cycloalkyl, aryl, heteroaryl and heterocycloalkyl is in its turn optionally and independently substituted with one or more groups selected from halogen,

—OH, $(C_1-C_6)$alkyl, $(C_1-C_6)$hydroxyalkyl, $(C_1-C_6)$ alkoxy, $(C_1-C_6)$ alkoxy $(C_1-C_6)$alkyl, $-(CH_2)_n NR_4 R_5$, $-O-(CH_2)_n NR_4 R_5$, alkanoyl, aryl, heteroaryl, cycloalkyl, aryl-$(C_1-C_6)$alkyl, $(C_3-C_6)$heterocycloalkyl, and $(C_3-C_8)$heterocycloalkyl-$(C_1-C_6)$alkyl, each of said aryl, heteroaryl, cycloalkyl, heterocycloalkyl is still further optionally substituted by one or more group selected independently from halogen, —OH, $(C_1-C_8)$alkyl, $(C_1-C_6)$haloalkyl, and $(C_1-C_6)$hydroxyalkyl;

$R_4$ and $R_5$, the same or different, are selected from the group consisting of
—H,
$(C_1-C_6)$alkyl,
$(C_1-C_6)$haloalkyl,
$(C_1-C_6)$hydroxyalkyl, and
$(C_3-C_6)$heterocycloalkyl;

$R_6$ and $R_7$ are independently selected from the group consisting of —H and $(C_1-C_6)$alkyl;

or a single enantiomer, diastereoisomers and mixtures thereof in any proportion or pharmaceutically acceptable salts and solvates thereof.

2. The compound, enantiomer, diastereoisomers, or pharmaceutically acceptable salts or solvates thereof according to claim 1, wherein $X_3$ and $X_4$ are all CH groups and $X_1$ or $X_2$ are in the alternative independently a CH group or a nitrogen atom.

3. The compound, enantiomer, diastereoisomers, or pharmaceutically acceptable salts or solvates thereof according to claim 1, wherein $X_1$, $X_2$, $X_3$, $X_4$ are all CH groups;
each R, when present, is halogen in each occurrence independently selected from F, Cl, Br and I;
$R_1$ is pyridinyl optionally substituted by one or more group selected from fluoro and amino;
L is —C(O)NH—;
n is 0 or 1;
$R_2$ and $R_3$ are in each occurrence independently selected from the group consisting of —H, $(C_1-C_6)$alkyl, $(C_1-C_6)$haloalkyl, and $(C_3-C_{10})$cycloalkyl;
each of which cycloalkyl is in its turn optionally and independently substituted with at least one group selected from —OH and $(C_1-C_6)$hydroxyalkyl.

4. The compound, enantiomer, diastereoisomers, or pharmaceutically acceptable salts or solvates thereof according to claim 3, wherein the group —(CHR$_3$)n-R$_2$ is selected from methyl, ethyl, propyl, fluoropropyl, cyclopropyl, cyclopropylmethyl, (1-hydroxycyclopropyl)methyl, and 3-(hydroxymethyl)cyclobutyl.

5. The compound, enantiomer, diastereoisomers, or pharmaceutically acceptable salts or solvates thereof according to claim 1, wherein $X_1$, $X_2$, $X_3$ and $X_4$ are all CH;
p is zero;
$R_1$ is pyridinyl optionally substituted by one or more group selected from halogen, —(CH$_2$)$_n$NR$_4$R$_5$, and $(C_1-C_6)$alkyl;
L is —C(O)NH— or —NHC(O)—;
n is in each occurrence independently 0 or an integer selected from 1, 2 or 3;
$R_3$ when present is H or $(C_1-C_6)$hydroxyalkyl, and
$R_2$ is selected from the group consisting of
aryl, heteroaryl and $(C_3-C_6)$heterocycloalkyl,
each of which aryl, heteroaryl and heterocycloalkyl is in its turn optionally and independently substituted with one or more groups selected from
$(C_1-C_6)$alkyl,
$(C_1-C_6)$hydroxyalkyl,
$(C_1-C_6)$ alkoxy,
—(CH$_2$)$_n$NR$_4$R$_5$,
alkanoyl,
$(C_3-C_6)$heterocycloalkyl, and
$(C_3-C_8)$heterocycloalkyl-$(C_1-C_6)$alkyl; and
$R_4$ and $R_5$, the same or different, are selected from the group consisting of —H and $(C_1-C_6)$alkyl.

6. The compound, enantiomer, diastereoisomers, or pharmaceutically acceptable salts or solvates thereof according to claim 5, wherein
n is 0; and
$R_2$ is selected from 5-methyl-4,5,6,7-tetrahydrothiazolo[4,5-c]pyridine-2-yl, 5-(oxetan-3-yl)-4,5,6,7-tetrahydrothiazolo[4,5-c]pyridine-2-yl, and 2-(oxetan-3-yl)octahydrocyclopenta[c]pyrrol-5-yl.

7. The compound, enantiomer, diastereoisomers, or pharmaceutically acceptable salts or solvates thereof according to claim 1, wherein
$X_1$, $X_2$, $X_3$ and $X_4$ are all CH or one of $X_1$, $X_2$, $X_3$ and $X_4$ is N and the others are CH;
p is zero;
$R_1$ is pyridinyl, optionally substituted by one or more group selected from F, —NH$_2$, and methyl;
L is —C(O)NH— or —NHC(O)—;
n is in each occurrence independently 0 or an integer selected from 1, 2 or 3;
$R_2$ and $R_3$ are in each occurrence independently selected from the group consisting of
—H,
—(CH$_2$)$_n$NR$_4$R$_5$ which is (dimethylamino)ethyl,
$(C_1-C_6)$alkyl which is methyl,
$(C_1-C_6)$haloalkyl which is 3-fluoropropyl,
$(C_3-C_{10})$cycloalkyl which is cyclopropyl or cyclobutyl,
Aryl which is phenyl,
Heteroaryl which is pyrazol-yl, imidazol-4-yl, oxazol-4-yl, isoxazolyl, thiazol-yl, pyridinyl, pyrimidinyl, 4,5,6,7-tetrahydropyrazolo[1,5-a]pyrazin-2-yl, 4,5,6,7-tetrahydrothiazolo[5,4-c]pyridin-2-yl, 1,2,3,4-tetrahydroisoquinoline-6yl, 1H-indole-5yl, or 1H-indazole-5yl, and
$(C_3-C_6)$heterocycloalkyl which is piperidinyl, piperazin-1-yl, pyridazin-3-yl, morpholinyl, 5-oxopyrrolidin-3-yl, tetrahydro-2H-pyran-4-yl, or octahydrocyclopenta[c]pyrrol-5-yl,
each of which cycloalkyl, aryl, heteroaryl and heterocycloalkyl is in its turn optionally and independently substituted with one or more groups selected from
—OH,
$(C_1-C_6)$alkyl which is methyl
$(C_1-C_6)$hydroxyalkyl which is hydroxymethyl,
$(C_1-C_6)$ alkoxy which is methoxy,
—(CH$_2$)$_n$NR$_4$R$_5$ which is (dimethylamino)methyl or (dimethylamino)ethyl, wherein $R_4$ and $R_5$ are methyl and n is 1 or 2,
alkanoyl which is acetyl,
$(C_3-C_6)$heterocycloalkyl which is oxetan-3-yl,
$(C_3-C_8)$heterocycloalkyl-$(C_1-C_6)$alkyl which is morpholinomethyl or pyrrolidin-1-ylmethyl, and
$R_6$ is —H, and $R_7$ is —H, or methyl.

8. The compound, enantiomer, diastereoisomers, or pharmaceutically acceptable salts or solvates thereof according to claim 1, wherein the compound of formula (I) is selected from:
3-(((7-(pyridin-4-yl)-2,3-dihydrofuro[3,2-c]pyridin-4-yl)amino)methyl)-N-(5-(pyrrolidin-1-ylmethyl)thiazol-2-yl)benzamide;
N-((5-methylisoxazol-3-yl)methyl)-3-(((7-(pyridin-4-yl)-2,3-dihydrofuro[3,2-c]pyridin-4-yl)amino)methyl)benzamide;
N-((1-methyl-1H-imidazol-4-yl)methyl)-3-(((7-(pyridin-4-yl)-2,3-dihydrofuro[3,2-c]pyridin-4-yl)amino)methyl)benzamide;
N-(3-fluoropropyl)-3-(((7-(pyridin-4-yl)-2,3-dihydrofuro[3,2-c]pyridin-4-yl)amino)methyl)benzamide;

3-(((7-(pyridin-4-yl)-2,3-dihydrofuro[3,2-c]pyridin-4-yl)amino)methyl)-N-(pyrimidin-5-ylmethyl)benzamide;
N-(isoxazol-3-ylmethyl)-3-(((7-(pyridin-4-yl)-2,3-dihydrofuro[3,2-c]pyridin-4-yl)amino)methyl)benzamide;
3-(((7-(pyridin-4-yl)-2,3-dihydrofuro[3,2-c]pyridin-4-yl)amino)methyl)-N-(tetrahydro-2H-pyran-4-yl)benzamide;
N-(oxazol-4-ylmethyl)-3-(((7-(pyridin-4-yl)-2,3-dihydrofuro[3,2-c]pyridin-4-yl)amino)methyl)benzamide;
N-((1-hydroxycyclopropyl)methyl)-3-(((7-(pyridin-4-yl)-2,3-dihydrofuro[3,2-c]pyridin-4-yl)amino)methyl)benzamide;
N-((4-methylmorpholin-2-yl)methyl)-3-(((7-(pyridin-4-yl)-2,3-dihydrofuro[3,2-c]pyridin-4-yl)amino)methyl)benzamide;
N-(pyridin-4-yl)-3-(((7-(pyridin-4-yl)-2,3-dihydrofuro[3,2-c]pyridin-4-yl)amino)methyl)benzamide;
N-(cyclopropylmethyl)-3-(((7-(pyridin-4-yl)-2,3-dihydrofuro[3,2-c]pyridin-4-yl)amino)methyl)benzamide;
N-(3-(hydroxymethyl)cyclobutyl)-3-(((7-(pyridin-4-yl)-2,3-dihydrofuro[3,2-c]pyridin-4-yl)amino)methyl)benzamide;
N-(5-methoxypyridin-2-yl)-3-(((7-(pyridin-4-yl)-2,3-dihydrofuro[3,2-c]pyridin-4-yl)amino)methyl)benzamide;
N-((1-(tert-butyl)-5-oxopyrrolidin-3-yl)methyl)-3-(((7-(pyridin-4-yl)-2,3-dihydrofuro[3,2-c]pyridin-4-yl)amino)methyl)benzamide;
N-cyclopropyl-3-(((7-(pyridin-4-yl)-2,3-dihydrofuro[3,2-c]pyridin-4-yl)amino)methyl)benzamide;
N-(pyridazin-3-yl)-3-(((7-(pyridin-4-yl)-2,3-dihydrofuro[3,2-c]pyridin-4-yl)amino)methyl)benzamide;
3-(((7-(pyridin-4-yl)-2,3-dihydrofuro[3,2-c]pyridin-4-yl)amino)methyl)-N-(pyrimidin-4-yl)benzamide;
N-((1-methyl-1H-pyrazol-3-yl)methyl)-3-(((7-(pyridin-4-yl)-2,3-dihydrofuro[3,2-c]pyridin-4-yl)amino)methyl)benzamide;
N-methyl-3-(((7-(pyridin-4-yl)-2,3-dihydrofuro[3,2-c]pyridin-4-yl)amino)methyl)benzamide;
N-(5-methyl-4,5,6,7-tetrahydropyrazolo[1,5-a]pyrazin-2-yl)-3-(((7-(pyridin-4-yl)-2,3-dihydrofuro[3,2-c]pyridin-4-yl)amino)methyl)benzamide;
N-(2-(1-methylpiperidin-4-yl)ethyl)-3-(((7-(pyridin-4-yl)-2,3-dihydrofuro[3,2-c]pyridin-4-yl)amino)methyl)benzamide;
N-(5-methyl-4,5,6,7-tetrahydrothiazolo[5,4-c]pyridin-2-yl)-3-(((7-(pyridin-4-yl)-2,3-dihydrofuro[3,2-c]pyridin-4-yl)amino)methyl)benzamide;
(S)—N-(2-hydroxy-1-phenylethyl)-3-(((7-(pyridin-4-yl)-2,3-dihydrofuro[3,2-c]pyridin-4-yl)amino)methyl)benzamide;
3-(((7-(pyridin-4-yl)-2,3-dihydrofuro[3,2-c]pyridin-4-yl)amino)methyl)-N-(2-(pyridin-4-yl)ethyl)benzamide;
N-(3-((dimethylamino)methyl)phenyl)-3-(((7-(pyridin-4-yl)-2,3-dihydrofuro[3,2-c]pyridin-4-yl)amino)methyl)benzamide;
N-(3-((dimethylamino)methyl)benzyl)-3-(((7-(pyridin-4-yl)-2,3-dihydrofuro[3,2-c]pyridin-4-yl)amino)methyl)benzamide;
N-(2-morpholinoethyl)-3-(((7-(pyridin-4-yl)-2,3-dihydrofuro[3,2-c]pyridin-4-yl)amino)methyl)benzamide;
N-(2-(pyridin-3-yl)ethyl)-3-(((7-(pyridin-4-yl)-2,3-dihydrofuro[3,2-c]pyridin-4-yl)amino)methyl)benzamide;
N-(2-(piperidin-1-yl)ethyl)-3-(((7-(pyridin-4-yl)-2,3-dihydrofuro[3,2-c]pyridin-4-yl)amino)methyl)benzamide;
N-(6-methoxypyrimidin-4-yl)-3-(((7-(pyridin-4-yl)-2,3-dihydrofuro[3,2-c]pyridin-4-yl)amino)methyl)benzamide;
3-(4-methylpiperidin-1-yl)-N-(3-(((7-(pyridin-4-yl)-2,3-dihydrofuro[3,2-c]pyridin-4-yl)amino)methyl)phenyl)propanamide;
3-(morpholinomethyl)-N-(3-(((7-(pyridin-4-yl)-2,3-dihydrofuro[3,2-c]pyridin-4-yl)amino)methyl)phenyl)benzamide;
5-methyl-N-(3-(((7-(pyridin-4-yl)-2,3-dihydrofuro[3,2-c]pyridin-4-1)amino)methyl)phenyl)-4,5,6,7-tetrahydrothiazolo[5,4-c]pyridine-2-carboxamide;
4-(4-methylpiperazin-1-yl)-N-(3-(((7-(pyridin-4-yl)-2,3-dihydrofuro[3,2-c]pyridin-4-yl)amino)methyl)phenyl)butanamide;
4-(morpholinomethyl)-N-(3-(((7-(pyridin-4-yl)-2,3-dihydrofuro[3,2-c]pyridin-4-yl)amino)methyl)phenyl)benzamide;
1-methyl-N-(3-(((7-(pyridin-4-yl)-2,3-dihydrofuro[3,2-c]pyridin-4-yl)amino)methyl)phenyl)-1H-indazole-5-carboxamide;
5-(oxetan-3-yl)-N-(3-(((7-(pyridin-4-yl)-2,3-dihydrofuro[3,2-c]pyridin-4-yl)amino)methyl)phenyl)-4,5,6,7-tetrahydrothiazolo[5,4-c]pyridine-2-carboxamide;
1-(2-(dimethylamino)ethyl)-N-(3-(((7-(pyridin-4-yl)-2,3-dihydrofuro[3,2-c]pyridin-4-yl)amino)methyl)phenyl)-1H-indole-5-carboxamide;
N-(3-(((7-(pyridin-4-yl)-2,3-dihydrofuro[3,2-c]pyridin-4-yl)amino)methyl)phenyl)-1,2,3,4-tetrahydroisoquinoline-6-carboxamide;
1-(2-(dimethylamino)ethyl)-N-(3-(((7-(pyridin-4-yl)-2,3-dihydrofuro[3,2-c]pyridin-4-yl)amino)methyl)phenyl)-1H-pyrazole-4-carboxamide;
N-(2-(1-(oxetan-3-yl)piperidin-4-yl)ethyl)-3-(((7-(pyridin-4-yl)-2,3-dihydrofuro[3,2-c]pyridin-4-yl)amino)methyl)benzamide;
N-(2-(1-acetylpiperidin-4-yl)ethyl)-3-(((7-(pyridin-4-yl)-2,3-dihydrofuro[3,2-c]pyridin-4-yl)amino)methyl)benzamide;
3-(((7-(3-fluoropyridin-4-yl)-2,3-dihydrofuro[3,2-c]pyridin-4-yl)amino)methyl)-N-methylbenzamide;
3-(((7-(2-amino-3-fluoropyridin-4-yl)-2,3-dihydrofuro[3,2-c]pyridin-4-yl)amino)methyl)-N-methylbenzamide;
N-(5-methyl-4,5,6,7-tetrahydrothiazolo[5,4-c]pyridin-2-yl)-3-(((7-(2-methylpyridin-4-yl)-2,3-dihydrofuro[3,2-c]pyridin-4-yl)amino)methyl)benzamide;
N-(5-methyl-4,5,6,7-tetrahydrothiazolo[5,4-c]pyridin-2-yl)-3-(((7-(3-methylpyridin-4-yl)-2,3-dihydrofuro[3,2-c]pyridin-4-yl)amino)methyl)benzamide;
3-(((7-(2-aminopyridin-4-yl)-2,3-dihydrofuro[3,2-c]pyridin-4-yl)amino)methyl)-N-(5-methyl-4,5,6,7-tetrahydrothiazolo[5,4-c]pyridin-2-yl)benzamide;
3-(((7-(2-fluoropyridin-4-yl)-2,3-dihydrofuro[3,2-c]pyridin-4-yl)amino)methyl)-N-(5-methyl-4,5,6,7-tetrahydrothiazolo[5,4-c]pyridin-2-yl)benzamide;
N-(5-methyl-4,5,6,7-tetrahydrothiazolo[5,4-c]pyridin-2-yl)-2-(((7-(pyridin-4-yl)-2,3-dihydrofuro[3,2-c]pyridin-4-yl)amino)methyl)isonicotinamide;
N-(5-methyl-4,5,6,7-tetrahydrothiazolo[5,4-c]pyridin-2-yl)-6-(((7-(pyridin-4-yl)-2,3-dihydrofuro[3,2-c]pyridin-4-yl)amino)methyl)picolinamide;
2-((dimethylamino)methyl)-N-(3-(((7-(pyridin-4-yl)-2,3-dihydrofuro[3,2-c]pyridin-4-yl)amino)methyl)phenyl)thiazole-4-carboxamide;
5-methyl-N-(3-(((7-(pyridin-4-yl)-2,3-dihydrofuro[3,2-c]pyridin-4-yl)amino)methyl)phenyl)-4,5,6,7-tetrahydrothiazolo[4,5-c]pyridine-2-carboxamide;

N-(3-(((2-methyl-7-(pyridin-4-yl)-2,3-dihydrofuro[3,2-c]pyridin-4-yl)amino)methyl)phenyl)acetamide;

N-(3-(1-((7-(pyridin-4-yl)-2,3-dihydrofuro[3,2-c]pyridin-4-yl)amino)ethyl)phenyl)acetamide;

N-(2-(oxetan-3-yl)octahydrocyclopenta[c]pyrrol-5-yl)-3-(((7-(pyridin-4-yl)-2,3-dihydrofuro[3,2-c]pyridin-4-yl)amino)methyl)benzamide (Isomer 1);

N-(2-(oxetan-3-yl)octahydrocyclopenta[c]pyrrol-5-yl)-3-(((7-(pyridin-4-yl)-2,3-dihydrofuro[3,2-c]pyridin-4-yl)amino)methyl)benzamide (Isomer 2); and N-(5-(2-(dimethylamino)ethoxy)pyridin-2-yl)-3-(((7-(pyridin-4-yl)-2,3-dihydrofuro[3,2-c]pyridin-4-yl)amino)methyl)benzamide.

9. A pharmaceutical composition comprising the compound, enantiomer, diastereoisomers, or pharmaceutically acceptable salts or solvates thereof according to claim 1, in admixture with one or more pharmaceutically acceptable carriers or excipients.

10. The pharmaceutical composition according to claim 9 in a form suitable to be administered by inhalation, selected from inhalable powders, propellant-containing metering aerosols or propellant-free inhalable formulations.

11. A device comprising the pharmaceutical composition according to claim 10, which is selected from a single- or multi-dose dry powder inhaler, a metered dose inhaler or a soft mist nebulizer.

12. The pharmaceutical composition according to claim 9 in a form suitable to be administered by oral route, selected from, gelcaps, capsules, caplets, granules, lozenges and bulk powders or aqueous and non-aqueous solutions, emulsions, suspensions, syrups, and elixirs formulations.

13. A method for treating a pulmonary disease selected from the group consisting of asthma, chronic obstructive pulmonary disease (COPD), idiopathic pulmonary fibrosis (IPF), and pulmonary hypertension (PH), comprising administering to a subject in need thereof the pharmaceutical composition according to claim 9.

14. A combination of:
a compound, enantiomer, diastereoisomers, or pharmaceutically acceptable salts or solvates thereof according to claim 1,
with one or more active ingredients selected from the classes consisting of organic nitrates and NO donors; inhaled NO; stimulator of soluble guanylate cyclase (sGC); prostaciclin analogue PGI2 and agonist of prostacyclin receptors; compounds that inhibit the degradation of cyclic guanosine monophosphate (cGMP) and/or cyclic adenosine monophosphate (cAMP); human neutrophilic elastase inhibitors; compounds inhibiting the signal transduction cascade; active substances for lowering blood pressure; neutral a endopeptidase inhibitor; osmotic agents; ENaC blockers; anti-inflammatories; antihistamine drugs; anti-tussive drugs; antibiotics and DNase drug substance and selective cleavage agents; agents that inhibit ALK5 and/or ALK4 phosphorylation of Smad2 and Smad3; tryptophan hydrolyase 1 (TPH1) inhibitors and multi-kinase inhibitors.

15. The method of claim 13, wherein the pulmonary disease is Pulmonary Arterial Hypertension (PAH).

* * * * *